United States Patent
Sanii et al.

(10) Patent No.: US 12,496,580 B2
(45) Date of Patent: Dec. 16, 2025

(54) APPARATUSES AND METHODS FOR MEASURING DNA/RNA PRODUCTION IN BIOCHIPS

(71) Applicant: Nutcracker Therapeutics, Inc., Emeryville, CA (US)

(72) Inventors: Babak Sanii, Emeryville, CA (US); Benjamin Eldridge, Danville, CA (US); Ximiao Wen, El Cerrito, CA (US); Adib Ahmadzadegan, Emeryville, CA (US); Ping Wei Chen, Emeryville, CA (US); Jodi Loo, Emeryville, CA (US); Robyn Beckwith, Emeryville, CA (US); Tyler Redman, Emeryville, CA (US); Samir Varma, Emeryville, CA (US)

(73) Assignee: Nutcracker Therapeutics, Inc., Emeryville, CA (US)

( * ) Notice: Subject to any disclaimer, the term of this patent is extended or adjusted under 35 U.S.C. 154(b) by 0 days.

(21) Appl. No.: 19/048,007

(22) Filed: Feb. 7, 2025

(65) Prior Publication Data
US 2025/0256277 A1      Aug. 14, 2025

Related U.S. Application Data

(63) Continuation of application No. PCT/US2023/029796, filed on Aug. 9, 2023.
(Continued)

(51) Int. Cl.
*B01L 3/00* (2006.01)
*G01N 21/33* (2006.01)

(52) U.S. Cl.
CPC ........ *B01L 3/502715* (2013.01); *G01N 21/33* (2013.01); *B01L 2200/143* (2013.01);
(Continued)

(58) Field of Classification Search
CPC ........ B01L 3/502715; B01L 2200/143; B01L 2200/148; B01L 2300/0663; B01L 2300/0819; B01L 2400/0487; G01N 21/33
See application file for complete search history.

(56) References Cited

U.S. PATENT DOCUMENTS

| 9,371,965 B2 | 6/2016 | Devaraju et al. |
| 11,325,122 B2 | 5/2022 | Eldridge et al. |

(Continued)

FOREIGN PATENT DOCUMENTS

WO    2013/071047 A1    5/2013

OTHER PUBLICATIONS

International Search Report and Written Opinion dated Nov. 24, 2023, for International Application No. PCT/US2023/029796, 13 pages.

*Primary Examiner* — Brian J. Sines
(74) *Attorney, Agent, or Firm* — FROST BROWN TODD LLP

(57) ABSTRACT

Microfluidic apparatuses (e.g., systems, devices, etc.) and methods for microfluidic provide detection of polynucleotide concentration. These apparatuses may include removable, single-use or reusable microfluidic members that may include one or more channels, chambers and/or substrates for performing microfluidic maneuvers and are adapted for detection of polynucleotide concentration. For example, the microfluidic member may be a microfluidic cartridge that may be inserted, held and/or seated in a microfluidic driver apparatus that may oversee and control operations within one or more cartridges based in part on the detected concentration of polynucleotide.

8 Claims, 24 Drawing Sheets

Related U.S. Application Data

(60) Provisional application No. 63/396,765, filed on Aug. 10, 2022.

(52) U.S. Cl.
CPC . *B01L 2200/148* (2013.01); *B01L 2300/0663* (2013.01); *B01L 2300/0819* (2013.01); *B01L 2400/0487* (2013.01)

(56) References Cited

U.S. PATENT DOCUMENTS

| | | |
|---|---|---|
| 2006/0099116 A1 | 5/2006 | Manger et al. |
| 2014/0141498 A1 | 5/2014 | Enzelberger et al. |

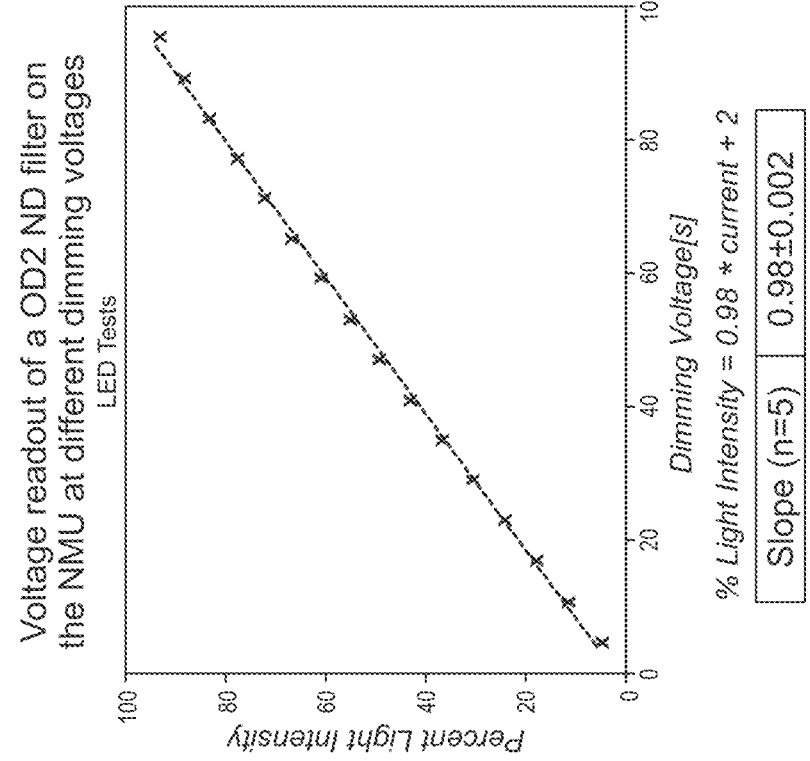
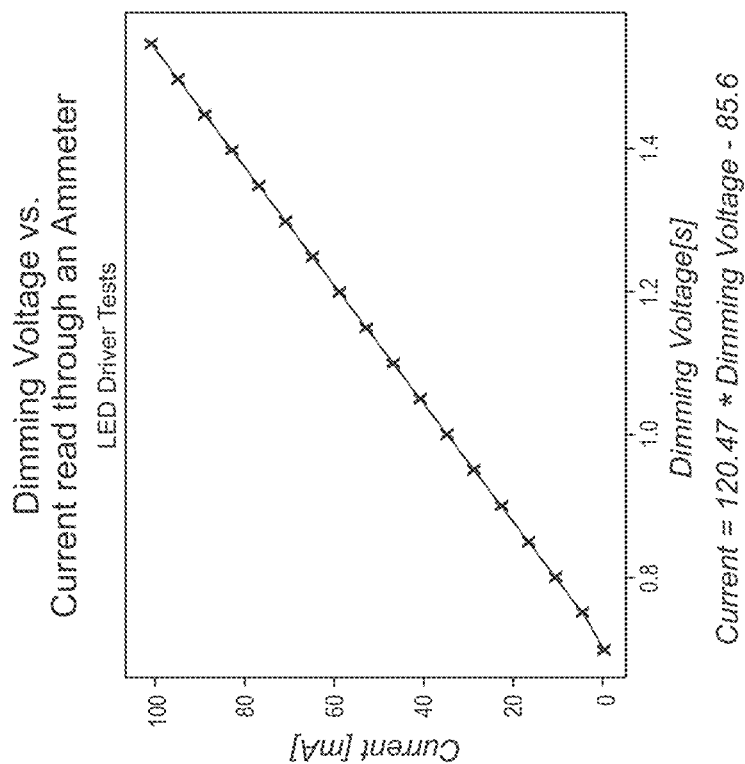
FIG. 15B
FIG. 15A

APPARATUSES AND METHODS FOR MEASURING DNA/RNA PRODUCTION IN BIOCHIPS

CLAIM OF PRIORITY

This application is a continuation of International Pat. App. No. PCT/US2023/029796, entitled "Apparatuses and Methods for Measuring DNA/RNA Production in Biochips," filed Aug. 9, 2023, and published as WO 2024/035754 on Feb. 15, 2024, which claims priority to U.S. Provisional Pat. App. No. 63/396,765, entitled "Apparatuses and Methods for Measuring DNA/RNA Production in Biochips," filed Aug. 10, 2022, the disclosures of which are incorporated by reference herein.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

UV spectrophotometry is a standard technique for nucleic acid quantitation. In UV spectrophotometry, a nucleic acid sample is placed into a chamber, typically a quartz cuvette, which is then placed inside the UV spectrophotometer. UV light is passed through the sample at a specified path length, and the absorbance of the sample at specific wavelengths is measured. Absorbance at 260 nm (A260) is often used to measure nucleic acid. Nucleic acids (e.g., DNA or RNA) contain conjugated double bonds in their purine and pyrimidine rings that have a specific absorption peak at about 260 nm. The maximum absorbance of nucleic acids occurs at a wavelength of 260 nm. The intensity of this absorbance is proportional to the concentration of nucleic acid. Because of these physical characteristics, the nucleic acid concentration of a sample can be determined. Based on the absorbance readings, the concentration of the sample may be determined. Purity of the sample can also be estimated by comparing to the absorbance at 280 nm or 230 nm.

However, such traditional UV spectrophotometry for quantitation of polynucleotides typically require removal of a sample and transferring to a dedicated spectrophotometer apparatus. Typically, the minimum sample volumes must be at least 1-75 µL to obtain an accurate instrument reading. This can be problematic if the sample is highly dilute, or if an extraction technique requires the elution of nucleic acids into low volumes. Contamination is also a problem. For example, if measuring DNA, biological molecules such as proteins, RNA, and chaotropic salts from extraction procedures, can falsely elevate nucleic acid concentration estimations. Buffer salts such as Tris, EDTA, and guanidine isothiocyanate absorb strongly at 230 nm and bleed into the 260-nm absorbance range. In addition, free nucleotides present in a sample may influence the UV quantitation method. Changes in sample pH also alter UV readings. An alternative to the spectrometer is adding a fluorescent probe and measuring it in a fluorimeter which requires further handling of the RNA/DNA sample and labeling such molecules with fluorescent molecules, increasing the cost and complexity. All of these approaches have major shortcomings and may require manual intervention and the output of the measurement that is not tied into the microfluidic control of the system.

Described herein are apparatuses, and in particular, microfluidic apparatuses, that can address these shortcomings.

SUMMARY OF THE DISCLOSURE

Described herein are microfluidic apparatuses (e.g., systems, devices, etc.) and methods for microfluidic detection of polynucleotide concentration. These apparatuses may include removable, single-use or reusable microfluidic members that may include one or more channels, chambers and/or substrates for performing microfluidic maneuvers. For example, the microfluidic member may be a microfluidic cartridge, microfluidic chips ("biochips") or the like and may be referred to herein as "cartridges". Any of these cartridges may be generally flat, planar structures that may be inserted, held and/or seated in a microfluidic driver apparatus that may oversee and control operations within one or more cartridges. The microfluidic driver apparatus may be referred to herein as a microfluidic path device and may include actuators, sensors, controllers (including control circuitry, processors, etc.). As will be described in detail below, the cartridges may be adapted to include one or more polynucleotide quantification regions that are adapted for optical sensing and quantification of polynucleotides, e.g., DNA, RNA (e.g., mRNA), etc. The polynucleotide quantification regions are configured for spectrophotometric readings by an emitter and detector which may be part of the microfluidic driver apparatus. The microfluidic driver apparatus may be further adapted to control activity of the microfluidic driver apparatus and cartridge based on feedback from the spectrophotometric readings.

For example, the apparatuses and methods described herein may be configured to quantify RNA and/or DNA produced within the microfluidic apparatus, e.g., within a cartridge driven by a microfluidic driver apparatus, via exponential biochemical reactions. These apparatuses may vary or control and regulate the output to correct for variations due to reagent, biochip or temperature imperfections. In particular, the methods and apparatuses described herein may microfluidically measure the concentration of RNA and/or DNA produced when the apparatus is operating and may control operation of the apparatus when making therapeutic mRNAs, including but not limited to mRNA vaccines. These methods and apparatuses may enable confirming the success of the various amplification and synthesis steps, pooling of multiple batches normalization of the output. This may also allow re-use and optimization of the cartridges. Repetition of the synthetic steps in the cartridge may produce a discrete output which would traditionally have required detailed quality analysis for release. Alternatively, the methods and apparatuses described herein may permit pooling of the outputs into a single batch, requiring only a single quality analysis process and also simplifying the manual sample collection and sorting. If the measured concentration of the RNA/DNA product per repetition is within nominal parameters the apparatus may automatically add it to the pool; if the concentration is outside the parameter range, it may be microfluidically diverted to a "test further" or "waste" container. This measurement-determined diversion may operator-driven or may be determined by the microfluidic system automatically.

These methods and apparatuses may also permit standardizing of the output. The complex biochemical processes to produce RNA and DNA may be sensitive to parameters such as reagent supply, temperature, and biomolecule stability; the production yield may vary. Stabilizing the output may remove a measurement and dilution/concentration step between the DNA/RNA production and the next step in the therapeutic material production process. To stabilize the output the methods and apparatuses described herein may select a low target-concentration and may dilute the output of the system, so it is in a more controlled range. To perform this dilution automatically we would need to know the pre-dilution concentration of the DNA/RNA and use it to determine the amount of dilutant to add.

The methods and apparatuses described herein may also permit automated microfluidic RNA/DNA production to be iteratively improved for greater control. For example, once the processes being performed by the apparatus (e.g., in the cartridge) is demonstrated to be in tight control, with regular and consistent output concentration, product may be released without the necessity of performing detailed analytics. Instead, a "parametric release" may be performed, in which it is demonstrated that process proceeded nominally, using metrics such as temperature, reagent-consumption and intermediate RNA/DNA concentration.

In general, described herein are cartridges ("biochips") that are adapted specifically to allow an automated or semi-automated system, e.g., a microfluidic driver apparatus, to determine the concentration of a therapeutic polynucleotide that is processed (e.g., formed, mixed, compounded) in the cartridge and/or to modify operation of the microfluidic driver apparatus on the cartridge based on the determined concentration. For example, described herein are cartridges (e.g., cartridge devices) for processing a polynucleotide that include: a first layer having a first thickness; a second layer having a second thickness; an elastic material extending between the first layer and the second layer and separating the first layer from the second layer by a separation thickness; and a UV measurement region formed through the first and second layers, wherein a region of the first layer in the UV measurement region has a thickness that is less than the first thickness, a region of the second layer the UV measurement region has a thickness that is less than the second thickness, and wherein the elastic material is absent from between the region of the first layer in the UV measurement region and the region of the second layer the UV measurement region to form a UV measurement chamber having the separation thickness. A therapeutic polynucleotide may refer to a solution (e.g., an aqueous solution) of a polynucleotide.

Any of these cartridges may be formed of a polymeric material, such as a cyclic olefin copolymer (COC) material or a cyclo olefin polymer, COP. Although these materials are not very UV transmissive and may (as surprisingly found herein) change their UV transmission properties with UV exposure, the methods and apparatuses described herein may adapt or adjust to allow sensitive and accurate estimates for UV absorption and therefore concentration of a polynucleotide (e.g., therapeutic polynucleotide). The first layer and the second layer may be formed of the same material or of different materials. For example, the second layer may comprise a COC material and/or a COP material.

For example, the first thickness may be between about 0.1 mm and about 5 mm, and the second thickness may be between about 0.1 mm and about 5 mm. The first layer and the second layer may have the same thickness or may have different thicknesses.

The elastic material, or multiple pieces of elastic material, may be sandwiched between the first layer and the second layer (additional layers may be included, above or below the first and second layer). The elastic material may form a layer. The elastic material may be held directed between these two layers and may adhesively and/or mechanically held between the first and second layers. The separation thickness may be between 1 mm and 0.1 mm. The thickness of the elastic layer may be uniform or non-uniform.

The path length for the UV sensing region may be relatively short and may be approximately the same as the separation thickness, as the UV sensing chamber may be formed in a space between the first and second layers from which the elastic material is absent. The elastic material may therefore surround the UV sensing chamber (on the lateral sides of the UV sensing chamber). A cartridge may have one or more UV sensing chamber. In some examples the UV sensing chamber is in a consistent location on a variety of different cartridge designs or configurations.

In general, any of these cartridges may include one or more fluid channels in the second layer that are fluid communication with the UV measurement chamber. The fluid channels may be formed by milling, cutting, etc., from the upper surface of the second layer and may be covered at least in part by the elastic material/layer. In some examples the fluid channels (also referred to herein as fluidic channels) are tunned within the second layer. The second layer may be formed by multiple sub-layers.

The cartridge device may also include a plurality of pneumatic valves arranged to control flow into and out of the UV measurement chamber. The plurality of pneumatic valves may each be formed by a pneumatic chamber in the first layer and a fluid chamber in the second layer; a portion or region of the elastic material that separates the pneumatic chamber from the fluid chamber may be moved up/down to open/close (or remain open in the neutral position) the fluid chamber which may be in fluid communication with the fluid channels and/or other fluid chambers in the cartridge. The pneumatic chamber of each valve may be in fluid communication with a pneumatic channel in the first layer that is configured to communicate with a pressure port on an outer region of the device to actuate the pneumatic valve (e.g., to move the region of the elastic member between the pneumatic chamber and the fluid chamber). The fluid chamber may be in fluid communication with the UV measurement chamber through a fluid channel in the second layer (e.g., so that fluid may flow between the fluid chamber and the UV measurement chamber when the pneumatic valve is open).

Any of these cartridges may include an in vitro transcription (IVT) chamber formed at least partially within the second layer and in fluid communication with the UV measurement chamber. The cartridges may also include one or more mixing chambers (mixers), reaction chambers, etc. In general, the microfluidic driver apparatus may include one or more thermal control elements (e.g., Peltier devices, heater/coolers, etc.) for controlling the temperature of one or more regions of the cartridge.

In general, the cartridge devices may include one or more vacuum ports on an outer region of the device configured to couple to a source of negative pressure to draw fluid into and/or out of the UV measurement chamber (e.g., to a waste port and/or waste chamber). For example, the apparatus may be configured to hold a vacuum within the UV measurement chamber so that when a valve is opened to a chamber or channel holding the therapeutic polynucleotide (e.g., generally, a solution including the therapeutic polynucleotide), the resulting negative pressure may pull the therapeutic polynucleotide into the UV measurement chamber.

Any of these cartridge devices may include a first inlet channel within the second layer that is in fluid communication with a first chamber configured to hold a polynucleotide sample fluid, and a second inlet channel within the second layer that is in fluid communication with a second chamber configured to hold a blank sample fluid.

Any of these cartridges may also be configured for serial mixing of solutions. For example, any of these cartridges may include more dilution mixing chambers in fluid communication with UV measurement chamber configured to dilute a fluid sample.

In any of these examples, the cartridge may be configured to prevent bubbles from being present in the sensing region of the UV measurement chamber (so that they will not interfere with the UV detection of the therapeutic nucleotide absorption signal). In some examples the UV measurement chamber may include an undercut region, e.g., under the thicker regions of the first and second layer (outside of the thinned regions of the first and second layer), surrounded by the elastic material. Thus, the diameter of the UV measurement chamber may be greater than a diameter of the region of the first layer in the UV measurement region (and greater than a diameter of the region of the second layer in the UV measurement region) to prevent bubbles in a central region of the UV measurement chamber.

For example, a cartridge device for processing a polynucleotide may include: a first layer comprising a polymeric material having a first thickness; a second layer comprising a polymeric material having a second thickness; an elastic material extending between the first layer and the second layer; an ultraviolet (UV) measurement region formed through the first and second layers, wherein a region of the first layer in the UV measurement region has a thickness that is less than or equal to the first thickness, a region of the second layer the UV measurement region has a thickness that is less than or equal to the second thickness, and wherein the elastic material is removed from between the region of the first layer in the UV measurement region and the region of the second layer the UV measurement region to form a UV measurement chamber; and an in vitro transcription (IVT) chamber formed at least partially within the second layer and in fluid communication with the UV measurement chamber.

Also described herein are methods of using any of these cartridges with any of the microfluidic driver apparatuses described herein. In general, these methods include on-cartridge ("closed path") detection and determination of the concentration of the therapeutic polynucleotide. Any of these methods may also include techniques for optimizing or enhancing detection, including adjusting one or more parameter of the microfluidic driver apparatus based on feedback from the detected concentration (e.g., from the detected UV absorption signal) for the therapeutic polynucleotide, or from a differential signal between the UV absorption signal for the therapeutic polynucleotide signal and one or more blanks.

For example, described herein are method for manufacturing a polynucleotide using a microfluidic driver apparatus operating on a cartridge, the method comprising: forming, in a cartridge, a therapeutic polynucleotide; and determining, by the microfluidic driver apparatus, a concentration of the therapeutic polynucleotide by: driving a first blank solution into an ultraviolet (UV) measurement chamber of the cartridge and taking a first absorption measurement through the cartridge, driving a sample solution of the therapeutic polynucleotide into the UV measurement chamber of the cartridge and taking a second absorption measurement through the cartridge, driving a second blank solution into the UV measurement chamber of the cartridge and taking a third absorption measurement through the cartridge, and estimating a concentration of the therapeutic polynucleotide from the first, second and third absorption measurements.

As mentioned, any of these methods may include adjusting, in a processor of the microfluidic driver apparatus, the operation of the microfluidic driver apparatus based on the estimated concentration of the therapeutic polynucleotide. For example, adjusting may include directing the resulting therapeutic polynucleotide into a pool for additional therapeutic polynucleotide. The additional therapeutic polynucleotide may also be formed in the cartridge. In some examples the adjusting the operation of the microfluidic driver apparatus may include modifying the synthesis (formation) of the therapeutic polynucleotide, including during the amplification steps, in which a sample may be removed and tested.

For example, any of these methods may include comparing, by a processor of the microfluidic driver apparatus, the estimated concentration of the therapeutic polynucleotide to a concentration range, and based on the comparison, directing the therapeutic polynucleotide for one of: pooling with one or more additional batches of therapeutic polynucleotide formed in the cartridge, waste, or further analysis.

In some examples, the method may include diluting, under the control of a processor of the microfluidic driver apparatus, the therapeutic polynucleotide to a standard concentration for output. Thus, the microfluidic driver apparatus (e.g., the controller of the microfluidic driver apparatus) may use the determined concentration and/or an estimate of the volume (which may be, e.g., optically sensed and/or based on the known volume of the chambers and/or channels of the cartridge) to add fluid to achieve a target concentration.

In some examples, the methods may include automatically (or semi-automatically, e.g., with user confirmation, input, or modification) adjusting one or more parameters of the formation of the therapeutic polynucleotide by the microfluidic driver apparatus based on the estimated concentration of the therapeutic polynucleotide. Examples of the one or more parameters may include one or more of: temperature, reagent volume(s), reagent concentration(s) and/or amount, reaction time, mixing amount and/or time, etc.

In general, the apparatuses and methods described herein may be configured to automatically adjust so that an accurate concentration may be determined. For example, the methods and apparatuses described herein may be configured to prevent saturation, for example where minimal UV light is absorbed by the therapeutic polynucleotide, improve the limit of detection when the concentration is too high, low sensitivity or reduced background noise, e.g., in which absorption by the walls of the UV measurement chamber (first and/or second layers). For example, modulating the light power, detector sensitivity or in some methods and apparatuses serial dilutions of the therapeutic polynucleotide may be made to generate a graph of the absorption by dilution. Thus, any of these methods may include determining the concentration of the therapeutic polynucleotide may include performing serial dilutions within one or more chambers of the cartridge under the control of the microfluidic driver apparatus and repeating the steps of driving the sample solution of the therapeutic polynucleotide for each of one or more dilutions formed by the serial dilutions to generate a dilution curve. Further, estimating the concentration of the therapeutic polynucleotide may comprise estimating the concentration of the therapeutic polynucleotide from the dilution curve.

In any of these methods, estimating the concentration of the therapeutic polynucleotide may comprise changing one or more of the sensitivities of a UV detector and the intensity of a UV emitter (e.g., UV light source) of the microfluidic driver apparatus in response to the second absorption measurement through the cartridge. The method or apparatus may include automatically adjusting either or both the sensitivity of a UV detector and the intensity of a UV emitter based on the detected absorption measurement of the sample including the therapeutic polynucleotide. Thus, any of these apparatuses and methods may automatically, semi-automatically (e.g., with user input) and/or manually adjust the LED intensity based on the detector reading. In some examples the apparatus of methods may adjust the LED intensity and/or detector sensitivity during the measurement (on the fly) which may extend the dynamic range.

Any of the methods described herein may include pre-treating the UV measurement chamber with UV light prior to taking the first absorption measurement through the cartridge. As described herein, the absorption profile of the material forming the chamber has surprisingly been found to change with the amount of UV light applied over time. Surprisingly, the absorption of the cartridge material (e.g., COC, COP, and other polymers) may actually decrease initially (e.g., within the first 60 minutes, 55 minutes, 50 minutes, 45 minutes, 40 minutes, 35 minutes, 30 minutes, etc.) resulting in an increase in the detection signal. As readings from a particular cartridge may be short (e.g., within 5 minutes or less, 4 minutes or less, 3 minutes or less, 2 minutes or less, 1 minute or less, 50 seconds or less 45 seconds or less, 30 seconds or less, 20 seconds or less, etc.) it may be beneficial to pre-treat the material in order to provide readings with larger detection signals. Also, the absorption of the materials may increase with further Gamma irradiation, hence the methods and apparatuses described herein may include features to improve or increase the transmission through the material, e.g., but thinning the materials in the UV measurement area to improve transmission of UV light.

Any of these methods may also include performing an in vitro transcription (IVT) reaction to form the therapeutic polynucleotide, and/or generating, in the cartridge, a template for the IVT reaction. In any of these methods the therapeutic polynucleotide comprises a therapeutic mRNA. Any of these methods may also include encapsulating the therapeutic mRNA with a delivery vehicle in the cartridge.

In general, the microfluidic driver apparatus may oversee the steps of driving the first sample (e.g., blank), driving the second sample (e.g., a sample of interest) and driving the third sample (e.g., a second blank) by pneumatically deflecting one or more regions of a membrane of the cartridge to open and/or close valves of the cartridge due to the higher pressure on the blank or sample fluids and/or by creating vacuum in the UV measurement chamber before opening the valves. For example, the method may include having the microfluidic driver apparatus pneumatically deflect one or more regions of the membrane of the cartridge to drive the first blank solution, the second blank solution and/or the sample solution into the UV measurement chamber.

For example, a method for manufacturing a polynucleotide using a microfluidic driver apparatus operating on a cartridge may include: forming, in a cartridge, a therapeutic polynucleotide, wherein the therapeutic polynucleotide comprises a therapeutic mRNA; determining, by the microfluidic driver apparatus, a concentration of the therapeutic mRNA by: driving a first blank solution into an ultraviolet (UV) measurement chamber of the cartridge and taking a first absorption measurement through the cartridge, driving a sample solution of the therapeutic polynucleotide into the UV measurement chamber of the cartridge and taking a second absorption measurement through the cartridge, driving a second blank solution into the UV measurement chamber of the cartridge and taking a first absorption measurement through the cartridge, and estimating a concentration of the therapeutic polynucleotide from the first, second and third absorption measurements; and adjusting, in a processor of the microfluidic driver apparatus, the operation of the microfluidic driver apparatus based on the estimated concentration of the therapeutic polynucleotide.

Also described herein are apparatuses (e.g., systems), which may include microfluidic driver apparatuses, configured to perform these methods. Any of these systems may include software, hardware and/or firmware for performing these methods. In particular, any of these systems may include a controller with control circuitry, including one or more processors, for coordinating the actions (and performing these methods) described herein, including in particular estimating the concertation of the therapeutic polynucleotide. Any of these controllers may include non-transitory computer-readable storage medium storing a set of instructions that may be performed by the system.

For example, described herein are systems for forming and/or manufacturing a polynucleotide, or in some examples for forming a therapeutic polynucleotide, such as (but not limited to) a therapeutic mRNA. Any of these systems may include: a cartridge mount; a plurality of pressure lines; a plurality of fluidic lines, each coupled with or configured to couple with a fluid source, wherein each fluidic line and at least a subset of the pressure lines are configured to be secured to inlet or outlet ports on a cartridge held in the seating mount; an ultraviolet (UV) light source; a UV light detector; and a controller configured to control the application of pressure through the pressure lines to drive fluid through the cartridge, wherein the controller is further configured to direct the formation of a therapeutic polynucleotide in the cartridge, and to estimate a concentration of the therapeutic polynucleotide by driving a first blank solution through a UV measurement chamber of the cartridge and taking a first absorption measurement using the UV light source and UV light receiver, driving a sample solution including the therapeutic polynucleotide through the UV measurement chamber of the cartridge and taking a second absorption measurement using the UV light source and UV light receiver, and driving a second blank solution though the UV measurement chamber of the cartridge and taking a third absorption measurement using the UV light source and UV light receiver, further wherein the controller is configured to estimate the concertation of the therapeutic polynucleotide from the first, second and third absorption measurement.

The controller may be further configured to modify the operation of the system based on the estimated concentration of the therapeutic polynucleotide. For example, the controller may be further configured to compare the estimated concentration of the therapeutic polynucleotide to a concentration range and, based on the comparison, to direct the therapeutic polynucleotide for one of: pooling with one or more additional batches of therapeutic polynucleotide formed in the cartridge, waste, or further analysis. The controller may be configured to dilute the therapeutic polynucleotide to a standard concentration for output. In some examples the controller is configured to automatically adjust one or more parameters of the formation of the therapeutic polynucleotide based on the estimated concentration of the therapeutic polynucleotide. The one or more parameters may include one or more of: temperature, reagent volume, reagent concentration, time, and mixing.

The controller may be further configured to perform serial dilutions within one or more chambers of the cartridge and repeat the steps of driving the sample solution of the therapeutic polynucleotide for each of one or more dilutions of the sample solution of the therapeutic polynucleotide formed by the serial dilutions to generate a dilution curve. The controller may be configured to estimate the concentration of the therapeutic polynucleotide from the dilution curve. Alternatively, or additionally, the controller may be configured to change one or more of the sensitivity of the UV detector and the intensity of the UV light source in response to the second absorption measurement through the cartridge.

The controller may be configured to pretreat the UV measurement chamber with UV light prior to taking the first absorption measurement through the cartridge.

The controller may be further configured to form the therapeutic polynucleotide comprises performing an in vitro transcription (IVT) reaction to form the therapeutic polynucleotide. In some examples the controller is further configured to generate, in the cartridge, a template for the IVT reaction. In general, the therapeutic polynucleotide may be a therapeutic mRNA. The controller may be configured to encapsulate all or a portion of the therapeutic mRNA withing a delivery vehicle.

The controller may be further configured to pneumatically deflect one or more regions of a membrane of the cartridge to open and/or close valves of the cartridge when driving the first blank, driving the second blank and driving the third blank. In some examples the controller is further configured to pneumatically deflect one or more regions of the membrane of the cartridge to drive the first blank solution, the second blank solution and/or the sample solution into the UV measurement chamber. In some examples the driving force could be applied by providing pressure on the upstream sample and blank lines or through a vacuum suction in the UV chamber that draws (e.g., "sips") sample material (e.g., sample of interest and/or blank) in the UV chamber.

In general, the systems described herein may be configured to include one or more cartridges and a microfluidic driver apparatus. For example, a system may include: a cartridge; and a microfluidic driver apparatus comprising: a cartridge mount; a plurality of pressure lines; a plurality of fluidic lines, each coupled with or configured to couple with a fluid source, wherein each fluidic line and at least a subset of the pressure lines are configured to be secured to inlet or outlet ports on a cartridge held in the seating mount; an ultraviolet (UV) light source; a UV light detector; and a controller configured to control the application of pressure through the pressure lines to drive fluid through the cartridge, wherein the controller is further configured to direct the formation of a therapeutic polynucleotide, further wherein the controller is configured to estimate a concentration of the therapeutic polynucleotide by driving a first blank solution through a UV measurement chamber of the cartridge and taking a first absorption measurement using the UV light source and UV light receiver, driving a sample solution including the therapeutic polynucleotide through the UV measurement chamber of the cartridge and taking a second absorption measurement using the UV light source and UV light receiver, and driving a second blank solution though the UV measurement chamber of the cartridge and taking a third absorption measurement using the UV light source and UV light receiver; modifying the operation of the microfluidic driver apparatus based on the concertation of the therapeutic polynucleotide determined from the first, second and third absorption measurement.

All of the methods and apparatuses described herein, in any combination, are herein contemplated and can be used to achieve the benefits as described herein.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which:

FIGS. 15A and 15B are graphs showing the range of intensity adjustment of an example of a UV light source (FIG. 15A) and resulting light intensity (FIG. 15B).

FIG. 16A is a graph showing detected signal (measured as voltage output from the UV detector) for a blank, a first sample, a blank, a third sample, a fourth sample and a blank. FIG. 16B is a graph showing a comparison between a standard concentration detection system and a system as described herein.

DETAILED DESCRIPTION

Figure 1:
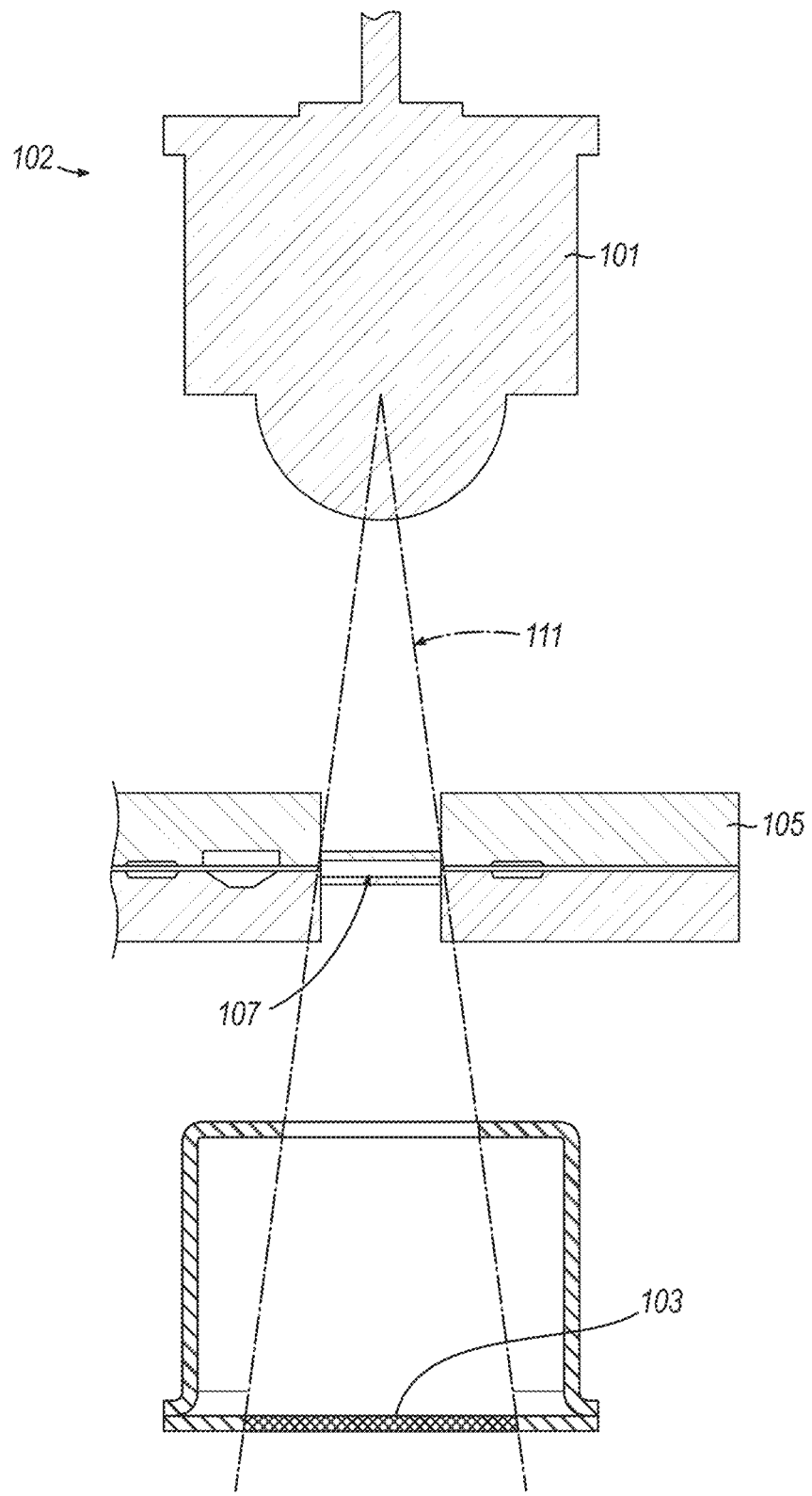
FIG. 1 schematically illustrates a UV measurement of a polynucleotide material within a UV measurement region of a cartridge by a microfluidic driver apparatus including a UV light source and a UV detector.

The apparatuses and methods described herein may be used to make and/or process polynucleotides, and in particular therapeutic polynucleotides, such as therapeutic mRNAs. These method and apparatuses may measure the concentration of RNA or DNA as part of an integrated, closed-path system and the resulting concentrations may be used to modify the processing of the polypeptide. Light absorption, and specifically ultraviolet (UV) transmission through a UV measurement region of a closed cartridge may be used to estimate the concentration of a polynucleotide within the closed cartridge. The cartridge may be adapted to have a narrow path length and optimize the signal from absorption of UV light by the polynucleotide sample. Also described herein are microfluidic driver apparatuses for operating on these cartridges. These systems may control operations within the closed cartridge for forming and/or processing (e.g., compounding) therapeutic polynucleotides, including determining the concentration of the therapeutic polynucleotide at various stages of the in-cartridge processing, and further including using the concentration data, either directly or based on the UV absorption date proportionate to the concentration of the therapeutic polynucleotide, to control operation of the microfluidic driver apparatus on the cartridge.

In general, the methods and apparatuses described herein may use UV absorbance techniques to measure polynucleotide (e.g., RNA, and/or DNA) concentrations on the cartridge. These techniques may compare the levels (in some examples, the ratio) of the transmitted UV light at a wavelength between about 250-270 nm (e.g., centered at about 260 nm) from a polynucleotide sample (e.g., a sample of a therapeutic polynucleotide) to one or more "blank" solution taken immediately before, immediately after, or both. Based on the absorption of UV light by polynucleotides, and on the pathlength of the UV light through the fluid (e.g., the sample or blank), the apparatus or method may determine the concentration of the polynucleotide.

These apparatuses (and associated methods) are particularly compact and may use readily available and easy-to-manufacture materials, including polymeric materials (e.g., plastics) that themselves absorb UV light. These methods and apparatuses may also tightly control the path length, and the path length ("critical path length") may be relatively small (e.g., 1 mm or less, e.g., 0.5 mm, 0.4 mm, 0.2 mm, 0.1 mm, etc.), allowing for sampling of very small volumes while achieving high accuracy and extended dynamic range. These methods and apparatuses may also adapt to a large dynamic range of concentrations and noise levels by adjusting the dilution of the sample and/or by adjusting the intensity of the UV light source and/or the sensitivity of the UV detector. This adjustment may be done automatically, semi-automatically, or manually. In general, these methods and apparatuses may use a cartridge that is disposable or limited-use, with a durable/reusable microfluidic driver apparatus that operates on the cartridge. However, any of these techniques may be adapted for use with a reusable cartridge and/or a cartridge-less system that integrates the features of the cartridge into the microfluidic driver apparatus.

In any of these methods and apparatuses, the sample (e.g., the polynucleotide sample) may be microfluidically driven to a UV measurement chamber that minimizes the amount of UV-absorbing material (e.g., plastic) in the light path while still being made from a relatively UV absorbing material. The measurement chamber may set the critical path length of the light through the sample, which may be fixed. A UV light source and detector may be positioned on either side of the measurement chamber when the cartridge is seated in the microfluidic driver apparatus. The light path may be perpendicular to the cartridge. For example, FIG. 1 schematically illustrates an example of a microfluidic driver apparatus 102 operating on a cartridge 105. The microfluidic driver apparatus includes a UV light source (e.g., UV LED 101) that is positioned above the cartridge 105, and a UV detector 103 positioned directly under it. Alternatively, or additionally a fiber optic may be used as one or both of the detector and emitter (light source) to transmit and collect light. The light source transmits a UV light beam 111 that may be configured to contact a detection region within the measurement chamber 107. In any of these examples the light source and detector may be spaced apart so that the beam (which in some examples is conical but may be collimated) interrogates just a defined region of the UV measurement region, so that the volume of sample in the short light path is known by the system.

Apparatus

Figure 2A:
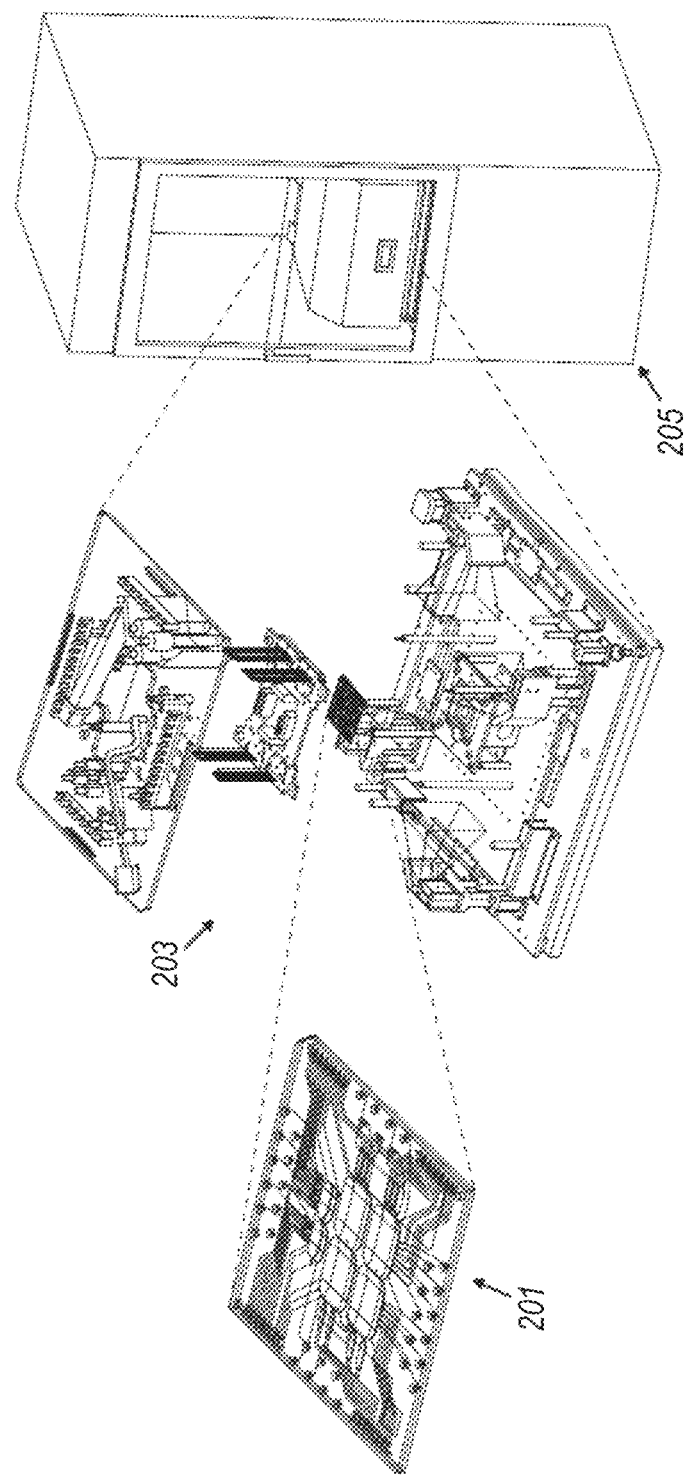
FIG. 2A illustrates one example of an apparatus including a microfluidic driver apparatus control system as described herein, which may be configured to determine polynucleotide concentration and modify activity of the microfluidic driver apparatus based on the determined concentration.

The methods described herein may generally be performed using an apparatus that may be used with and/or may include one or more cartridges (e.g., biochips), and a system (e.g., a microfluidic control system) that is configured to control operations in the cartridge. These microfluidic control systems may be referred to herein as microfluidic apparatuses, microfluidic control apparatuses, microfluidic driver apparatus control system, microfluidic control systems, or microfluidic systems. A cartridge may be placed within the microfluidic control system and may operate in a closed path manner that prevents exposure of the component parts of some, or more preferably nearly all or all of the manufacturing components within the system to the atmosphere. In particular, the portions of the apparatus that contact the fluid(s) within the system are prevented from exposure to atmosphere. FIG. 2A shows one example of a microfluidic driver apparatus control system that includes: a microfluidic driver apparatus management system 203 (including hardware for holding the cartridge, applying positive/negative pressure to operate microfluidic operations in the cartridge, heating/cooling all or regions of the microfluidic driver apparatus, detecting one or more features from the cartridge and/or recording operations performed on the one or more cartridges), a controller (not shown), and a refrigerated container 205 (e.g., an ISO class 5 cabinet). This system may be used or may include one or more cartridge 201. These cartridges may be any of the cartridges described herein, any of which may include one or more UV measurement regions.

A microfluidic apparatuses may be microfluidic apparatuses for forming a therapeutic polynucleotide (e.g., an mRNA therapeutic). The apparatus may include: a mount for removably holding a cartridge, a plurality of pressure lines; a plurality of fluid vials, wherein each fluid vial either comprises a fluidic line or is configured to couple with the fluidic line, wherein each fluidic line and at least a subset of the pressure lines are configured to be biased against the cartridge held in the seating mount to form a closed fluid path; and a controller configured to control the application of pressure through the pressure lines to drive fluidic movement in the cartridge when the cartridge is held in the mount, wherein the controller is configured to direct the synthesis of a synthetic template, direct an in vitro transcription (IVT) reaction using the template to form a therapeutic polynucleotide, and estimate the concentration of therapeutic polynucleotide, and/or direct purification of the therapeutic polynucleotide in one or more cartridges held in the seating mount. Any of these apparatuses may include an optical or UV concentration detection sub-system including one or more UV light sources and one or more UV detectors that are configured to be positioned over a UV detection region of a cartridge when the cartridge is held by or seated in the apparatus.

A microfluidic apparatus (e.g., a microfluidic apparatus for forming a therapeutic polynucleotide, such as a therapeutic mRNA) may include: a mount (e.g., a seating mount) for removably holding a cartridge; a plurality of pressure lines; a plurality of fluid vials, wherein each fluid vial either comprises a fluidic line or is configured to couple with the fluidic line, wherein each fluidic line and at least a subset of the pressure lines are configured to be biased against the cartridge held in the seating mount to form a closed fluid path; and a controller configured to control the application of pressure through the pressure lines to drive fluidic movement in the cartridge when the cartridge is held in the seating mount, wherein the controller is configured to determine the contents of the fluid vials, transfer sub-microliter amounts of material from the fluid vials to one or more reactors in the cartridge held in the seating mount, direct the synthesis of a synthetic template, direct an in vitro transcription (IVT) reaction using the template to form a therapeutic polynucleotide, direct purification of the therapeutic polynucleotide in one or more microfluidic driver apparatuses held in the seating mount and detect a concentration of the therapeutic polynucleotide and/or modulate the activity of the apparatus based on the concentration.

The controller may be configured to perform any of the method described herein, an in particular may be configured to receive inputs (e.g., optical input, pressure input, temperature/thermal input, UV absorption input, etc.) and process the input to control movement of fluid in the microfluidic driver apparatus, temperature (including thermocycling) of various regions of the microfluidic driver apparatus, rinsing/combining, opening/closing of valve of the microfluidic device, detection of the microfluidic device, etc. The controller may include one or more microprocessors, communication circuitry, memory, etc. The controller may comprise firmware, hardware and/or software.

Any of these apparatuses may include a one or more (e.g., a plurality) of optical sensors arranged around the seating mount and reagent storage frame to monitor fluid levels within the reagent storage frame and fluidic movement in the microfluidic driver apparatus when the microfluidic driver apparatus is seated in the seating mount. Alternatively, or additionally, the optical sensor(s) may be present on the bottom of the apparatus (e.g., beneath the seating mount) and may be directed upwards to detect fluid amounts, movement, etc.).

As shown in FIG. 1, any of these apparatuses may include a UV detection sub-system including a UV light source and UV detector.

The methods and apparatuses described generally include one or more fluid power circuits to move material (liquid material) between the fluid chambers (depots, liquid-contacting sides, reactors, etc.) and channels of the microfluidic driver apparatus or within the microfluidic driver apparatus, and in some cases between the microfluidic driver apparatus and the fluid depots (vails, bottles, containers, etc.) within the apparatus. A fluid power circuit may be a hydraulic or pneumatic circuit that may include the microfluidic device, and in particular one or more pressure channels and pressure-receiving sides of the chambers in a microfluidic device. The fluid power circuits may also be referred to as microfluidic power circuits. A single microfluidic chip may include multiple fluid power circuits; the fluid power circuits may also include one or more pressure lines and the interface between the pressure lines of the microfluidic control apparatus and the one or more microfluidic chips within the microfluidic driver apparatus. One or more fluid power circuits may share components (valves, pressure lines, vacuum caps, etc.) with other, overlapping fluid power circuits. Furthermore, for the same of convenience, it should be understood that where the term "pneumatic" is used, a general fluid power circuit (e.g., hydraulic and/or pneumatic) may be used instead or additionally. The fluid material being driven by the fluid power line may be any appropriate fluid (e.g., gas or liquid, such as air, water, oil, etc.).

Also described herein are cartridges for processing therapeutic polynucleotides in a closed path (e.g., closed-path microfluidic driver apparatuses). As mentioned, these cartridges may be referred to herein as microfluidic chips, microfluidic path plate, process chips, biochips, process plates, etc. In general, the cartridges may be substantially flat plate-like structures; these structures may be relatively thin (e.g., less than a few mm thick, e.g., between about 0.5 and about 20 mm thick, between about 0.5 and about 15 mm thick, between about 0.5 and about 10 mm thick, etc.). The cartridges described herein may generally be at least partially transparent, and in particular, may be transparent on the top of the cartridges, so that one or more optical sensors (cameras, CCD, fiber optics, etc.) may be used to sense, detect, monitor, record, etc. action, including fluid movement and/or movement of the elastic layer, with the microfluidic driver apparatus as it is used by the microfluidic apparatuses described herein.

Figure 2B:
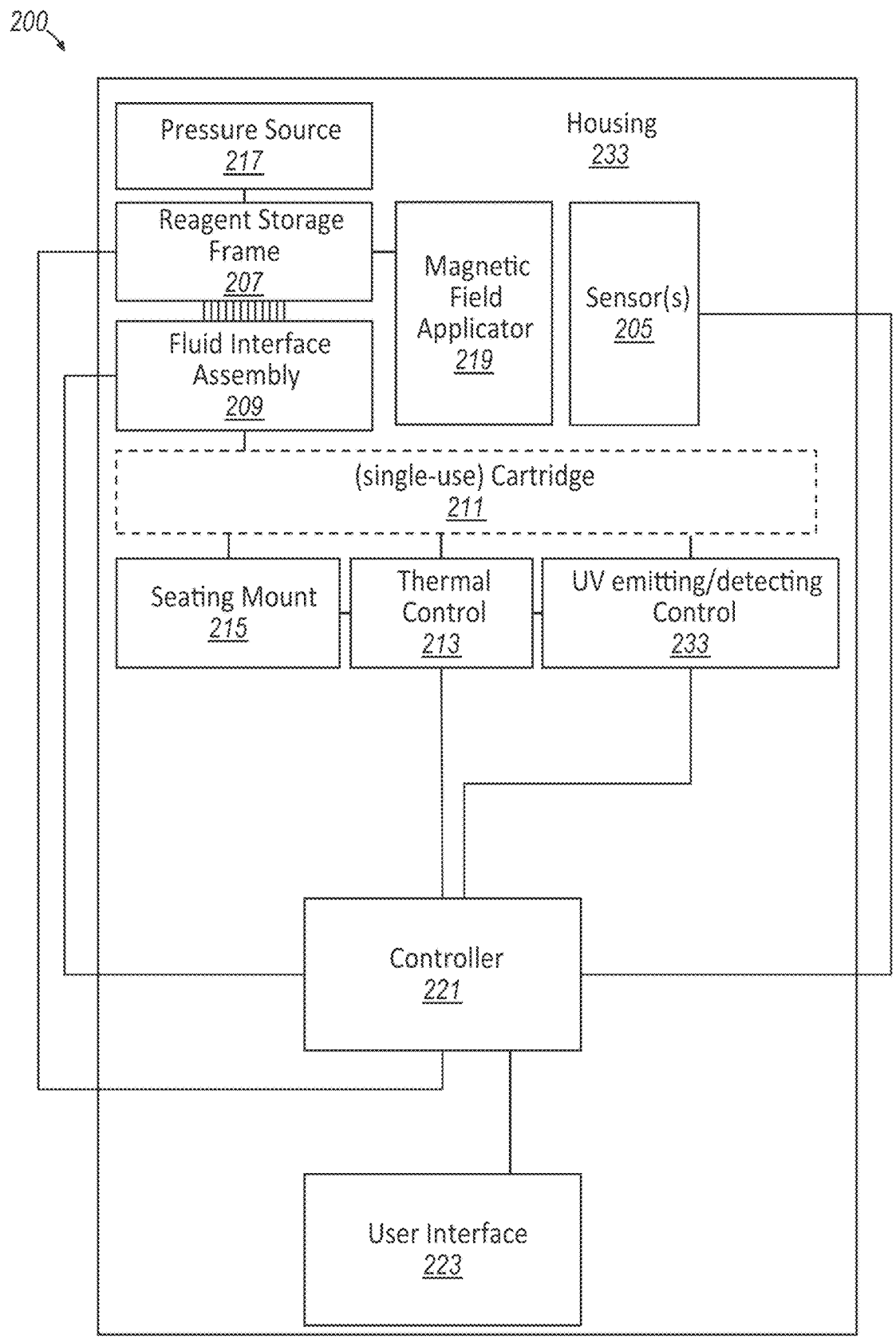
FIG. 2B schematically illustrates one example of a microfluidic driver apparatus control system that may be used as described herein.

FIG. 2B is a schematic illustration of one example of a microfluidic driver apparatus control system that may be used as described herein. In this example, the apparatus includes a housing 233 enclosing a mount 215 which can hold one or more cartridges 211, which may be single use devices. The housing may be a chamber, enclosure, or the like, which may include a lid or opening; when closed it may be sealed. The housing may enclose a thermal regulator and/or may be configured to be enclosed in a thermally regulated environment (such as a refrigeration unit, etc.). The housing may form an aseptic barrier. In some examples the housing may form a humidified or humidity-controlled environment.

The mount 215 may be configured to secure the cartridge using one or more pins or other components configured to hold the cartridge in a fixed and predefined orientation.

In some examples, a thermal control 213 may be located adjacent to the mount 215, to modulate temperature to the one or more cartridge 211. The thermal control may include a thermoelectric component (e.g., Peltier device) and/or one or more heat sinks for controlling the temperature of all or a portion of the cartridge. In some examples, more than one thermal control may be included, for separately regulating the temperature of one or more regions of the cartridge. The thermal control may include one or more thermal sensors (e.g., thermocouples, etc.) that may be used for feedback control of the microfluidic driver apparatus and/or thermal control.

In FIG. 2B, a fluidic interface assembly 209 couples the liquid reagents and/or pressure (e.g., gas) with a cartridge 211 held in the seating mount 215; and may assist in delivery of fluidic materials as well as positive/negative gaseous pressure, from the pressure source 217, to the interior of the cartridge 211. The fluid interface assembly may optionally assist in securing the cartridge(s), as described in greater detail below. The fluid interface assembly may be removable coupled to the apparatus (and may be removed or a portion may be removed) for sterilization between uses.

A reagent storage frame 207 may be configured to contain a plurality of fluid sample holders, each of which may hold a fluid vial configured to hold a reagent (e.g., nucleotides, solvent, water, etc.) for delivery to the cartridge 211 or, alternatively, a fluid vial may be configured to receive a product from the interior of the cartridge 211. The reagent storage frame may be referred to as a reagent rack. In some examples, the reagent rack includes a plurality of pressure lines and/or a manifold configured to divide one or more pressure sources 217 into a plurality of pressure lines that may be applied to the cartridge and may be independently or collectively (in sub-combinations) controlled. Alternatively, the fluid depots (vials, etc.) may be configured to directly secure and seal against the cartridge(s).

The fluid interface assembly may include a plurality of fluid lines and/or pressure lines and may include a biased (e.g., spring-loaded) holder or tip that individually and independently drives each fluid and/or pressure line to the cartridge when it is held in the mount 215 (or, as mentioned, alternatively the device may directly be spring-mounted). The tubing, e.g., the fluid lines and/or the pressure lines, may be part of the fluid interface assembly and or may connect to the fluid interface assembly. In some examples the fluid lines comprise a flexible tubing that connects between the reagent storage frame, via a connector that couples the vial to the tubing in a locking engagement (e.g., ferrule) and the cartridge. The ends of the fluid paths, in some examples the ends of the fluid lines/pressure lines, may be configured to seal against the cartridge, e.g., at a sealing port formed in the cartridge, as described herein. For example, the ends of the fluid lines may cut or formed to be flat (perpendicular inside view). The vials may be pressurized (e.g., >about 1 atm pressure, such as about 2 atm, about 3 atm, about 5 atm, etc.) to via the connector which may also connect to the pressure source. For example, the fluid vials may be pressurized to between about 1 and about 20 psig (e.g., about 5 psig, about 10 psig, about 20 psig, etc.). Negative or positive pressure may be applied; for example, a vacuum (e.g., about-7 psig or about 7 psia) may be applied to draw fluids back into the vials (e.g., the depots) at the end of the process. In general, the fluid vials may be driven at lower pressure than the pneumatic valves, which may prevent or reduce leakage. In some examples the difference in pressure between the fluid and pneumatic valves may be between about 5 psi (e.g., about 7 psi, about 10 psi, about 12 psi, about 15 psi, about 20 psi, etc.).

Each vial may be coded (e.g., by an identifier that may be read by one or more sensors, as described below). The controller may monitor the fluid level and therefore the amount of each material in the fluid interface assembly.

The apparatus may also include a magnetic field applicator 219, which may be configured to create a magnetic field at a region of the cartridge 211. One or more sensors 205, which may be optical sensors, may be part of the apparatus, and may sense one or more of a barcode, a fluid level within a fluid vial held within the reagent storage frame, and fluidic movement within the cartridge 211 when the device is mounted within the mount 215.

Any of these apparatuses may include a UV emitting/detecting subsystem (e.g., concentration estimation subsystem 233) which may make measurements of the absorption of UV light (e.g., at about 260 nm) and may control process on the device based on these measurements, e.g., by measuring one or more 'blanks' without polynucleotides and comparing to a sample with the processed polynucleotide. In some examples visual/optical markers may be used to estimate yield. For example, fluorescence may be used to detect process yield or residual material by tagging with fluorophores. Alternatively, or in addition, dynamic light scattering may be used to measure particle size distributions within a portion of the microfluidic driver apparatus (e.g., such as a mixing portion). In some examples, the sensor measurements may be done using one or two optical fibers to convey light (e.g., laser light) in and detect an optical signal coming out. An instrument package may be mounted remotely from the device. Such non-contact sensing may be preferred.

In any of the methods and apparatuses described herein, the sensors (e.g., video sensors) may record all activity on the cartridge (e.g., chip). For example, an entire run for synthesizing and/or processing a material (such as a therapeutic RNA) may be recorded by one or more video sensors, including a video sensor that may visualize the cartridge, e.g., from above. Processing on the cartridge may be visually tracked and this record may be retained for later quality control and/or processing. Thus, the video record of the processing may be saved, stored and/or transmitted for subsequent review and/or analysis.

The internal portion of the apparatus, e.g., within the housing 233, may be further configured to be sterilizable. In particular, portions of the apparatus may be removed and individually sterilized. Sterilization may be performed, e.g., by UV irradiation, or any other method of sterilization that may be required to limit contamination or to meet regulatory requirements. The apparatus including the housing may be housed within a High Efficiency Particulate Air (HEPA) filtered environment. The apparatus including the housing may be housed within a temperature controlled enclosure. In addition, the apparatus itself may include one or more regions that are temperature controlled. In any of the apparatuses described herein, the apparatus may include (e.g., within the housing) a temperature controlled region for storing reagents and/or for storing mRNAs (e.g., therapeutic mRNAs), e.g., at a storage temperature (e.g., a temperature between about-10 degrees C. and about 20 degrees C., such as about 10 degrees C., about 4 degrees C., about-10 degrees C., etc.). Any of these apparatuses may include a library of manufactured mRNAs that may be compounded individually or in combination with one or more additional mRNAs and a delivery vehicle.

As mentioned above, the microfluidic driver apparatus controller system may be controlled by controller 221, including to apply pressure through the cartridge 211 to at least drive fluidic movement. The controller may be completely or partially outside of the housing. The controller may be configured to include user inputs/outputs. For example, the user interface 223 of the system may permit easy operation and direction of the apparatus and cartridge (s).

Any of the apparatuses described herein may include all or some of the components shown in FIG. 2B; not all components may be necessary. In FIG. 2B, only some of the connections between components are shown; additional (or alternative) connections may be used.

A microfluidic driver apparatus control system may support all the production activities inside the microfluidic driver apparatus such as supply of reagents, fluid control, temperature control, mixing, purification and process monitoring. Manufacturing activities on the microfluidic driver apparatus control system may be accessed and controlled through application software.

The cartridge may be configured to include one or more reactors for the manufacturing operations which are performed to precisely prepare a therapeutic (e.g., a therapeutic mRNA) material. The same microfluidic driver apparatus may operate on one or more cartridge, either in series and/or in parallel, and without interrupting the continuous-path nature of the microfluidic driver apparatus control system. For example, when manufacturing a therapeutic using multiple processing operations performed in multiple reactors using multiple cartridges, the fluid product(s), including partial products from one cartridge may be transferred to one or more additional cartridge in a closed-path manner by the apparatus, including by moving fluid containing the cartridge product(s) into a storage depot portion of the microfluidic driver apparatus control device.

Figure 3C:
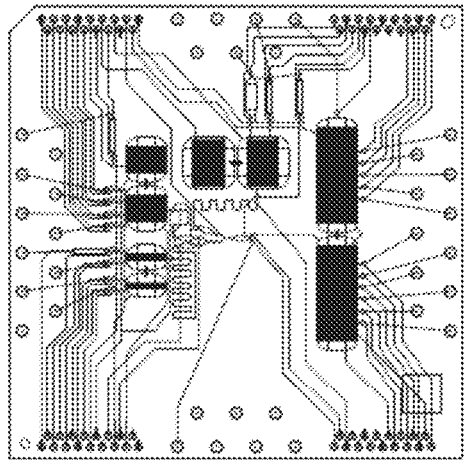
FIGS. 3A-3C illustrate example of cartridges for a microfluidic driver apparatus as described herein.
Figure 3B:
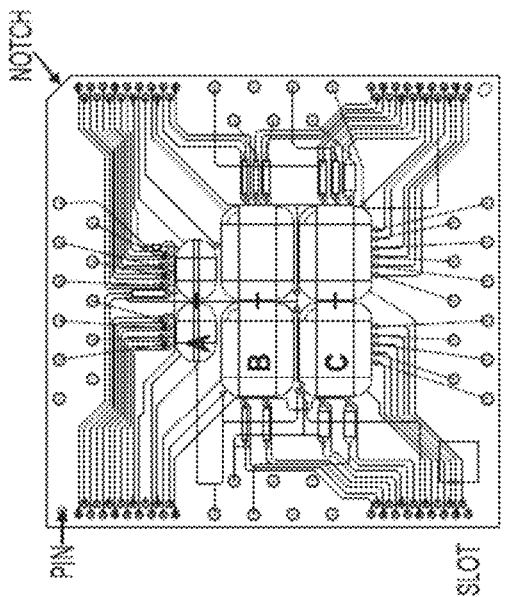
Figure 3A:
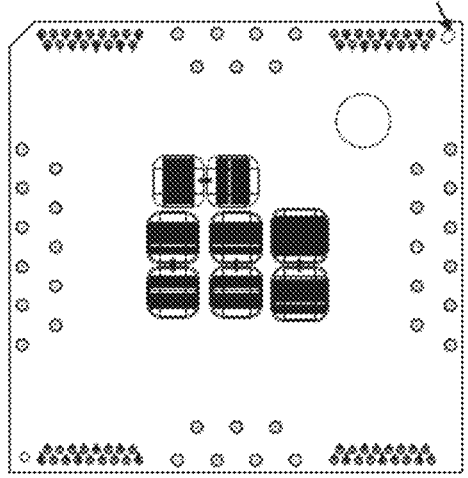

Each cartridge may be configured to include one or more reactors for processing during the manufacturing processes. For example, FIGS. 3A-3C illustrate three examples of cartridge. These examples illustrate three distinct types of cartridge: a template cartridge (FIG. 3A), an in vitro transcription (IVT) cartridge (FIG. 3B) and a formulation cartridge (FIG. 3C). Each of these cartridge examples may be configured to include features to perform a set of unit operations in a controlled and highly reproducible manner.

Figure 4A:
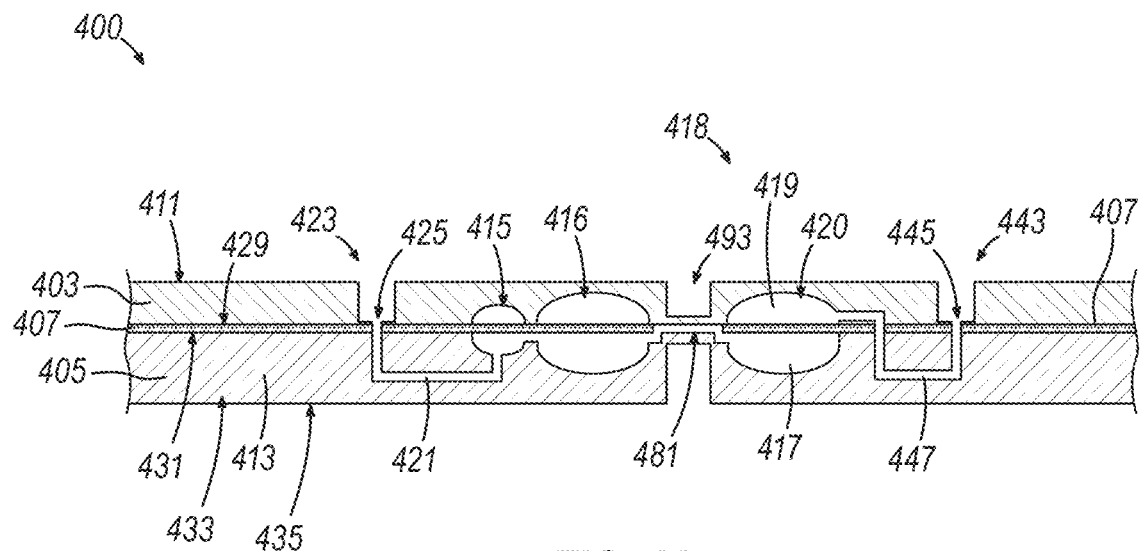
FIG. 4A is a section through a portion of one example of a cartridge for use with a microfluidic driver apparatus.

In some examples, a cartridge may be configured as multilayered structure composed of two more rigid layers with a flexible membrane sandwiched between the two ridged layers. FIG. 4A illustrates a sectional view (transverse to the plane of the cartridge) through one example of a cartridge having multiple layers that form the reactors for processing the therapeutic as described herein. The reactors may include seals, channels, valves, and chambers, including pumping chambers formed from the multiple layers. For example, a cartridge may be formed of two or more rigid or semi-rigid plates 403, 405 and at least one elastic layer 407. The elastic layer 407 may be a sheet of elastic material that is liquid impermeable. The elastic layer may be somewhat gas permeable or may be treated to be more or less gas permeable, including in various regions. Although a single continuous sheet of elastic material may be used, in some examples multiple elastic materials sheets may be used, or the 'sheet' may be formed of sections of multiple sheets. The layers and the elastic sheet may be laminated together. In general, chambers for holding, valving and/or pumping fluid may be formed in the plates on either side of the elastic layer so that the elastic layer bisects the chambers into a liquid containing side and a pressure (e.g., gas) applying side. The overall volume of chamber(s) may be constant and may be formed into both the first (e.g., upper) plate and the second (e.g., lower) plate, but this volume may be divided into the pressure side and the liquid side. By applying positive or negative pressure into the pressure side, the elastic sheet may be deformed to make reduce (down to zero, closing the chamber off) the volume of the liquid containing side or to increase the volume of the liquid containing side (to a predetermined maximum). The pressure applying side of the chamber may be connected, e.g., via a pressure port 443 in the upper plate (first layer) 403 connecting to a pressure channel 447, for applying negative or positive pressure to the pressure-receiving side 419 of one or more chambers. The liquid containing side 417 opposite the pressure-applying side of each chamber may be connected via a fluid channel 421 to a fluid port 423. Both the fluid port and the pressure port may be formed by an opening into the upper plate (upper layer) 403 and the elastic layer 407, allowing a sealed connection that is isolated from the atmosphere even when there are multiple different input lines as the pressure line is pushed into the elastic layer 407 that is supported on the underside of the port by the opposite rigid or semi-rigid layer(s), 405.

In FIG. 4A, the cartridge 400 includes a first (e.g., upper) layer (in this example, a plate) 403 having a first (e.g., top or upper) surface 411 and a second (bottom or lower) surface 429 and a thickness between the two. The first surface 411 may form an exposed outer surface. The cartridge also includes a second layer (e.g., plate) 405 having a first (e.g., upper or top) surface 431 and a second (e.g., lower or bottom) surface 433 and a thickness therebetween. An elastic layer 407 is sandwiched between the second surface 429 of the first plate 403 and the first surface 431 of the second plate 405. The layers shown in FIG. 4A may not be to scale (e.g., the elastic layer 407 may be thinner relative to the plates).

The cartridge 400 shown in FIG. 4A may also include a plurality of chambers 415, 416, 420 each having a fixed volume. These chambers are formed by cut-out regions (e.g., rounded/curved cuts) into the second (bottom) surface 429 of the first plate 403 and the first (upper) surface 431 of the second plate 405; the elastic layer 407 bifurcates these chambers 415 so that each includes a liquid containing side 417 and a pressure (e.g., gas containing) side 419. The cartridge 400 may also include multiple liquid (e.g., fluid) channels. In FIG. 4A, a single fluid channel 421 is shown extending from a fluid port 423 passing through the thickness of the first plate 403, to a fluid channel opening 425 through the elastic layer 407 and through much of the thickness of the second plate 405 down to the bottom region 433 of the second plate where a length of the liquid channel 421 running parallel to the bottom surface of the third plate is formed.

In regard to the fluid port 423, the diameter of the opening into the first plate 403 forming the fluid port 423, which extends through the thickness of the first plate, may be larger than the diameter of the fluid channel opening 425 which extends through the elastic layer 407 and into the liquid (e.g., fluid) channel 421. The fluid channel opening 425 may be centered relative to the bottom of the fluid port opening and may be offset from the walls of the fluid port opening by at least the expected wall thickness of the fluid line or fluid line coupling interface that will connect to the fluid port.

The fluid channel 421 connects to the liquid containing side 417 of a first chamber 415. This first chamber may be configured as a valve, which has a relatively low retaining volume (fixed volume) but can be fully opened or closed by the movement of the elastic layer 407.

The cartridge 400 also includes a plurality of pressure channels that may be independently controlled to apply positive and/or negative pressure. In FIG. 4A, a single pressure port 443 is shown, connected to the fourth chamber 420, although each of the chambers 415, 416 may be connected to a separate pressure port and pressure channel for independently operating and controlling the movement of the portion of the elastic layer 407 bifurcating these chambers, to valve, and/or pump each chamber independently. In some examples the pressure ports may be shared between multiple chambers. In FIG. 4A the pressure (e.g., gas) port 443 is similar to the fluid (e.g., liquid) port 425, and includes an opening completely through the first plate 403, down to the exposed elastic layer 407, to an opening through the elastic layer forming a pressure (e.g., gas) channel opening 445. The pressure channel opening 445 is continuous with a pressure (e.g., gas) channel 447 that extends from the pressure port 443, passing through much of the thickness of the first plate 403, and in a channel along the second plate and back up through the second plate and the elastic layer 407, to a region of the pressure channel within the first plate that connects to the pressure (e.g., gas) containing portion 419 of the fourth chamber 420. As described for the similar fluid (e.g., liquid) port, the diameter of the pressure port 443 passing through the thickness of the first plate 403 may be larger than the diameter of the pressure channel opening 445 through the elastic layer 407, and may be centered or offset by greater than the wall thickness of a pressure line or pressure line coupling interface that will connect to the pressure port.

In the section through a cartridge 400 shown in FIG. 4A, there are multiple connections to other fluid (e.g., liquid) lines, fluid ports, pressure lines and pressure ports that are not shown, as they may be out of the plane shown. For example, in FIG. 4A the liquid containing side or portion 417 of the fourth chamber may be connected to additional valves (chambers) and/or channels, including, e.g., an exit channel extending from the liquid containing side 417. An additional chamber (e.g., configured as a valve), no shown may be formed as described above. In some examples, an exit channel may deliver fluid from the one or more chamber through another fluid port (not shown) to a fluid receiving depot, e.g., a vial, tube, etc. This receiving depot may be held in the reagent storage frame.

In general, this configuration of the microfluidic driver apparatus and the cartridge is configured so that multiple, complex operations may be executed by the apparatus on the cartridge in a fully enclosed (sealed and protected from atmosphere) manner, without requiring manual intervention. Fluid may be metered using the fixed-volume chambers and moved, mixed, filtered, etc. by applying pneumatic pressure to deflect regions of the elastic layer.

In some examples, the chambers within the cartridge may be configured as mixing chambers, for mixing fluid within the cartridge. In some examples the chamber(s) may be configured as purification chambers, which may include a filter material. In some examples one or more chambers may be configured as a concentrator for concentrating the therapeutic material(s).

Although the various cartridge may have different arrangements of channels, ports and chambers, they may also share a similar basic architecture and a number of functional elements that can be used in different configurations to carry out different protocols. Functional elements include input ports, metering valves, pumps, reaction chambers, mixing structures and purification structures, and/or UV sensing regions, as described herein. In FIG. 4A the UV sensing region 493 includes a thin UV measurement chamber 481 and the passage of material into or out of this UV sensing region may be regulated by the controller using one or more valves and by controlling the pressure within these channels.

Any of these cartridge may include one or more bubble removal chambers, or any of the chambers of the liquid-contacting side of the chamber may be configured as a bubble removal chamber, in which bubbles within the fluid of the fluid-containing side may be removed. A bubble removal chamber may be referred to as a vacuum cap; and may generally be configured to apply negative pressure on the opposite side of the membrane while fluid is held within the liquid-contacting side of the chamber. The membrane may be at least partially gas-permeable, as mentioned. FIG. 10C shows an example of a bubble removal chamber. All, or more preferably a portion 1988 (e.g., just a cap region), of the membrane dividing the chamber may be in contact with the vacuum through a vacuum line 1987, e.g., in the upper surface or upper plate of the device, as shown in FIG. 10C. In operation, the vacuum cap 1938, may remove or reduce a bubble within the line by holding fluid within the liquid-contacting side of the chamber and applying a negative pressure on the upper (pressure receiving) side of the chamber. The membrane dividing the chamber into the liquid-contacting side and the pressure-receiving side may be gas permeable, so that the negative pressure may remove gas from the liquid (fluidic) side by drawing gas (e.g., air, nitrogen, etc.) through the membrane overlying the fluid path. For example, the membrane (or the region of the membrane in the vacuum cap may be, e.g., PolyDiMethylSilicone (PDMS) elastomer film that is sufficiently gas permeable to allow remove gas from the liquid side of the membrane. Fluid chambers having a fixed volume (e.g., formed between the first plate and the second plate) as described herein may include or be coupled to one or more bubble removal chambers (vacuum caps) and/or may be configured as bubble removal chambers. In some examples the portion of the elastic layer disposed between the first and the second surfaces forming the chamber, which divides the liquid-contacting side, e.g., in the second surface (and/or second plate) and a pressure-receiving side in the first surface (and/or first plate) may be only minimally (or not at all) deflected. For example, the upper, pressure-receiving side, may be minimally spaced, and/or nearly flush with the relaxed membrane (e.g., flat), while the liquid-contacting side is concave and extends into the second surface (second plate). A controller may hold fluid within the vacuum cap region, e.g., by blocking valves on either or both sides (entrance and exit) of the vacuum cap, e.g., by applying positive pressure to the pressure-receiving side of the valve, and may apply negative pressure to the pressure-receiving side of the vacuum cap. The absolute amount of negative pressure applied (e.g., the magnitude of the negative pressure) may be less than that applied to deflect the membrane (e.g., less than the absolute value of the positive pressure applied to close the valve, and/or pump). Alternatively, in some examples the membrane may be configured to be deflected (e.g., deflected up), against the first surface and/or plate, e.g., to draw fluid into the enlarged liquid-contacting side of the chamber from an input 1989. The membrane may be held by the applied negative pressure against the first, upper surface, allowing gas bubbles (e.g., air bubbles) to be removed. The controller may hold fluid in the vacuum chamber for a period sufficient to remove all or some gas (e.g., about 1 second or more, about 5 seconds or more, about 10 seconds or more, about 20 seconds or more, about 30 seconds or more, about 1 minute or more, about 1.5 minutes or more, about 2 minutes or more, about 5 minutes or more, between about 1 second and about 5 minutes, between about 2 seconds and about 5 minutes, between about 5 seconds and about 5 minutes, etc.). In FIG. 10C, the pressure may be applied through the pressure line 1987 in communication with the pressure-receiving sides of the chamber formed between the first and second surface (e.g., first and second plate) of the device. The vacuum cap 1938 may be valved by one or more valves 1992. Fluid may exit the liquid-contacting side from a fluid line 1989 at an opposite side of the vacuum cap.

The cartridges may interface with the microfluidic driver apparatus control system through a set of spring-loaded connections for both the reagents, as well as pneumatic lines used for managing fluid movement and valve control. The reagent and gas lines may be sealed by pressure against an elastomeric layer embedded in the cartridge that creates a completely sealed path from reagent vials into the cartridge and from the cartridge to the export vials. The sealed path may be maintained through all of the reactions inside the cartridge(s), effectively precluding any contact with the atmosphere and minimizing the risk of contamination.

The microfluidic driver apparatus control systems described herein may provide an aseptic controlled environment and may include an interface for loading reagents and retrieving outputs. In any of the apparatuses (e.g., systems) described herein, the apparatus may include an enclosure that provide a controlled environment; this enclosure may also be placed within a controlled environment. For example, the enclosed apparatus may be a class 5 environment that may be placed within a class 7 environment.

The microfluidic driver apparatus control systems of the microfluidic driver apparatus(s) and may provide a single-step connection to all the actuators. These control systems may also scan all the reagents and cartridge identifiers (e.g., barcodes), and may monitor fluid levels. In general, these microfluidic driver apparatus control systems may automate all or some of the microfluidic driver apparatus functions and may generate a visual recording of all process operations that may be monitored (such as for optical quality control analysis, e.g., of intermediate process outputs), stored, transmitted, or later reviewed.

As mentioned above, a microfluidic driver apparatus control system may include a microfluidic driver apparatus management system that includes the hardware, such as a nest (microfluidic driver apparatus holder) that may be engineered such that cartridges are correctly aligned can only be inserted in a single orientation. This may be managed, e.g., through two pins and/or a notch in the nest that is matched by the shape of the cartridge. The microfluidic driver apparatus management system (control system) also includes vial racks to hold the reagent and export vials, a downward looking camera that records all liquid and valve movements, and product export. Side cameras on rails to capture barcodes and detect fluid levels, and a robotic arm with magnets for bead manipulation. The cartridge is held in place with a vacuum chuck which ensures good contact with a Peltier device for temperature management. Once the cartridge is in place, mating with all the connectors is achieved in a single operation by lowering the top part of the microfluidic driver apparatus management system through a dowel pin guided system.

Figure 4B:
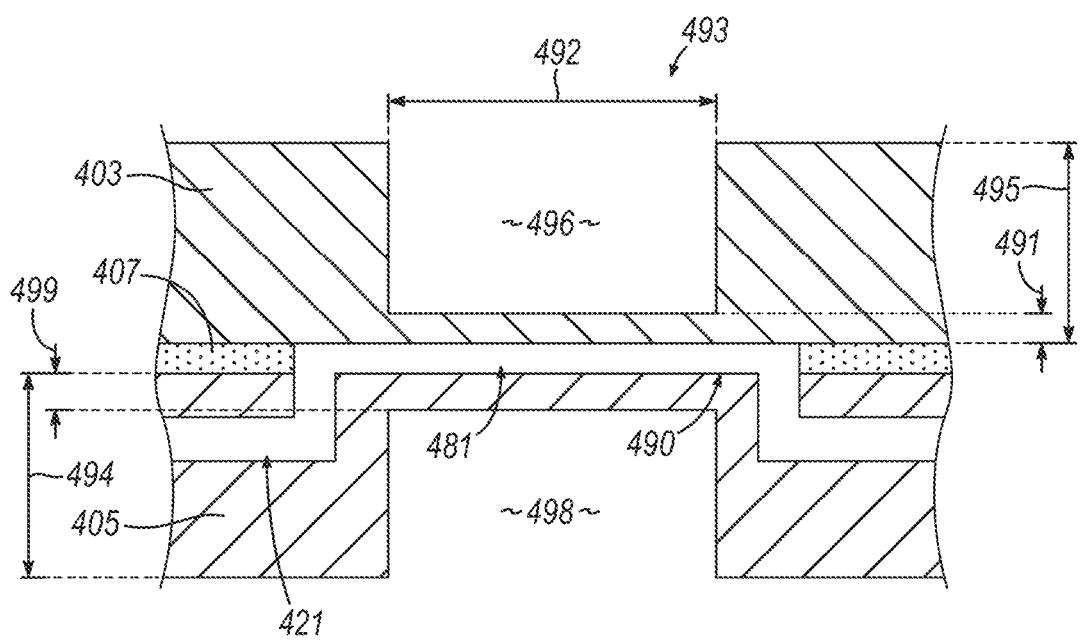
FIG. 4B is an enlarged view of a UV measurement region of a cartridge.

FIG. 4B schematically illustrates one example of the UV measurement region of a cartridge as described herein. In this example, as in FIG. 4A, the cartridge includes an upper, first, layer 403 and a lower, second, layer 405. An elastic material 407 forms a layer between the first and second layers. The UV measurement region 493 is formed by cutting down the thickness of the first region 495 to form a first UV measurement region 496 and a second UV measurement region 498 also potentially formed by cutting down the thickness of second layer 494. One or more fluid channels 421 may place the UV measurement chamber 481 in fluid communication with a source of the therapeutic polynucleotide and/or a source of "blank" solution (e.g., water, buffer, saline, etc.).

As shown in FIG. 4B the UV measurement chamber 481 is formed between the first layer and the second layer in a region where the elastic material 407 has been removed or is absent. Thus, the UV measurement chamber has the same thickness as the elastic layer 407. UV light may pass into the first UV measurement region (cut out region) and through the region of the first layer thickness 491, then through any material, such as sample material and/or bank material, held in the UV measurement chamber 481, and then out through the region of the second layer thickness 499 and into the second UV measurement region 489 where the remaining (non-absorbed) light may be detected.

In the example shown in FIG. 4B the UV measurement region is formed by a cut-down region in the first plate 496 and a cut-down region in the second plate 498, each having dimensions of approximately 2.5 mm width and depth of approximately 1.3 mm (in a 1.5 mm thick first layer). The second layer is a mirror image of the first layer in this example. Thus, the polymeric material forming the "windows" on each side of the UV measurement chamber 481 has a thickness of about 0.2 mm on each side of the UV measurement chamber. The UV measurement chamber may hold a known volume and may have a thickness of, e.g., between about 0.1 mm and 5 mm (e.g., between 0.1 and 0.5 mm, etc.).

Because the methods and apparatuses described herein use a technique of measuring a blank (e.g., a solution that is identical to the solution containing the polynucleotide, only without the polynucleotide present), the overall transmission of the cartridge is not explicitly needed for measuring the absorbance. However, the transmission of the cartridge window materials may have a strong indirect consequence via signal/noise and measurable sample-concentrations. A UV opaque window could not be used to measure UV transmission. Most microfluidic materials (e.g., cyclic olefin copolymer, COC, cyclo olefin polymer, COP, and Polydimethylsiloxane, PDMS) significantly absorb UV at the same wavelengths that the DNA/RNA characteristically absorb. Thus, in any of these examples, the measurement area (the UV measurement chamber) may be thinned, e.g., to about 0.1 and 0.5 mm, etc., To control the critical pathlength the layered structure of the cartridge may be modified. For example, one of the cartridge layers may be removed entirely (e.g., the elastic layer) from the UV measurement region. This may be advantageous, as the thickness of the layers is typically more tightly controlled than possible by machining/molding structures within the layers. In general, with higher concentrations of sample, a thinner path length may yield a better measurement (or may make measurement possible), as compared to lower concentration samples of interest. For example, for lower concentration measurements (e.g., when forming the template material for synthesizing a polynucleotide) a chamber having a substate with a height of about 1 mm (e.g., reflecting a 1 mm PDMS elastic layer) may be used. In some examples, for higher concentration measurements (e.g., when performing the IVT processes) a chamber having a height of about 0.1 mm (e.g., a 1 mm PDMS elastic layer) may be preferred.

Figure 5:
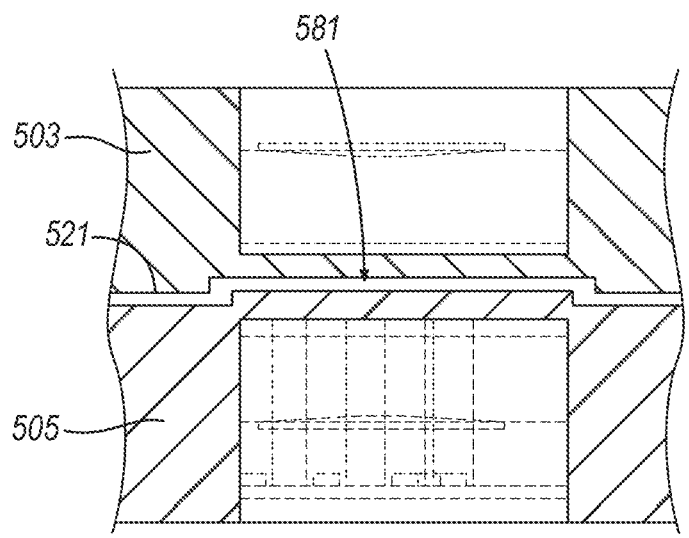
FIG. 5 schematically illustrates an example of a UV measurement region of a cartridge.

FIG. 5 shows a profile of one example of a of a cartridge that demonstrates material thinning and the short pathlength achieved by using the thickness of a layer of the elastomer in the cartridge. In FIG. 5 the cartridge includes a first layer 503, a second layer 501 and a channel 521. In this example the UV measurement chamber 581 has a thickness of about 0.1 mm (path length is 0.1 mm).

Figure 6:
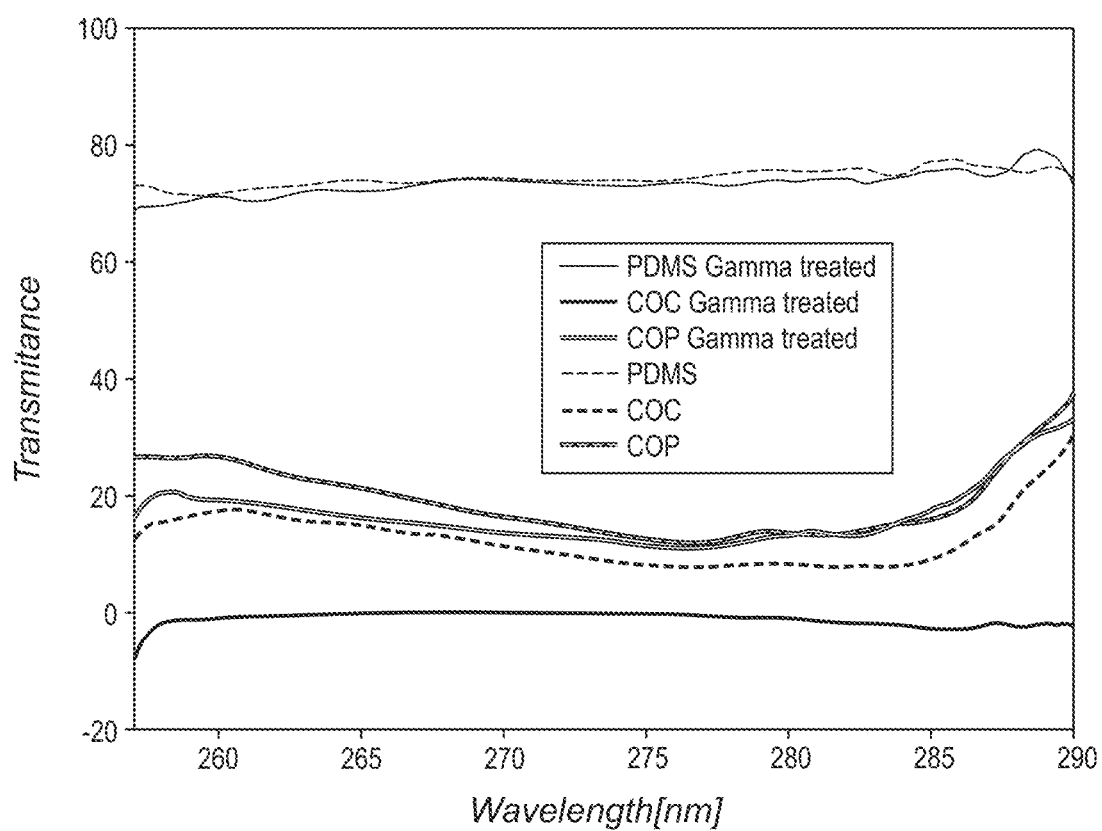
FIG. 6 is a graph showing the UV transmittance of materials forming an exemplary cartridge before and after Gamma irradiation.

For sterility, cartridges are often treated by gamma radiation prior to use. This has the benefit of destroying contaminants but can also alter the material properties of the cartridge, gamma treatments were herein found to alter (e.g., reduce) the US transmittance of the various materials used in some of the example cartridges. For example, the UV transmission of the one component of the cartridge (COC) becomes significantly more UV opaque (see FIG. 6) following gamma treatment. It would be completely opaque to the UV detectors were it not for the thinning design shown in FIGS. 4B and 5.

Figure 7:
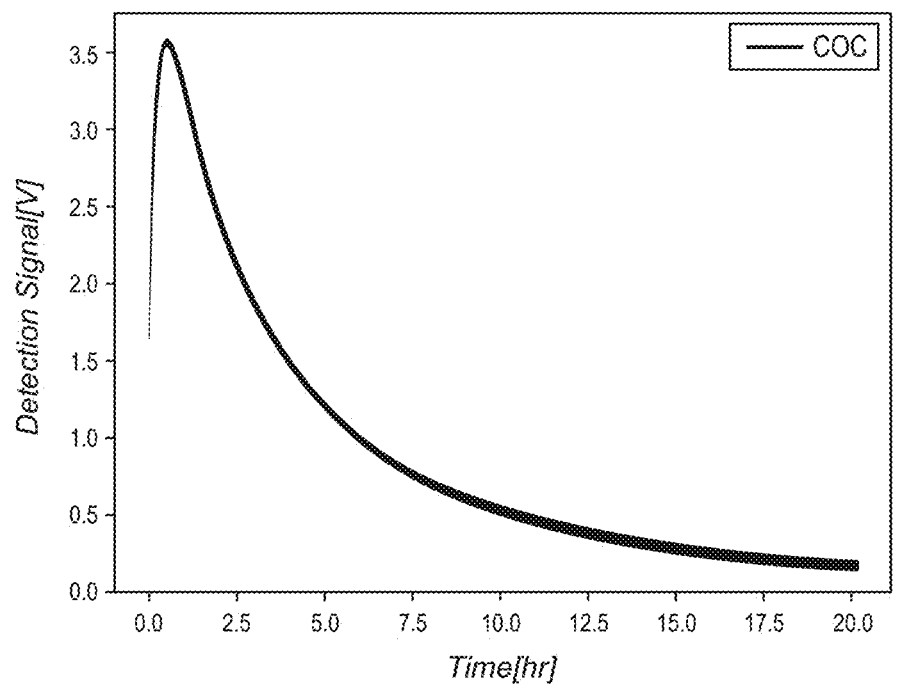
FIG. 7 is a graph of the change in detection signal over time for an exemplary material of a cartridge under extended UV exposure.

The UV transmission through gamma-treated COC may depend on the extent of UV exposure, following an unusual trend of becoming more transparent with moderate exposures, and ultimately less transparent with long exposures. See, e.g., FIG. 7. In this example the transmittance of the polymeric material (e.g., COC) initially and surprisingly increases with exposure, followed by a decline in admittance over the course of many hours. For example, as the transmission of the cartridge is changing during exposure, in some of the apparatuses and methods described herein it is beneficial to measure for concentration accurately but first scanning with a blank, and in some cases (optionally) after employ three novel mitigating measures: for example a "blank" measurement may be made before and after the "sample" measurement to get a trend of the cartridge's transmission rate of change, and use these values to estimate the material response during the sample measurements. The methods and apparatuses described herein may pre-treat the cartridge with UV light, so it is at a stable and higher-transmitting region of the curve (FIG. 7) during measurements. In general, UV light may be applied (e.g., by pulsing or using dimming feature) only when needed to take a measurement, thereby minimizing exposure and the dimming feature is utilized such that the LED light is just bright enough to get a good signal and avoid overexposure. LED light adjustments may be done automatically or manually based on the detector reading to always ensure a good signal reading from the detector.

Figure 8:
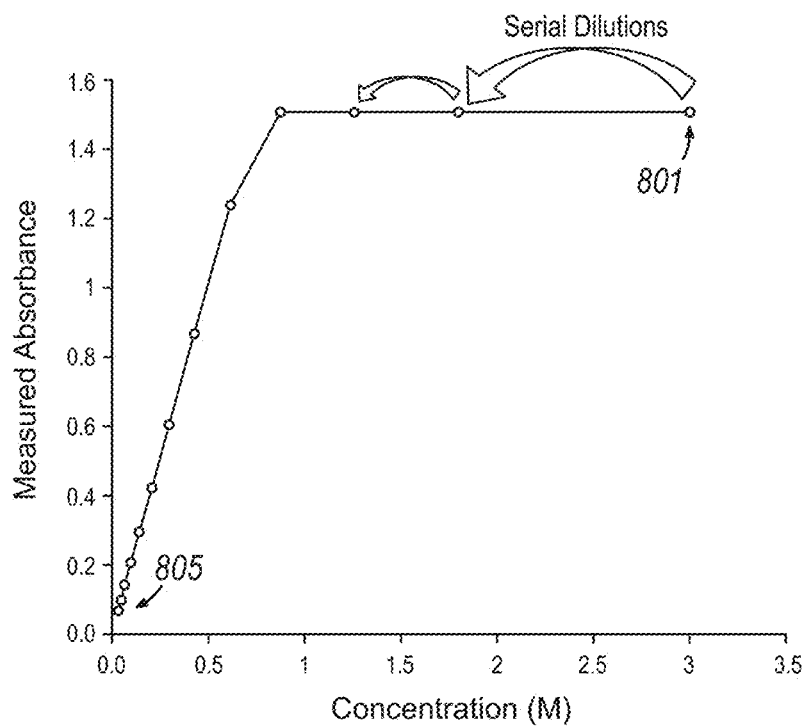
FIG. 8 is an example of a dilution curve (graph) as described herein.

Any of the apparatuses described herein may be configured to perform measurements on a series of dilutions (serial dilutions) as shown in FIG. 8. In general, a microfluidic apparatus may be configured for performing serial dilution around the measurement chamber. The process may consist of microfluidically transferring an aliquot of the reaction to the measurement chamber, performing a measurement, then diluting the aliquot for a subsequent measurement. The diluted aliquot may be diluted again and again, measured each time, producing a graph as seen in FIG. 8. At the end of the measurement pure buffer is rinsed through the measurement chamber to gather the "blank" reading and correct for UV exposure effects. The graph in FIG. 8 illustrates the mechanics and utility of this process. For example, a sample may initially be too concentrated, so it is completely opaque to the UV wavelength of interest (e.g., 260 nm). This is shown in the point 801 at the top-right of the graph of FIG. 8. A serial dilution (depicted at 70%) takes the measurement a step lower in concentration, but still effectively opaque. Multiple dilutions later, the measurements enter a linear regime, eventually reaching a point 805 at the bottom-left of the graph of FIG. 8 where the aliquot becomes indistinguishable from the blank. UV-absorbance can be used to directly determine concentration along the linear regime, until reaching point 805, at which point the UV-absorbance measurements may no longer be useful. From the slope of the linear regime the apparatus or method can also determine a dilution rate (i.e., 70% to 73%). The apparatus may use the number of dilution steps, the dilution rate and the measured concentration at the current dilution to solve for the original aliquot's concentration. Additionally, the linear portion of the curve validates the measurement, as nonlinear components may indicate that the signal is close to the noise level of the detector, or there exists an unexpected time varying component or dilution error.

Figure 9:
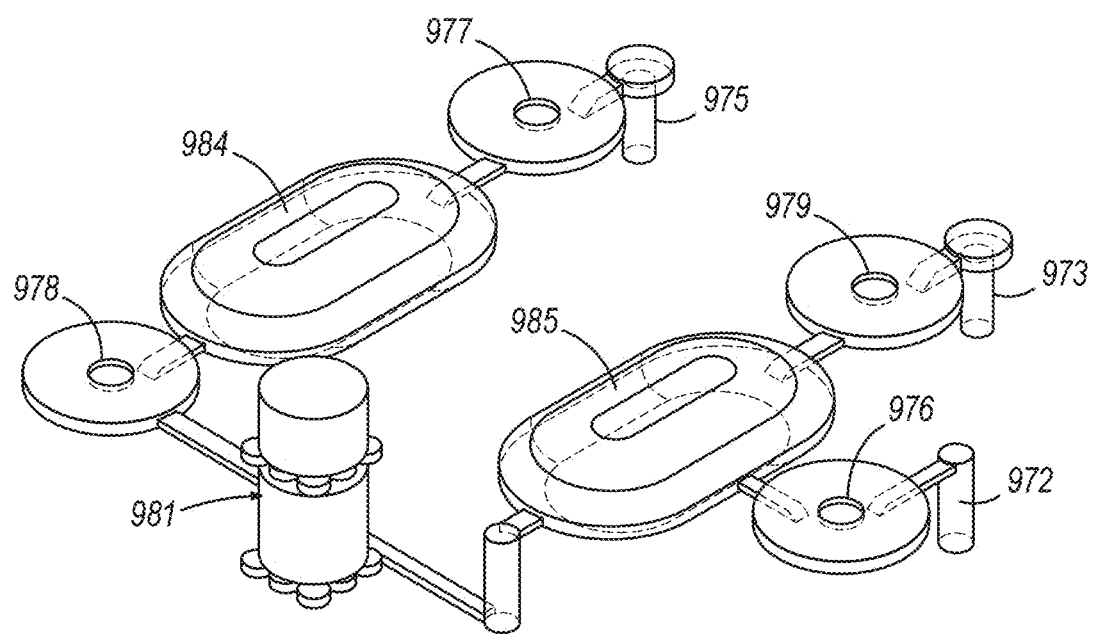
FIG. 9 schematically illustrates one example of a portion of a cartridge including a UV measurement region.

FIG. 9 illustrates one potential configuration of a portion of a cartridge configured for serial dilution. In this example the apparatus includes a UV measurement chamber 981 that is adjacent to a fluid chamber 984, 985 on either side of the UV measurement chamber, along with a series of valves 976, 977, 978. The chambers are in fluid communication the source of polynucleotide input 972 and a source of buffer ("blank") used for dilution 973, and a waste output 975. By selectively opening and closing valves, as well as pressurizing measurement chambers, 985, 984, the apparatus (e.g., controller) may empty one chamber to waste, and refill with fresh buffer to produce a dilution. Additionally, the control of pressure on either side of the measurement chamber may enable air-bubble removal techniques such as fluid-sweeping and forcing air through the gas-permeable flexible membranes as described above.

In general, these methods and apparatuses may use the determined concentration of the nucleotides to control operation of the apparatus. For example, these apparatuses and methods may be configured to pool multiple batches of polynucleotide. The measured concentration may be automatically compared against a nominal and acceptable range by the controller. If the comparison is favorable, the batch may be pooled in a common container. If it is unfavorable, the controller may microfluidically direct it to a waste container or for further-analysis. In some examples the apparatus may use the determine concentration to standardize the system output. The RNA/DNA concentration may be measured and routed to a product container. The volume of added product may be read on the product container (e.g., by mass or imaging), and with this concentration and volume, along with the target concentration, the volume of dilutant may be calculated and added microfluidically. Alternatively, or additionally these methods and apparatuses may adjust or control any of the processing (parametric) elements when processing the polynucleotide. For example, the measured concentration may be automatically compared against a nominal and acceptable range by the computer. In addition to other process parameters such as temperature history and reagent usage the product may be parametrically released for use. Anomalous products may be sorted, and the process investigated.

Figure 10A:
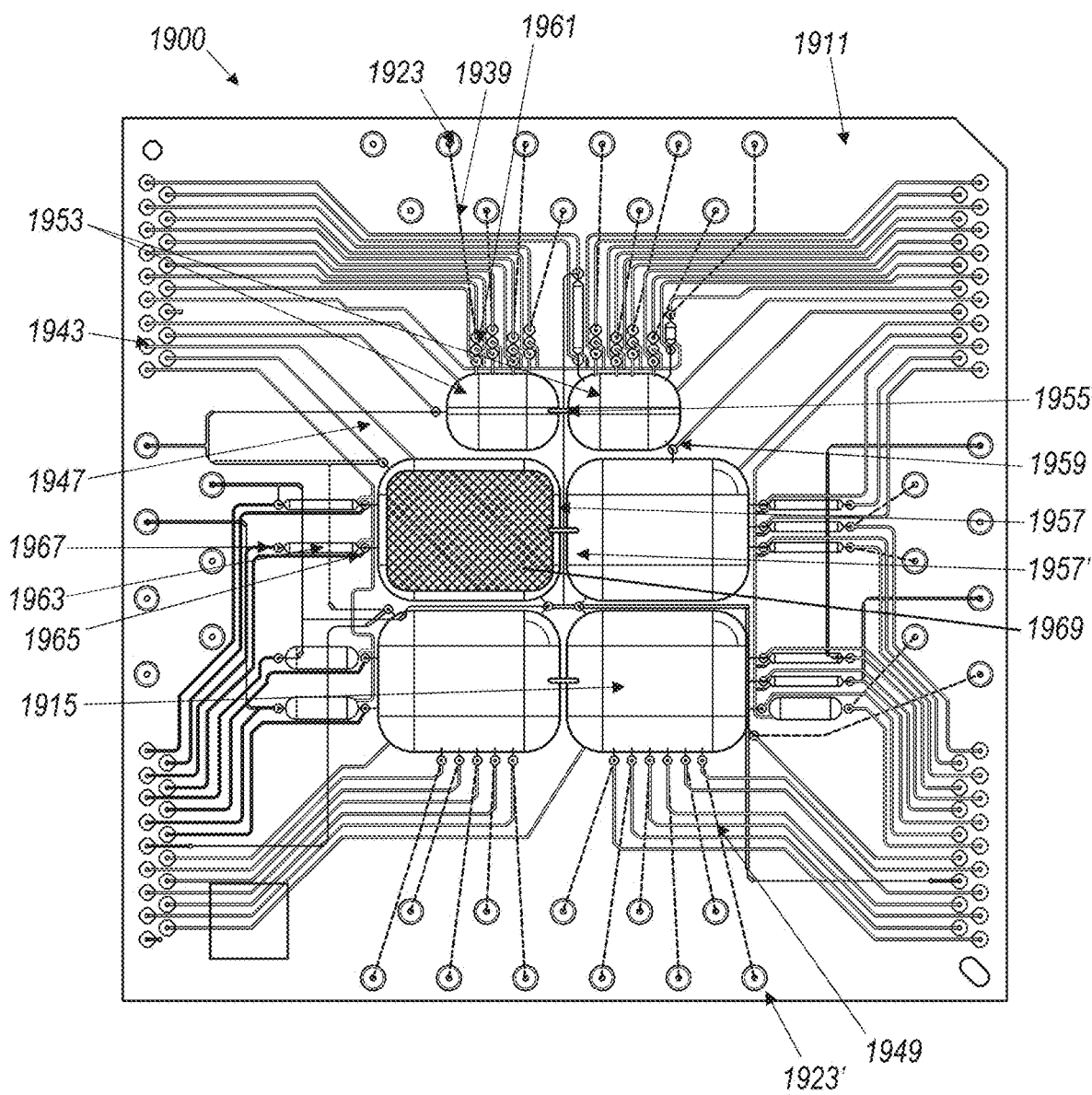
FIG. 10A is a top view of an example of a cartridge for a microfluidic driver apparatus that may include a UV measurement region.
Figure 10B:
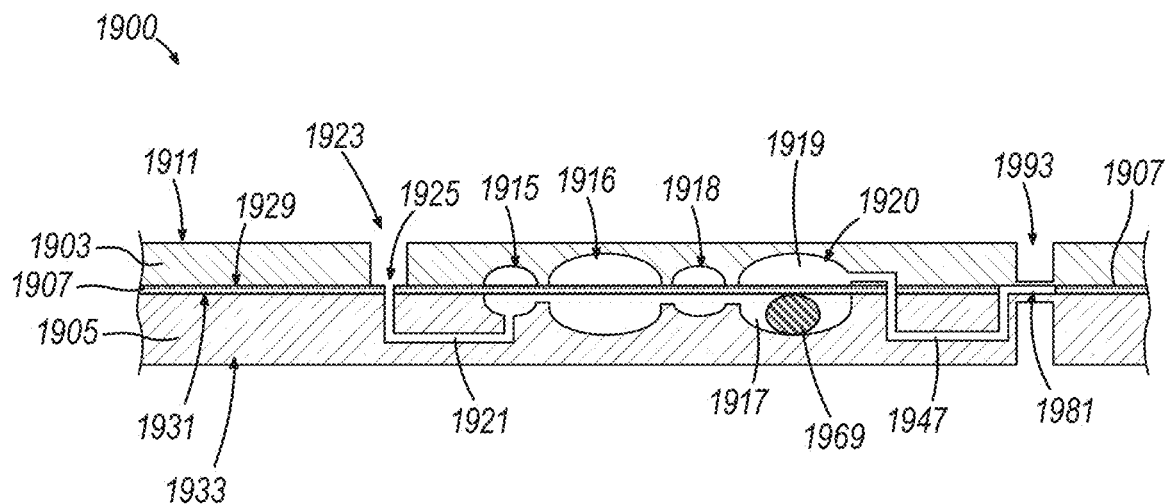
FIG. 10B is an example of a section through one region of an example of a cartridge including a UV measurement region.
Figure 10C:
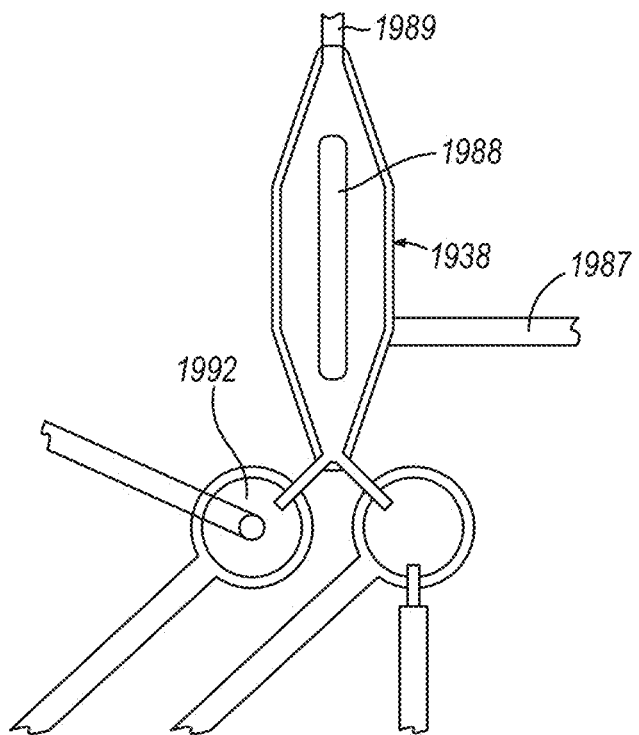
FIG. 10C illustrates one example of a portion of a cartridge for a microfluidic driver apparatus schematically showing a vacuum cap for bubble removal.

FIGS. 10A-10E and 11A-11B illustrate additional examples of cartridges that may be used as described herein. FIG. 10A shows one example of a cartridge 1900. This example also includes a permeable insert 1969 within a liquid-contacting side of a chamber 1957. In FIG. 10A a cartridge 1900 may include at least one pair of chambers 1953, 1957, 1957', each of which may include a liquid-contacting side 1917, a pressure (e.g., gas) side 1919, fluidic connections, pressure connections and fluidic/pressure lines that may be formed in the thickness of the microfluidic driver apparatus. In some examples the chambers are paired, and each chamber of the pair of chambers may be connected to each other by a fluidic connector 1955. The fluidic connector 1955 may be used in coordination with positive and/or negative pressure applied to the pressure side of the chamber(s) to drive liquid in the liquid side between the two chambers to mix this liquid within each of the chambers. The chamber may be bifurcated by an elastic material (e.g., an elastic layer or membrane) and deflecting an elastic material within the fixed volume of a chamber may drive any liquid within the liquid in/out of the liquid-contacting side of the chamber (e.g., between the two chambers).

The cartridge 1900 may include more than one pair of chambers, any of which may include a permeable insert. Each pair of chambers may be used for different processes. For example, a first pair of chambers 1953 may be used for synthesis of the RNA. A second pair of chambers 1957, 1957' may be used for purification of the synthesized polynucleotides. Fluid from a first pair of chambers 1953 may be driven to a second pair of chambers upon application of pressure to the pressure-receiving side 1919 of the respective chambers and opening a valve 1959 between the first pair of chambers 1953 and the second pair of chambers 1957. The valve chamber 1959 may be formed by the elastic layer 1907 within a connector channel between the two pairs of chambers.

The cartridge 1900 as shown in FIGS. 10A and 10B may have a plurality of pressure ports and fluid ports 1923, 1923'. The plurality of pressure ports and fluid ports may be disposed adjacent to a periphery of the cartridge and are configured to be connected to the fluid interface assembly 109 as described above.

Ports (e.g., sealing valves) may be formed from the elastic layer, along the length of a connecting channel 1939 (either pressure channel or fluid channel), such as is shown in FIG. 10A, for valve 1961, which may control timing of delivery of a reagent driven from fluid port 1923, but when placed in series with one or more similarly constructed valves, may also permit metering to the chambers of the device. For example, in FIG. 10A, three valve chambers are shown (described in greater detail below); the first of these three valves may act as a peristaltic pump, while the middle valve may be a metering chamber that meters small (e.g., having a metering volume of about 10 nL, about 20 nL, about 25 nL, about 50 nL, about 75 nL, about 100 nL, etc.). The size of the channels, and particularly the size of the chambers connected to the channels) can meter out the volume dispensed along fluidic connecting channel 1939, 1921 and delivered into the chamber 1953 that is connected to the fluidic connecting channel 1939, 1921. In some examples, a metered volume may be as little as 50 nL. Metered volumes of about 100 nL, about 1 microliter, about 5 microliters or more may be imported. A variety of valve sizes may be pre-selected for incorporation within the microfluidic driver apparatus 1900, and reagents may be connected to appropriate metering sizes by user choice.

Additionally, more than one valve body 1961 may be included in a row along fluidic connecting channel 1939. A series of valves 1961 may act as a peristaltic pump to move fluid, including (but not limited to) viscus fluids. The ability to function as a peristaltic pump for fluids generally, may have particular advantage for moving fluid that may be viscous or contain suspended particles such as purification or capture beads.

As mentioned, a cartridge 1900 may also include a delivery or export reservoir or depot 1963. In FIG. 10A, a pre-selected volume may be formed similarly to the chamber construction described above, or may contain only a metering side, as desired. In either case, valves may be used to meter desired volumes into the reservoir 1963. Valve 1965 can control delivery of fluid from reservoir 1963. If larger volumes are desired, the delivery may be repeated. Alternatively, if reservoir 1963 was pre-selected to be an export reservoir, valve 1965 may open, and deliver fluid from chamber 1957, while retaining valve 1967 shut, which permits only the measured volume of fluid to be exported to reservoir 1963. This fluid may then be exported to a fluid vial on the reagent storage frame for further processing or testing. In some examples, a chamber, reservoir or depot (e.g., 1963) may be configured as a metering section of, e.g., a 1 µL pump formed by three valve structures (1967, 1965, 1967). A chamber may be configured for export of waste, for example, from a mixing chamber 1957.

The cartridge 1900 can be a sealed path construction. While fluid vials, fluidic lines and the microfluidic driver apparatus are connected, operation of the apparatus may be performed without any exchange of materials in or out of the system, and in particularly in/out of the fluid path of the cartridge for processing, including synthesizing a polynucleotide (e.g., RNA) and preparing it for biological delivery (as a therapeutic, such as drug, vaccine, etc.). Thus, the entire system may operate as a closed path and/or individual microfluidic driver apparatuses may operate in the system as a closed path (protected from the atmosphere).

Some examples of the cartridge 1900 may further include a concentrator within a chamber, which may be disposed within the thickness of the second plate and may be in fluid communication with an exit channel such as 1949. The polynucleotides may be concentrated by driving off excess fluidic medium, and the concentrated polynucleotide mixture exported out of the cartridge 1900 for further handling or use. In some examples, the concentrator may be a dialysis chamber. For example, a dialysis membrane may be present within or between the plates of a microfluidic driver apparatus.

The cartridge 1900 may be formed of materials that are at least substantially translucent to visible light; in some examples the materials may be substantially transmissive to ultraviolet light (or both visible and UV light). In some examples, the microfluidic driver apparatus 1900 may be formed of materials that are substantially transparent to visible and/or ultraviolet light.

As described above, the cartridge may be formed of two or more plates that are layered atop each other with the chambers and/or channels formed between the plates; an elastic material may be sandwiched between the first and second plates. The first plate and/or the second plate may be formed from a rigid material. The plates may be formed of the same material, or a different material(s). For example, the rigid material may be a polymer or glass. The polymer or glass may be biocompatible, e.g., does not leach any monomers or soluble small molecules that are toxic to living cells. Any suitable biocompatible polymer may be used, including medical grade polycarbonate-urethane, silicone polycarbonate urethane, polyether urethane, amongst others. In some examples, the polymer may be a cycloolefin copolymer.

FIG. 10B shows a section through a portion of a cartridge, showing a UV measurement chamber 1981 of a UV measurement region 1993. Thus, a microfluidic driver apparatus may be configured as multilayered structure composed of two more rigid layers 1903, 1905 with a flexible membrane 1907 sandwiched between the two ridged layers. FIG. 10B shows a portion of a sectional view (transverse to the plane of the cartridge) through one example of a cartridge having multiple layers that form reactors for processing a therapeutic as described herein. The reactors may include seals, channels, valves, and chambers, including pumping chambers formed from the multiple layers. For example, a cartridge may be formed of two or more rigid or semi-rigid plates 1903, 1905 and at least one elastic layer 1907. The elastic layer 1907 may be a sheet of elastic material that is liquid impermeable. The elastic layer may be somewhat gas permeable or may be treated to be more or less gas permeable, including in various regions. Although a single continuous sheet of elastic material may be used, in some examples multiple elastic materials sheets may be used, or the 'sheet' may be formed of sections of multiple sheets. The layers and the elastic sheet may be laminated together. In general, chambers for holding, valving and/or pumping fluid may be formed in the plates on either side of the elastic layer so that the elastic layer bisects the chambers into a liquid containing side and a pressure (e.g., gas) applying side. The overall volume of chamber(s) may be constant and may be formed into both the first (e.g., upper) plate and the second (e.g., lower) plate, but this volume may be divided into the pressure side and the liquid side. By applying positive or negative pressure into the pressure side, the elastic sheet may be deformed to make reduce (down to zero, closing the chamber off) the volume of the liquid containing side or to increase the volume of the liquid containing side (to a predetermined maximum). The pressure applying side of the chamber may be connected, e.g., via a pressure port in the upper plate 1903 connecting to a pressure channel 1947, for applying negative or positive pressure to the pressure-receiving side 1919 of one or more chambers. The liquid containing side 1917 opposite the pressure-applying side of each chamber may be connected via a fluid channel 1921 to a fluid port 1923. Both the fluid port and the pressure port may be formed by an opening into the upper plate 1903 and the elastic layer 1907, allowing a sealed connection that is isolated from the atmosphere even when there are multiple different input lines as the pressure line is pushed into the elastic layer 1907 that is supported on the underside of the port by the opposite rigid or semi-rigid layer(s), 1905.

In FIG. 10B, the cartridge 1900 includes a first (e.g., upper) plate 1903 having a first (e.g., top or upper) surface 1911 and a second (bottom or lower) surface 1929 and a thickness between the two. The first surface 1911 may form an exposed outer surface. The microfluidic driver apparatus also includes a second plate 1905 having a first (e.g., upper or top) surface 1931 and a second (e.g., lower or bottom) surface 1933 and a thickness therebetween. An elastic layer 1907 is sandwiched between the second surface 1929 of the first plate 1903 and the first surface 1931 of the second plate 1905.

The cartridge 1900 shown in FIG. 10B may also include a plurality of chambers 1915, 1916, 1918, 1920 each having a fixed volume. These chambers are formed by cut-out regions (e.g., rounded/curved cuts) into the second (bottom) surface 1929 of the first plate 1903 and the first (upper) surface 1931 of the second plate 1905; the elastic layer 1907 bifurcates these chambers 1915 so that each includes a liquid containing side 1917 and a pressure-receiving (e.g., gas containing) side 1919. The cartridge 1900 may also include multiple liquid (e.g., fluid) channels. In FIG. 10B, a fluid channel 1921 is shown extending from a fluid port 1923 passing through the thickness of the first plate 1903, to a fluid channel opening 1925 through the elastic layer 1907 and through much of the thickness of the second plate 1905 where a length of the liquid channel 1921 running parallel to the bottom surface of the third plate is formed.

In regard to the fluid port 1923, the diameter of the opening into the first plate 1903 forming the fluid port 1923, which extends through the thickness of the first plate, may be larger than the diameter of the fluid channel opening 1925 which extends through the elastic layer 1907 and into the liquid (e.g., fluid) channel 1921. The fluid channel opening 1925 may be centered relative to the bottom of the fluid port opening and may be offset from the walls of the fluid port opening by at least the expected wall thickness of the fluid line or fluid line coupling interface that will connect to the fluid port.

The fluid channel 1921 connects to the liquid containing side 1917 of a first chamber 1915. This first chamber may be configured as a valve, which has a relatively low retaining volume (fixed volume) but can be fully opened or closed by the movement of the elastic layer 1907.

The cartridge 1900 also includes a plurality of pressure channels that may be independently controlled to apply positive and/or negative pressure. Each of the chambers 1915, 1916, 1918 may be connected to a separate pressure port and pressure channel for independently operating and controlling the movement of the portion of the elastic layer 1907 bifurcating these chambers, to valve, and/or pump each chamber independently. In some examples the pressure ports may be shared between multiple chambers.

In the section through a cartridge 1900 shown in FIG. 10B, there are multiple connections to other fluid (e.g., liquid) lines, fluid ports, pressure lines and pressure ports that are not shown, as they may be out of the plane shown. For example, in FIG. 10B the liquid containing side or portion 1917 of the fourth chamber may be connected to additional valves (chambers) and/or channels, including, e.g., an exit channel extending from the liquid containing side 1917. An additional chamber (e.g., configured as a valve), no shown may be formed as described above. In some examples, an exit channel may deliver fluid from the one or more chamber through another fluid port (not shown) to a fluid receiving depot, e.g., a vial, tube, etc. This receiving depot may be held in the reagent storage frame.

Figure 10D:
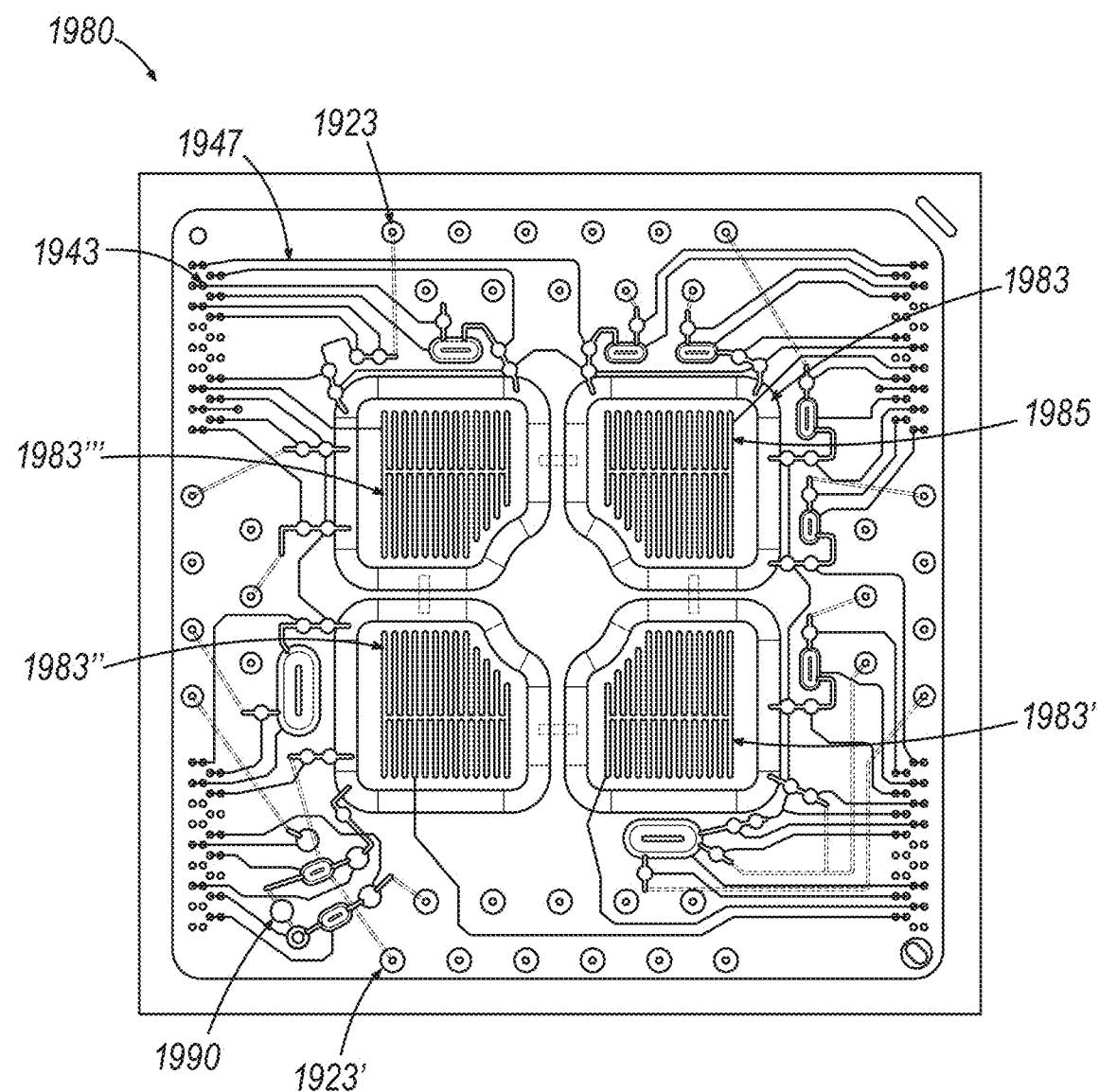
FIG. 10D is a top view of an example of a cartridge ("biochip") including a UV measurement chamber.
Figure 10E:
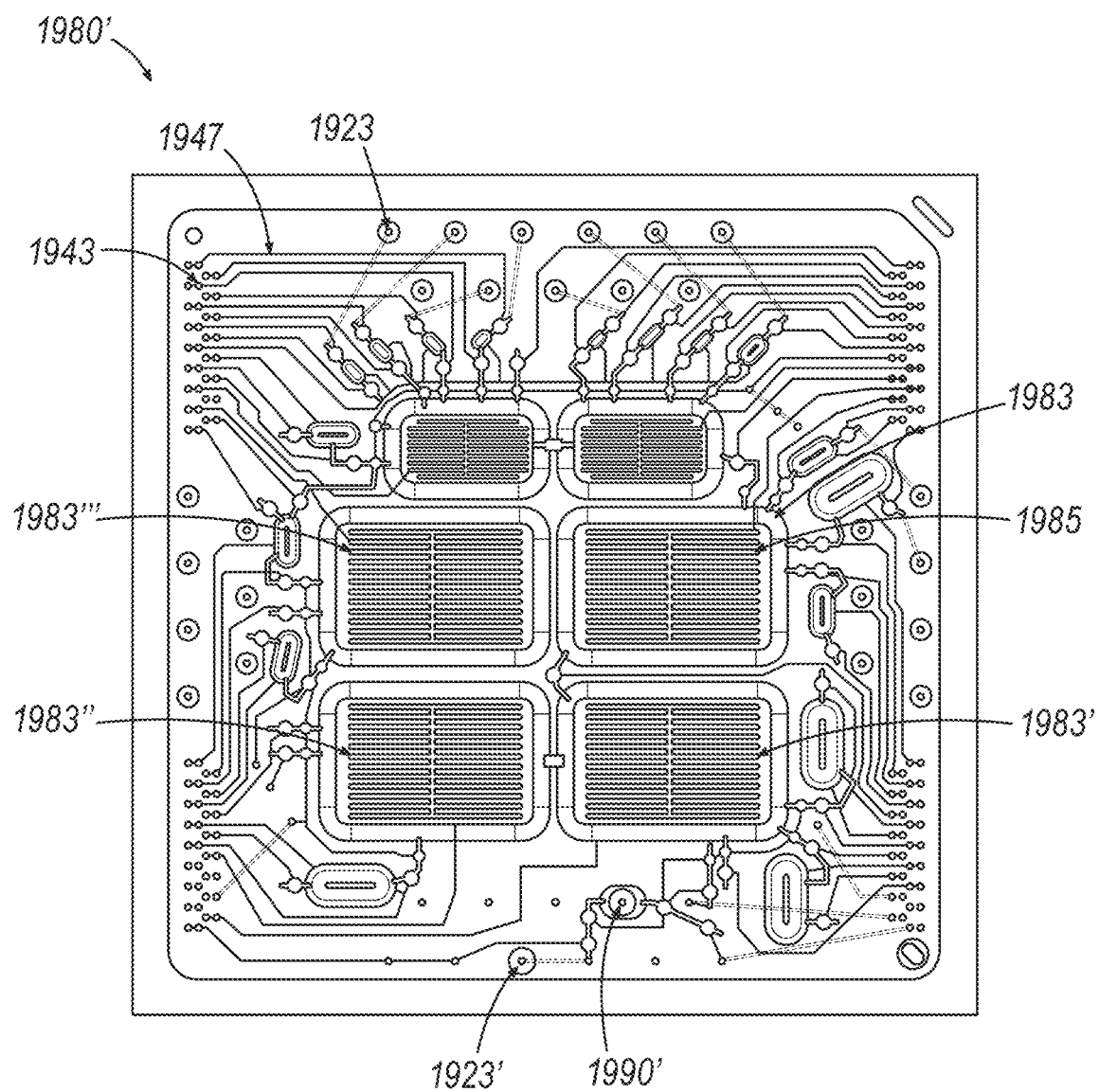
FIG. 10E is another example of a top view of a cartridge including a UV measurement chamber.

In FIG. 10E the cartridge 1980 includes four PCR chambers 1983, 1983', 1983", 1983'", each of which may include a liquid-contacting side, a pressure (e.g., gas) side, and which are fluidically connected to adjacent PCR chambers. Each PCR chamber has a fixed volume, and as described above for general chambers, are formed between a first surface of a first plate and the second surface of a second plate; the first and second plates may be joined together with an elastically deformable membrane (e.g., elastic layer) between them, dividing the chamber. The elastic layer divides each chamber into a liquid-contacting side in the second surface and a pressure-receiving side in the first surface.

In the cartridge shown in FIG. 10D, the pressure-receiving side 1919 of each chamber is further partitioned up by one or more fluidly connected serpentine pathways 1985. These serpentine pathways in the pressure receiving surface are configured to distribute the positive and negative pressure applied through the channels (and in particular, the negative pressure) more evenly across the surface of the relatively large chamber. The sub-division of the pressure-receiving surface in each PCR chamber (e.g., in some examples by one or more serpentine pathways) may support the deflectable membrane when negative pressure is applied to pull it away from the fluid-containing chamber. This may also prevent the formation of bubbles and may maintain a fixed, predictable volume.

The cartridge shown in FIG. 10D also includes a plurality of fluid channels each extending from a fluid port 1923, 1923' through the first plate region and into the second plate region to fluidly connect with the liquid-contacting side of one or more of the plurality of chambers (similar to the configuration shown in FIGS. 10A and 10B). In FIG. 10D, a subset of fluid ports are labeled, including those providing fluidic connection to a source of (off-device) plasmid 1923, PCR buffer, primer(s) (e.g., T7 primer), oligo dTs, enzyme (e.g., polymerase), purification substrate (e.g., Ampure™ beads), RNASE-free air, dNTPs, product output ("OUT") 1923, output from a UV yield detection channel ("OUT UV"), buffer for UV detection ("UV buffer"), water, Ethanol (e.g., 70% Ethanol rinse), and waste ("Waste"). Additional fluid ports are also included and may be redundant or may not be used. As described, a pressure ports may provide communication for the application of positive and/or negative pressure to the pressure-receiving sides of each chamber, channel, vacuum cap, valve, etc. Thus, a controller may control movement of fluid within the device, including mixing, pumping, valving, etc., by applying positive or negative pressure to specific pressure ports 1943 or combinations of pressure ports. The pressure ports and fluid ports may be arranged on an upper side of the first plate, typically around a periphery of the plate, as shown in FIGS. 10A and 19D.

In FIG. 10D, the device also includes a plurality of pressure channels 1947 each extending from one or more pressure ports, through the first plate region and elastic layer, into the second plate region, and back through the elastic layer and into the first plate region (similar to that shown in FIG. 10B), wherein each pressure channel of the plurality of pressure channels extends within the first plate region and fluidly connects with one or more pressure-receiving sides of one or more of the plurality of chambers. As shown in FIG. 10B, the application of positive or negative pressure through the pressure channels (from the pressure port) by the controller of the system including a fluid depot and pneumatic drive may open/close valve 1915, 1918, and may pump fluid through the chambers 1916, 1920, 1983.

As mentioned, any of the cartridge described herein may also include one or more UV measurement chambers (e.g., UV yield detection chambers) 1990 in fluid communication with one or more of the PCR chambers. The UV yield detection chamber may include a UV yield detection window that is configured to pass UV light therethrough for quantification of a polynucleotide within the UV yield detection chamber. The UV measurement chamber 1990 may also be connected to a source of buffer for performing the UV detection. UV detection may be measured the absorbance of the buffer that the DNA is in. The apparatus (system), including a controller coordinating the operations on the microfluidic driver apparatus may be configured to control operation of the UV yield detection chambers, as will be described in detail below. For example, the controller of the system for which the microfluidic driver apparatus is configured to be used may first examine the absorbance of the UV buffer without the product and may then add a predetermined amount of the (e.g., purified) product for comparison. The system (e.g., controller) may then automatically or semi-automatically use the determined concentration to alert the user and/or make a decision to discard or flag a sample for further analysis and/or to dilute the product before it is exported from the cartridge or moved to another cartridge.

FIG. 10E shows another example of a cartridge (e.g., "biochip") 1980' similar to that shown in FIG. 10D, including a UV yield detection chamber 1990' in fluid communication with sample and/or blank (e.g., buffer) chambers. In FIG. 10E the cartridge device also includes a waste port 1923' (e.g., negative pressure port, which may be coupled to a waste line).

In general, the devices shown in FIGS. 10D and 10E are similar and may include any of the features of that shown in FIG. 10A-10C. For example, the ports may be formed from the elastic layer, along the length of a connecting channel 1939 (either pressure channel or fluid channel), such as is shown in FIG. 10A. One or more valve bodies 1961 may be included in a row along fluidic connecting channel 1939.

The PCR chambers may be configured to optimize the PCR processes described herein. For example, the microfluidic driver apparatus may include PCR chambers having a much larger area than height of the liquid-contacting side. For example, the liquid-contacting side of each PCR chamber may have a thickness that is 1.5 cm or less, such as in particular 1.3 cm or less, 1.2 cm or less, 1.1 cm or less 1.0 cm or less 0.9 cm or less, 0.8 cm or less, 0.7 cm or less, 0.6 cm or less, or 0.5 cm or less. Typically, the lower the height (e.g., the "thickness" of the chamber), the more efficient the heat transfer due to thermal cycling may be, however the lower the overall volume. The cartridge described herein may be used for PCR within the PCR chambers without requiring the addition of an oil/hydrophobic material, as evaporation may be limited by the closed (or closable) configuration of the chamber.

In general, any of these cartridge may include a purification chamber in fluid communication with a purification substrate (e.g., Ampure beads).

The cartridge described herein may also be configured to provide mixing (e.g., bubble mixing) by applying air (e.g., RNAse-free air) through the liquid-contacting side of the apparatus from the cartridge, and out of a fluid port into a reservoir coupled to the fluid port. In FIG. 10D, for example, the cartridge may be controlled by a controller (of a system to which the cartridge is coupled) to mix and resuspend substrate beads (e.g., Ampure™ beads) within a reservoir coupled to a fluid port by driving RNAse-free air through the fluid channels in communication with the fluid port. This may result in bubbling and mixing of the substrate beads within the reservoir. The controller may control (using positive and/or negative pressure applied through the pressure ports of the microfluidic driver apparatus) the mixing by application of the RNAse-free air and after mixing, may direct resuspended substrate out of the reservoir and into the purification chamber(s) for purifying template product.

As mentioned, any of these apparatuses may be configured as a removable cartridge configured to engage with a fluid depot and pneumatic drive, and may be coupled to system, e.g., a microfluidic driver apparatus control system that includes a controller for coordinating the operation of the microfluidic driver apparatus to produce template.

In general, a cartridge may be any appropriate size/volume. For example, the cartridge may be configured to have a total PCR reactor size of between about 3 mL and about 10 mL (e.g., between about 4 mL and about 8 mL, between about 5 mL and 7 mL, etc.). In the example shown in FIG. 10D the total PCR reactor volume (the combination of all four PCR chambers) is about 6.03 mL. Thus, in FIG. 10D the PCR reaction volume is about 3 mL, which has been found to produce about 130 ng/µL of template product (within the 3 mL).

Figure 11A:
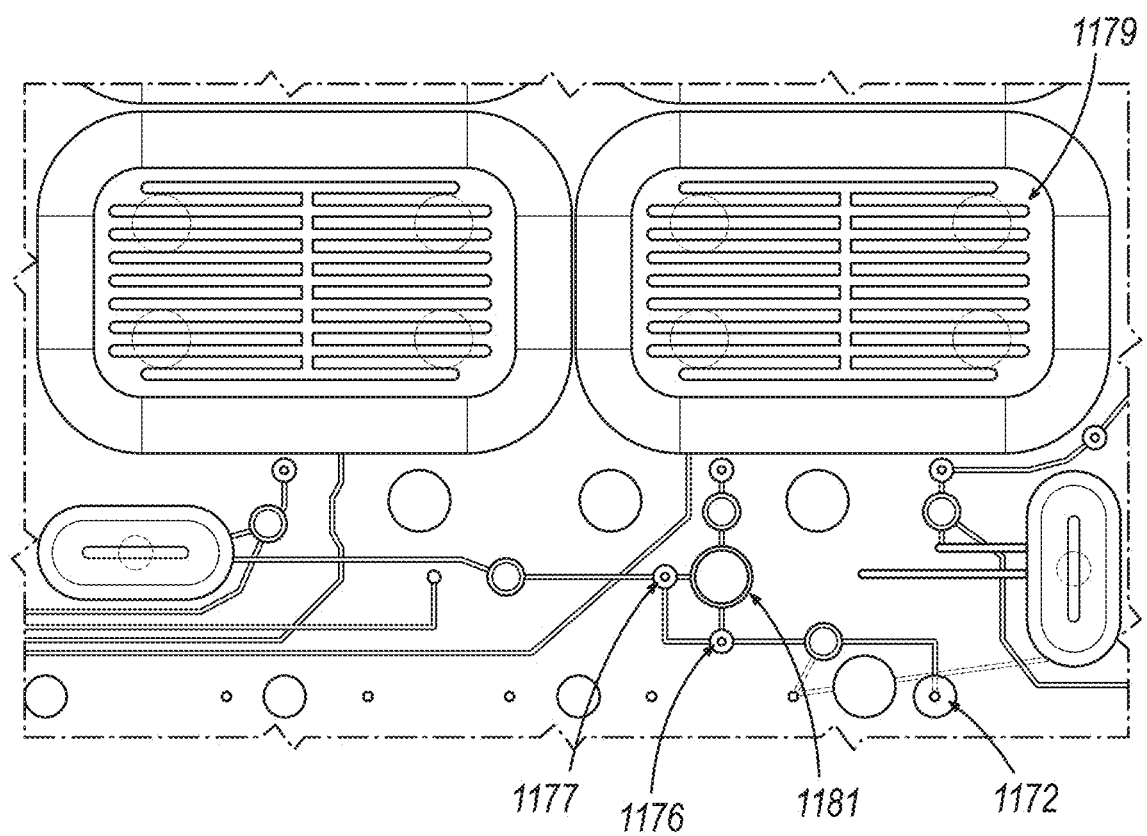
FIG. 11A shows a partial view of a cartridge including a UV measurement region.
Figure 11B:
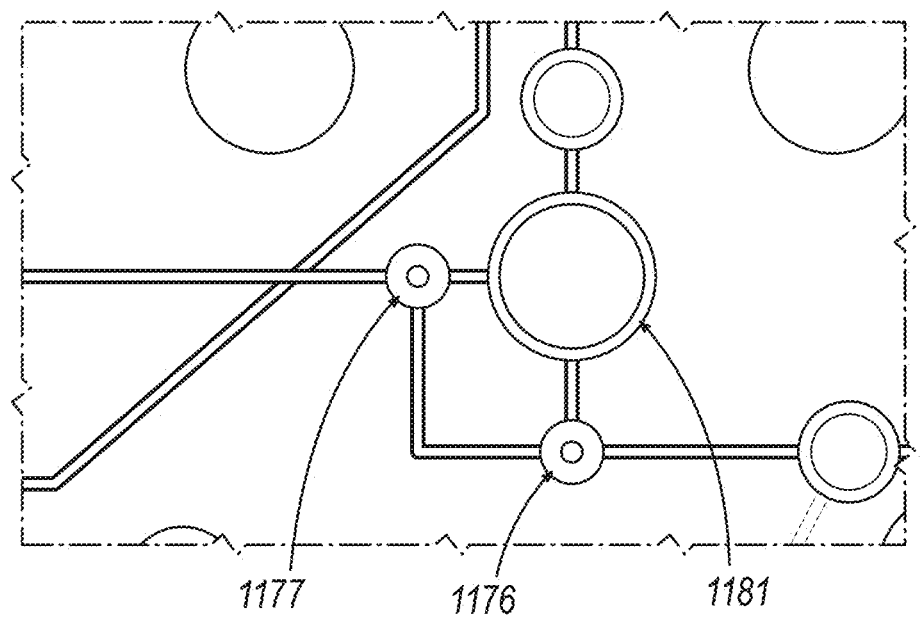
FIG. 11B is an enlarged view of the UV measurement region of FIG. 11A.

FIGS. 11A and 11B illustrate examples of cartridges including UV measurement channels 1181 coupled to one or more valves 1176, 1177 and inputs (e.g., a source of polynucleotides material, such as a polynucleotide forming chamber 1179 and/or source of buffer or other blank solution. In FIG. 11A the UV measurement chamber also connects to a suction (e.g., waste) port 1172. Suction may be used to load the UV measurement chamber 1181 by controlling the valves. FIG. 11B shows a slightly enlarged view of the UV measurement chamber of FIG. 11A.

Figure 13A:
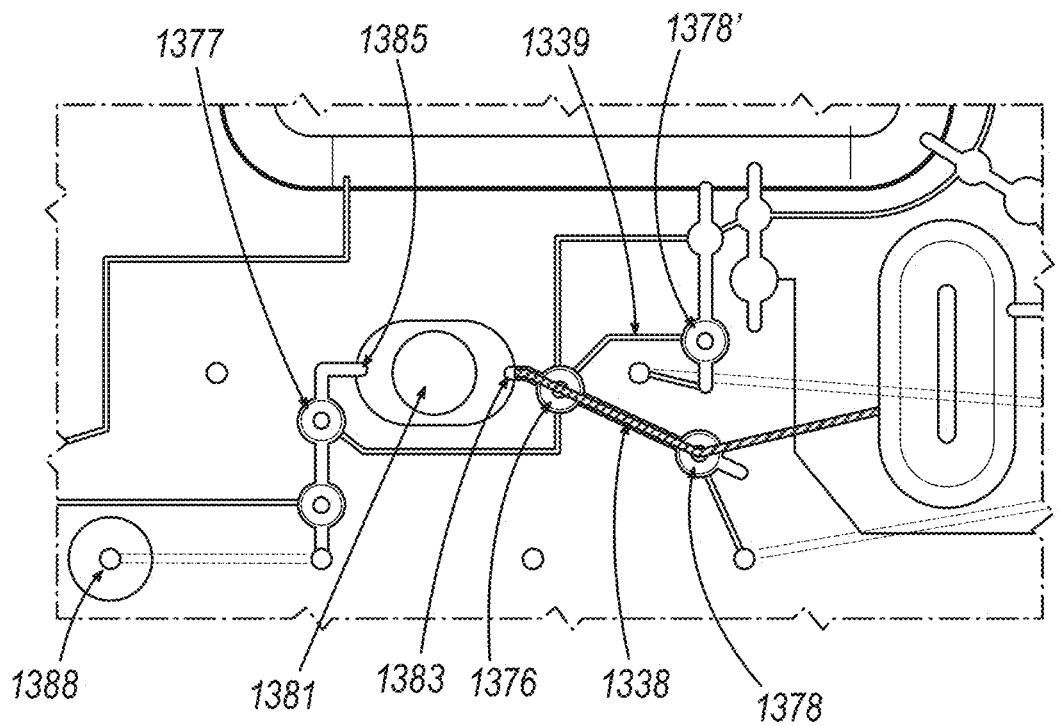
FIGS. 13A and 13B illustrate another example of a UV measurement chamber.
Figure 13B:
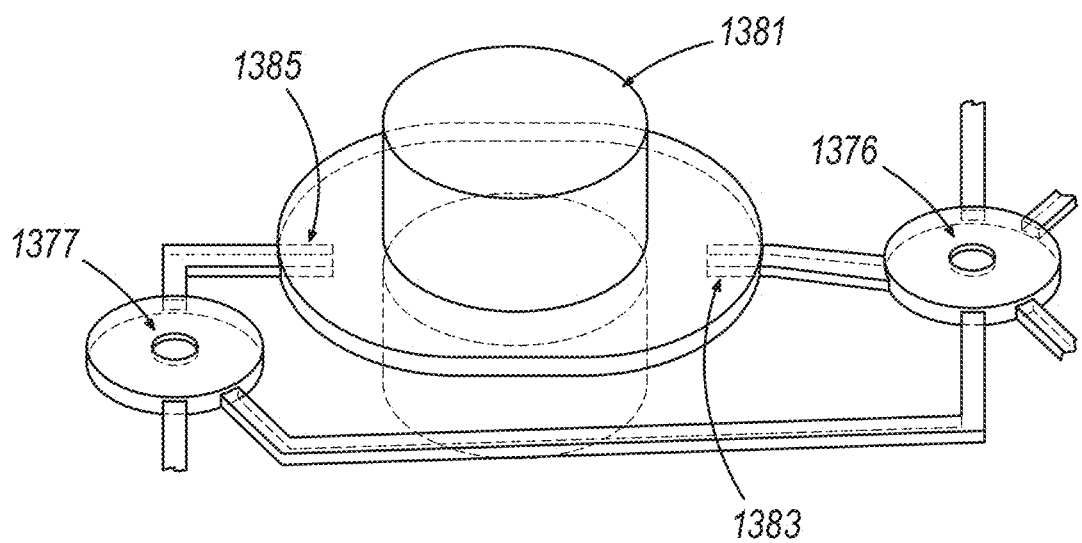

Another example of a UV measurement chamber is shown in FIGS. 13A and 13B. In this example, the UV measurement chamber 1381 is formed by a thinned region of the upper plate and lower plate (with the UV chamber 1381 formed between them) in the space may otherwise contain an elastic layer. The UV measurement chamber in this example is formed of a COC polymer (from the upper and lower layers) and has a diameter of about 2.5 mm. The elastic layer (e.g., PDMS) has been cut out to form a chamber having dimensions of 3 mm by 4.5 mm. In this example the UV chamber includes a fluid inlet 1383 coupled to a valve 1376 and a fluid outlet 1385 coupled to a second valve 1377. The fluid inlet valve 1376 is in fluid communication with a polynucleotide sample line 1339 and a water (or buffer/blank) fluid line 1338; flow through each of these lines is also controlled by valves 1378, 1378'. In operation the valves may be opened and fluid from either the polynucleotide sample line 1339 or the water/buffer/blank line 1338 may be either pumped into the UV measurement chamber 1381, or the fluid may be pulled into the UV measurement chamber by applying negative pressure (suction) from a suction/waste port 1388.

Figure 12:
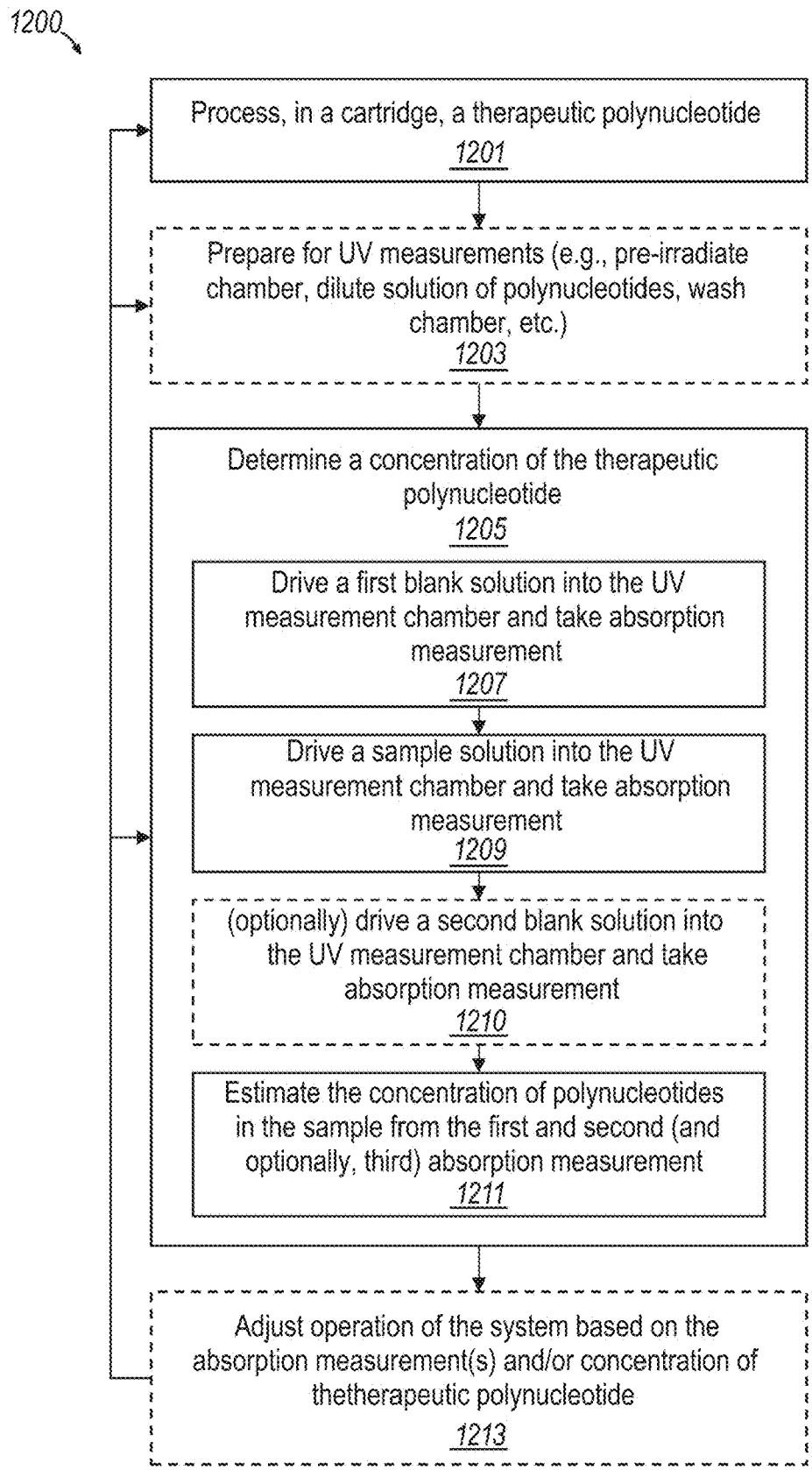
FIG. 12 schematically illustrates a method of processing a polynucleotide and including using a UV absorption measurement that may be used to estimate a concentration of the polynucleotide and/or may be used to modify processing of the polynucleotide.

FIG. 12 schematically illustrates the operation of an apparatus as described above to process a polynucleotide using a microfluidic driver apparatus operating on a cartridge. In this example, the method may for (e.g., in a cartridge) a therapeutic polynucleotide 1201, as described above. Additional processes may be performed on the polynucleotide (e.g., purification, concentration, etc.). In addition, the UV measurement sub-system may be prepared for taking measurements 1203. For example, the apparatus may pre-irradiate the chamber as described above and/or may form one or more dilutant of the polynucleotide solution. The apparatus may then determine a concentration of the therapeutic polynucleotide 1205. This may include serially driving a first blank solution into the UV measurement chamber and taking a first absorption measurement 1207, then driving the sample solution (or a diluted version thereof) and taking the second absorption measurement 1209. Optionally a second blank measurement may be taken 1210, in which case the first and second blank measurements may be compared and/or combined. For example, the two blank measurements may be averaged. The apparatus may then estimate the concentration of the polynucleotides in the sample from the first and second (and optionally the third) absorption measurements 1211.

Thereafter, the method (or an apparatus performing it) may adjust operation of the apparatus (e.g., the microfluidic driver apparatus) based on the absorption measurements and/or the concentration of the therapeutic polynucleotide 1213.

EXAMPLES

Figure 14:
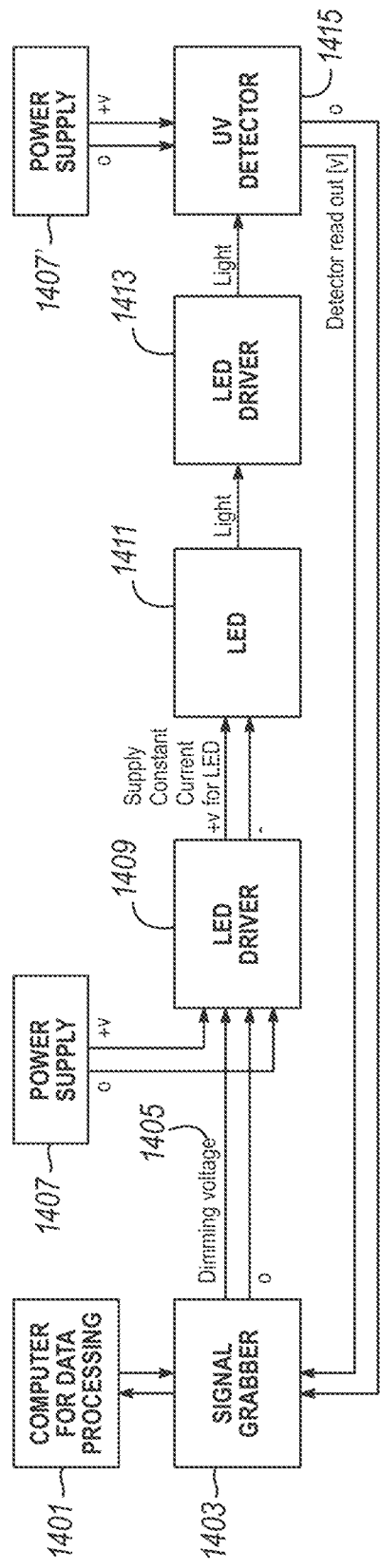
FIG. 14 schematically illustrates one example of a microfluidic apparatus including subsystem for determining polynucleotide concentration.

FIG. 14 illustrates an example of a portion of an apparatus as described herein including a UV detection sub-system. For example, the apparatus may include a controller (shown here as a separate processor 1401 for data processing); in some examples the controller may be integrated into the apparatus. In this example both the UV light source (shown as an LED 1411) and the UV detector 1415 include power supplies 1407, 1407' that may allow them to be separately adjusted. For example, the LED intensity may be increased or decreased (e.g., brightened/dimmed 1405) by adjusting the power supplied by the power sully 1407 to the LED driver 1409 which controls the output of the LED 1411 and therefore illumination through the sample or blank in the UV detection chamber 1413. Similarly, the power supplied to the UV detector 1415 by the power supply 1407' may be adjusted to increase or decrease the sensitivity of the LED detector sensing absorption. As described above and illustrated in FIG. 14, the resulting UV absorption signal(s) may be stored and/or analyzed by the apparatus; in FIG. 14 the apparatus includes a signal grabber circuitry 1403 to capture, store and/or transmit the resulting absorptance. The controller may further provide feedback based on the detected absorbance(s) to adjust either or both the intensity of the UV light source 1409 and/or the detector sensitivity of the UV detector 1415.

As described above, any of the apparatuses configured to determine polynucleotide concentration using UV light absorption may be configured to adjust the UV light intensity over a range of values in order to achieve linear output range for absorption by the polynucleotide sample, thereby avoiding saturation of the absorption signal output. In FIG. 15A, the dimming voltage vs. current is shown for one example of a UV light source (LED) that may be used. The dimming voltage over this range is linear and may be related in a linear manner to the resulting light intensity, as shown in FIG. 15B. FIG. 15B shows the voltage readout for different dimming voltages applied. Referring back to FIG. 14, the LED may therefore be adjusted to increase or decrease the intensity (e.g., by adjusting the dimming voltage) based on the detected absorption signal from a sample and blank. For example, if the absorption signal received for a particular polynucleotide signal is too high (e.g., at or near saturation) the voltage applied to the UV LED may be reduced, by adjusting the dimming voltage. Alternatively, or additionally, the sensitivity of the UV detector may be decreased or increased. The same adjustments (e.g., dimming voltage) may be used for both the sample and blank(s).

Figure 16A:
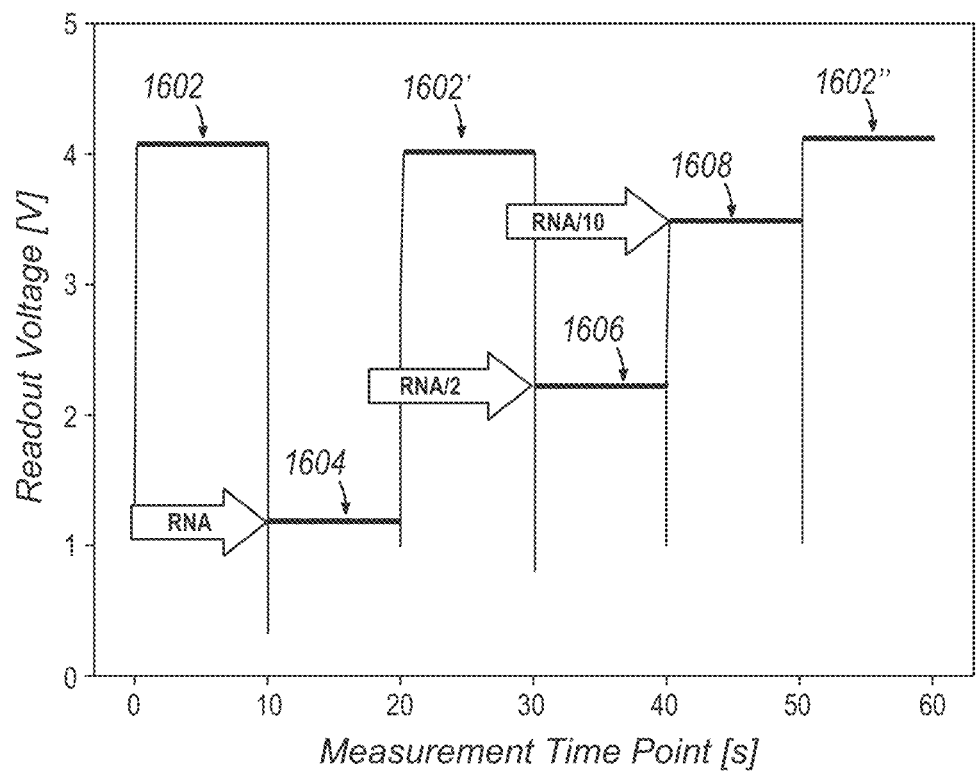
FIGS. 16A and 16B illustrate an examples of UV detection of concentration using an apparatus as described herein.

In general, the apparatuses and methods described herein may provide polynucleotide concentration determination that is highly accurate and repeatable. For example, FIG. 16A illustrates an example of detection of the concentrations of various samples (and corresponding blanks). In FIG. 16A, an apparatus as described herein may be used to apply first a blank 1602, and then measure a UV absorption, as shown in FIG. 16A. In this example, absorption of each polynucleotide sample or blank is made for 10 seconds, and stable readings are acquired over this entire time period; in some examples, absorption may be measured for shorter (e.g., 5 sec, 1 sec, 0.5 sec, 0.1 sec, etc.) or longer times. After the first blank is measured, a first RNA sample (e.g., undiluted) is moved into the UV measurement chamber to replace the blank, and UV absorption is measured 6104. The sample fluid may then be moved out of the UV measurement chamber, and a second blank may be moved in and measured 1602', followed by a second sample (e.g., an RNA sample that is diluted by half) 1606. A second sample is measured 1608 (e.g., an RNA sample diluted by 10-fold), followed by a third blank 1602". The sample measurements may be different polynucleotides and/or different dilutions of the same polynucleotide (as shown in FIG. 16A).

Figure 16B:
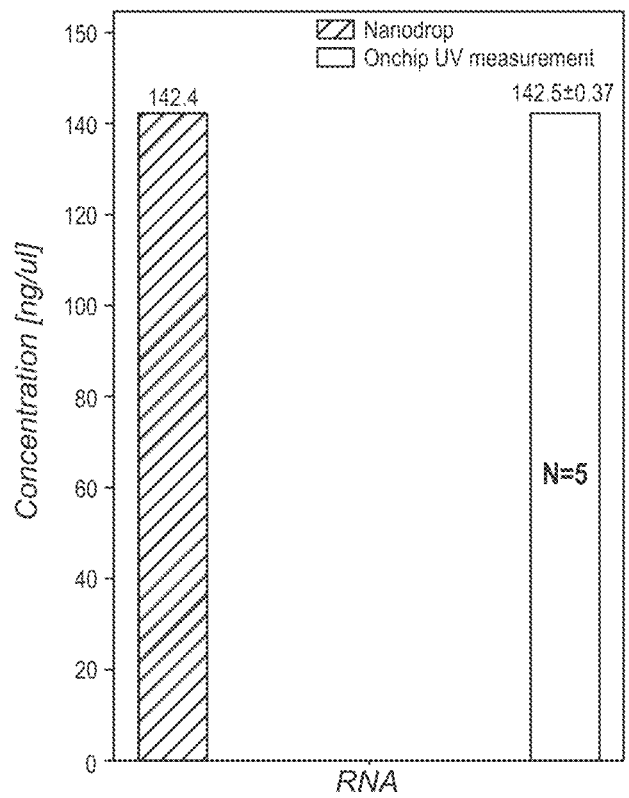

FIG. 16B shows a comparison between the measurements made as described above and a commercially available concentration detection system that required different methods and techniques for determining analyte concentration, showing very close agreement. In this example, the commercially available analyte concentration detector may be, e.g., a Nanodrop™ system (Thermo Fisher). Thus, the methods and apparatuses described herein which are particularly well suited for on-cartridge (e.g., "on chip") UV and therefore concentration measurements, show similar or even better results as compared to other, larger and more expensive systems.

Figure 17:
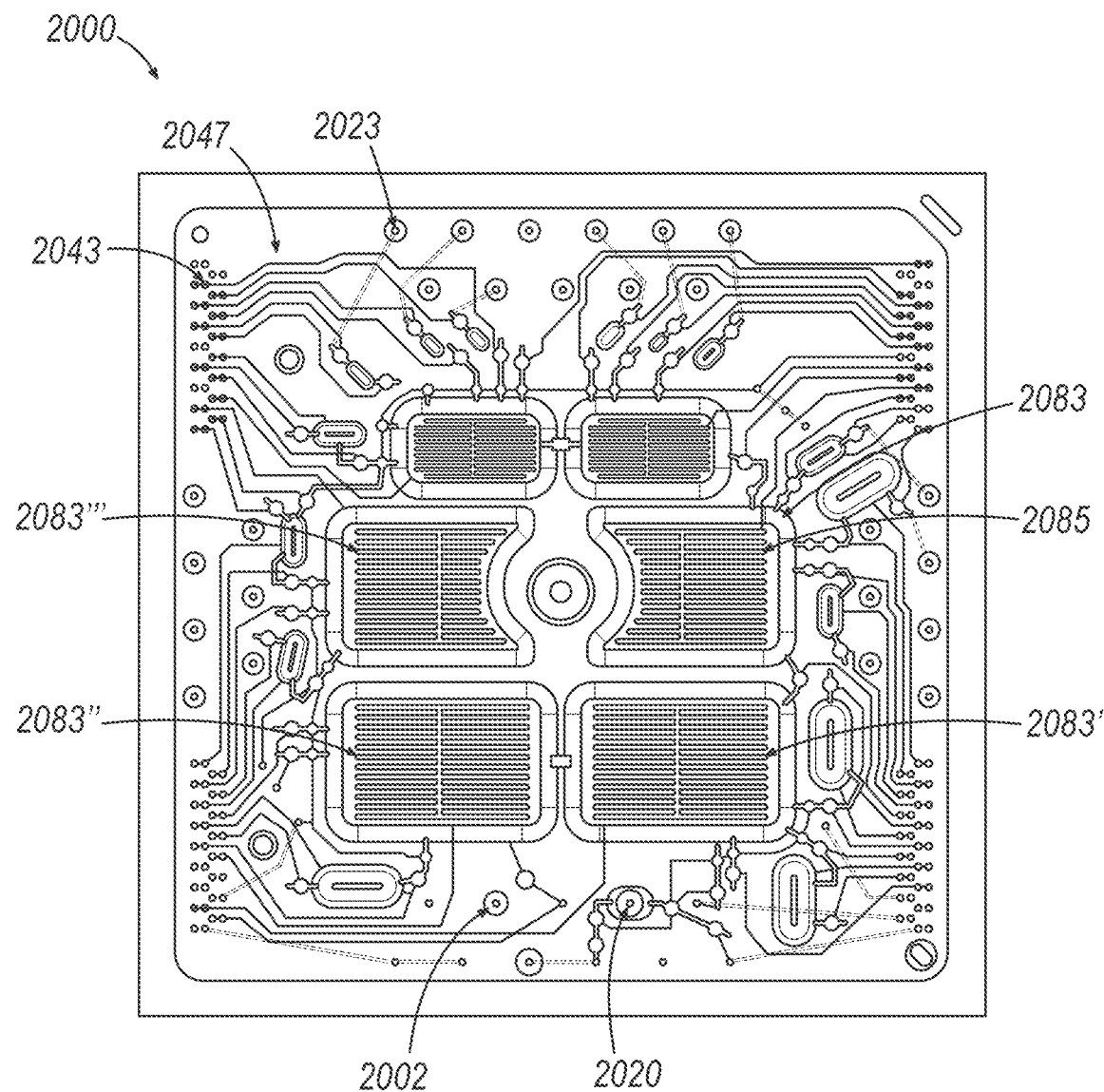
FIG. 17 depicts a top plan view of another example of a cartridge including a UV measurement chamber.
Figure 18:
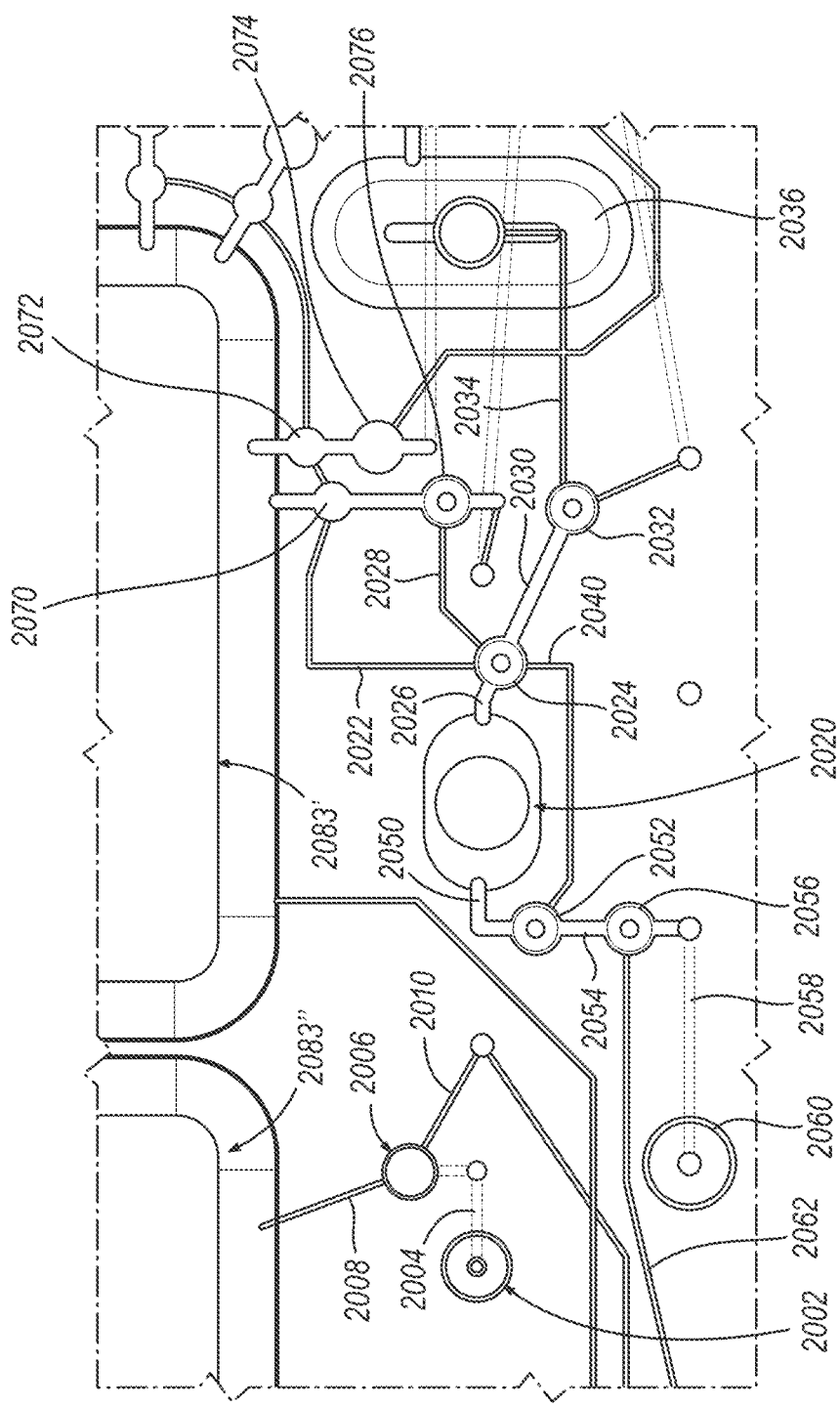
FIG. 18 depicts an enlarged top plan view of a region of the cartridge of FIG. 17.

FIGS. 17-18 depict another example of a cartridge (e.g., "biochip") 2000. Cartridge 2000 of this example may be configured and operable like any of the other cartridges described herein, with examples of differences described below. Cartridge 2000 of this example includes a plurality of pressure ports 2043 and a plurality of fluid ports 2023. A plurality of pressure channels 2047 extend from pressure ports 2043. Pressure ports 2043 and pressure channels 2047 may a provide for the application of positive and/or negative pressure to the pressure-receiving sides of each chamber, channel, vacuum cap, valve, etc. in cartridge 2000. Thus, a controller may control movement of fluid within cartridge 2000, including mixing, pumping, valving, etc., by applying positive or negative pressure to specific pressure ports 2043 or combinations of pressure ports 2043. Pressure channels 2047 may thus be understood as pneumatic channels. Pressure ports 2043 and fluid ports 2023 may be arranged on an upper side of cartridge 2000 (e.g., around a periphery cartridge 2000), as shown in FIG. 17. Alternatively, pressure ports 2043 and/or fluid ports 2023 may be arranged on a lower side of cartridge 2000.

Each fluid port 2023 is fluidically coupled with a corresponding fluid channel in cartridge 2000, such that each fluid channel extends from a respective fluid port 2023. By way of example only, one or more fluid ports 2023 may be fluidically connected with a source of plasmid, PCR buffer, primer(s) (e.g., T7 primer), oligo dTs, enzyme (e.g., polymerase), purification substrate (e.g., Ampure™ beads), RNASE-free air, dNTPs, a product output collection receptacle, output from a UV yield detection channel, buffer for UV detection, water, Ethanol (e.g., 70% Ethanol rinse), or waste. Fluid ports 2023 (and corresponding channels) may be understood as providing paths for communication of liquids. In some cases, one or more fluid ports 2023 are redundant and thus not used during certain processes.

Cartridge 2000 of this example further includes PCR chambers 2083, 2083', 2083", 2083''', each of which may include a liquid-contacting side, a pressure (e.g., gas/pneumatic) side, and which are fluidically connected to adjacent PCR chambers. Each PCR chamber has a fixed volume, and as described above for general chambers, are formed between a first surface of a first plate and the second surface of a second plate; the first and second plates may be joined together with an elastically deformable membrane (e.g., elastic layer) between them, dividing the chamber. The elastic layer divides each chamber into a liquid-contacting side in the second surface and a pressure-receiving side in the first surface.

The pressure-receiving side of each chamber PCR chamber 2083, 2083', 2083", 2083''' is partitioned by one or more fluidly connected serpentine pathways 2085. These serpentine pathways 2085 in the pressure receiving surface are configured to distribute the positive and negative pressure applied through the corresponding pressure channels 2047 (and in particular, the negative pressure) more evenly across the surface of the relatively large chamber. The sub-division of the pressure-receiving surface in each PCR chamber 2083, 2083', 2083". 2083''' by serpentine pathways 2085 may support the deflectable membrane when negative pressure is applied to pull it away from the fluid-containing chamber. This may also prevent the formation of bubbles and may maintain a fixed, predictable volume.

Cartridge 2000 of this example further includes a UV measurement chamber 2020 in fluid communication with one or more of the PCR chambers 2083, 2083', 2083", 2083''' and/or blank (e.g., buffer) chambers, such that UV measurement chamber 2020 may receive aliquots of liquid from one or more of the PCR chambers 2083, 2083', 2083", 2083''' and/or blank (e.g., buffer) chambers. UV measurement chamber 2020 may include a UV yield detection window that is configured to pass UV light therethrough for quantification of a polynucleotide within the UV measurement chamber 2020 as described herein. As best seen in FIG. 18, an inlet liquid channel 2026 leads into UV measurement chamber 2020; while an outlet liquid channel 2050 leads out of UV measurement chamber 2020.

A vacuum cap 2024 is positioned upstream of inlet liquid channel 2026. Another vacuum cap 2052 is positioned downstream of outlet liquid channel 2050. In some versions, vacuum caps 2024, 2052 are configured and operable like vacuum cap 1938 described above with reference FIG. 10C. In the present example, vacuum caps 2024, 2052 are operable to remove bubbles from liquid in UV measurement chamber 2020. Vacuum caps 2024, 2052 are pneumatically coupled together via a pneumatic channel 2040, which facilitates simultaneous operation of vacuum caps 2024, 2052. In some versions, one or both of vacuum caps 2024, 2052 may also serve as valves that selectively permit or prevent communication of liquid aliquots/samples to/from UV measurement chamber 2020. In such scenarios, the vacuum caps 2024, 2052 may be pneumatically actuated like other valves as described herein.

A pair of liquid channels 2028, 2030 lead into vacuum cap 2024. A valve 2076 selectively permits or prevents the flow of liquid to vacuum cap 2024 via channel 2028. Similarly, a valve 2032 selectively permits or prevents the flow of liquid to vacuum cap 2024 via channel 2030. Another vacuum cap 2070 is in fluid communication with valve 2076; and is pneumatically coupled with vacuum cap 2024 via channel 2022. Yet another vacuum cap 2072 is also pneumatically coupled with vacuum cap 2070; and is in fluid communication with another valve 2074. Vacuum caps 2024, 2052, 2070, 2072 may thus be pneumatically coupled together via channels 2022, 2040 to facilitate simultaneous operation of vacuum caps 2024, 2052, 2070, 2072.

In the present example, valve 2076 is fluidically interposed in a path between PCR chambers 2083, 2083', 2083", 2083''' and channel 2028, such that valve 2076 is operable to selectively prevent or allow communication of liquid from PCR chambers 2083, 2083', 2083", 2083''' to channel 2028; and thus to UV measurement chamber 2020 via vacuum cap 2024 and channel 2026. In some versions, a PCR chamber 2083, 2083', 2083", 2083''' may be pressurized to push the liquid aliquot/sample into UV measurement chamber 2020 while valves in the path may be in an open state. Alternatively the liquid may be driven into UV measurement chamber 2020 by applying vacuum through output port 2060 while the valves in the path may be in an open state. In still other versions, a main reservoir may be pressurized; and valves 2076, 2052 (and perhaps vacuum caps 2024, 2052) may be driven in a sequence to peristaltically pump the liquid from a PCR chamber 2083, 2083', 2083", 2083''' into UV measurement chamber 2020. Alternatively, any other suitable structural features and/or techniques may be used.

Channel 2030 provides a path for fluid communication of a blank or buffer (e.g., water, etc.) to UV measurement chamber 2020 via vacuum cap 2024 and inlet liquid channel 2026. As noted above, valve 2032 selectively permits or prevents the flow of liquid to vacuum cap 2024 (and, hence, to inlet liquid channel 2026 and UV measurement chamber 2020) via channel 2030. A channel 2034 extends from valve 2030 to a pump chamber 2036. Pump chamber 2036 may be further fluidically coupled with a source of blank or buffer; and may be pneumatically operated to drive the blank or buffer fluid toward UV measurement chamber 2020 via channels 2034, 2030, 2026 when valve 2032 is in an open state. Alternatively, the blank or buffer liquid may be driven into UV measurement chamber 2020 by applying vacuum through output port 2060 while the valves in the path may be in an open state.

Another channel 2054 and valve 2056 are further coupled with vacuum cap 2052. A pneumatic channel 2062 further extends from valve 2056 and provides a path for pressurizing valve 2056 to thereby transition valve 2056 between an open state and a closed state. Another channel 2058 also extends from valve 2056; and provides a path for fluid communication from valve 2056 to output port 2060. Output port 2060 may be operated similar to suction/waste port 1388 described above.

Cartridge 2000 of this example further includes a pooling output port 2002. As best seen in FIG. 18, pooling output port 2002 is coupled with a liquid communication channel 2004, which leads to a valve 2006. Valve 2006 is in fluid communication with a pneumatic channel 2010, through which valve 2006 may be selectively pressurized to thereby transition valve 2006 between an open and closed state. A liquid communication channel 2008 is also coupled with valve 2006. Channel 2008 is further fluidically coupled with PCR chambers 2083, 2083', 2083", 2083''', such that fluid may be conveyed from PCR chambers 2083, 2083', 2083", 2083''' to pooling output port 2002 via channels 2004, 2008 when valve 2006 is in an open state. Pooling output port 2002 may thus be used to pool the outputs of PCR chambers 2083, 2083', 2083", 2083''' into a single batch in a receptacle that is outside of cartridge 2000, as described above.

Some versions of cartridge 2000 may further include an additional output port (not shown) that is fluidically coupled with PCR chambers 2083, 2083', 2083", 2083''', such that fluid may be conveyed from PCR chambers 2083, 2083', 2083", 2083''' to the additional output port (not shown) in lieu of being conveyed to pooling output port 2002. In other words, output fluid from PCR chambers 2083, 2083', 2083", 2083''' may be selectively conveyed to either pooling output port 2002 or the additional output port, such that PCR chambers 2083, 2083', 2083", 2083''' may effectively have two distinct and individually controlled outputs. In some scenarios, the fluid communicated from PCR chambers 2083, 2083', 2083", 2083''' to the additional output port (not shown) may be retained for further analysis or may be otherwise dealt with. In some such scenarios, fluid from PCR chambers 2083, 2083', 2083", 2083''' may be communicated to the additional output port (not shown) instead of being communicated to pooling output port 2002 due to concentration measurement data obtained through UV measurement chamber 2020. It should also be understood that at least some of the fluid output from PCR chambers 2083, 2083', 2083", 2083''' may be communicated out through output port 2060. In some such scenarios, the fluid communicated out through output port 2060 is treated as waste.

In some instances, the intensity of a UV light source (e.g., UV LED 101) may change over time. In addition, or in the alternative, the UV transmissivity may vary among different cartridges. Such differences in UV light intensity and/or UV transmissivity may affect the Limit of Quantitation (LoQ) of a UV measurement process. In other words, variations in UV light intensity, UV transmissivity, and/or other sources of noise may impact the maximum and minimum sample concentrations that may be reliably detected through UV measurements as described herein with some predefined confidence. It may therefore be desirable to provide a process for establishing the upper and lower LoQs for a cartridge before using the cartridge to obtain polynucleotide concentration measurements during a process for forming a therapeutic polynucleotide.

Figure 19:
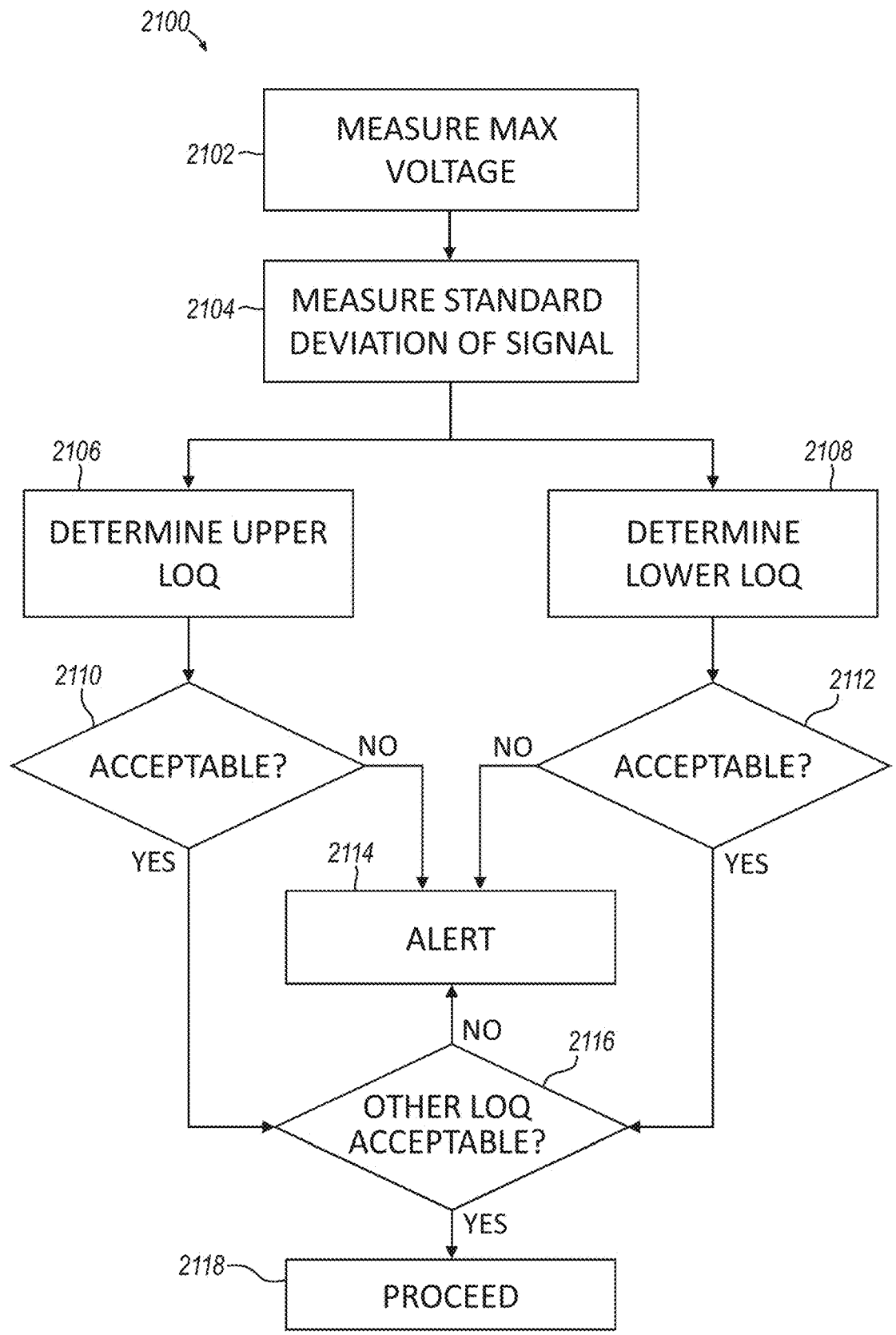
FIG. 19 depicts a flow chart illustrating an example of a method that may be used to evaluate limits of quantitation.

FIG. 19 depicts an example of a process 2100 that may be used to evaluate the upper and lower LoQs for a cartridge before using the cartridge to obtain polynucleotide concentration measurements during a process for forming a therapeutic polynucleotide. This process 2100 may be used with any of the various cartridges described herein. Process 2100 may be executed by controller 221, processor 1401, and/or any other suitable hardware component(s). Process 2100 begins with a measurement of the maximum voltage of the UV detector (e.g., UV detector 103, 1415), as shown in block 2102. Next, the standard deviation of the UV detection signal is measured, as shown in block 2104. With these measured values, process 2100 then includes determining the upper LoQ, as shown in block 2106; and determining the lower LoQ, as shown in block 2108.

By way of example only, the upper LoQ may be determined (block 2106) through the following equation (I):

$$\text{Upper } LoQ = \log_{10}\left(\frac{V_{max}}{3*V\sigma}\right)*\frac{1}{\epsilon l} \qquad (\text{I})$$

where Vmax=the maximum voltage;
$V_\sigma$=the standard deviation of the signal;
$\epsilon$=UV absorption coefficient of the nucleotide; and
l=the sample thickness (i.e., path length).

By way of further example only, the lower LoQ may be determined (block 2108) through the following equation (II):

$$\text{Lower } LoQ = \log_{10}\left(\frac{V_{max}}{V_{max} - 3*V\sigma}\right)*\frac{1}{\epsilon l} \qquad (\text{II})$$

where Vmax=the maximum voltage;
$V_\sigma$=the standard deviation of the signal;
$\epsilon$=UV absorption coefficient of the nucleotide; and l=the sample thickness (i.e., path length).

The determined upper LoQ may be compared against a threshold to determine whether the upper LoQ is acceptable, as shown in block 2110. Similarly, the determined lower LoQ may be compared against a threshold to determine whether the lower LoQ is acceptable, as shown in block 2112. If either the upper LoQ or the lower LoQ is unacceptable, then an alert may be provided to the operator, as shown in block 2112. By way of example only, the alert may include a message indicating that the UV light source should be replaced; a message indicating that the measured concentration is too close to one the upper or lower LoQ, such that the measured concentration is not reliable; and/or any other suitable message. In some versions, controller 221, processor 1401, and/or any other suitable hardware component(s) may prevent further use of the cartridge and/or UV light source if the upper LoQ or the lower LoQ are found unacceptable, unless and until corrective action is taken by the operator and then upper LoQ and lower LoQ are subsequently found acceptable. In any case, if the upper LoQ and the lower LoQ are both found to be acceptable, then the controller 221, processor 1401, and/or any other suitable hardware component(s) may allow the cartridge to be used to form a therapeutic polynucleotide (and/or to perform any other suitable process), as shown in block 2118.

In some instances, particularly when the sample is at a substantially high concentration level (e.g., such that the UV transmissivity of the sample is substantially low), the sample may tend to induce substantial backscattering when the sample is irradiated with UV light. Such backscattering of the UV light may adversely impact the accuracy of readings by the UV detector (e.g., UV detector 103, 1415) by adversely impacting the dynamic range. In some cases, such backscattering may be corrected through data processing techniques; but such data processing techniques may require certain geometry assumptions. Another alternative may include using a UV light blocking material to suppress scattered light and thereby improve the dynamic range of the UV detector.

Figure 20:
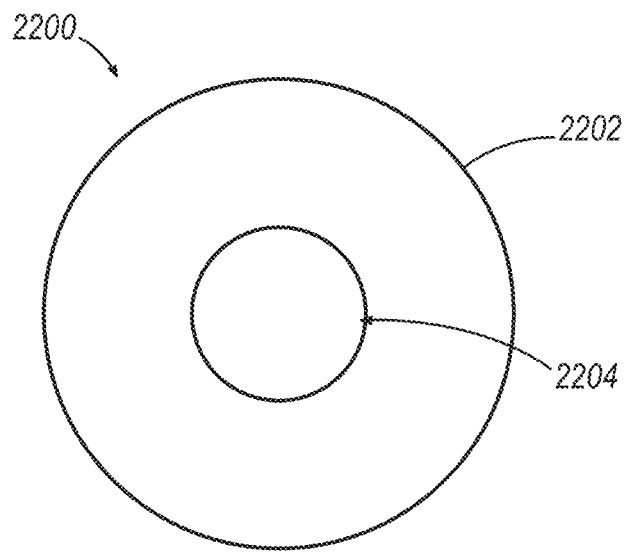
FIG. 20 depicts a top plan view of an example of a backscatter shield.
Figure 21:
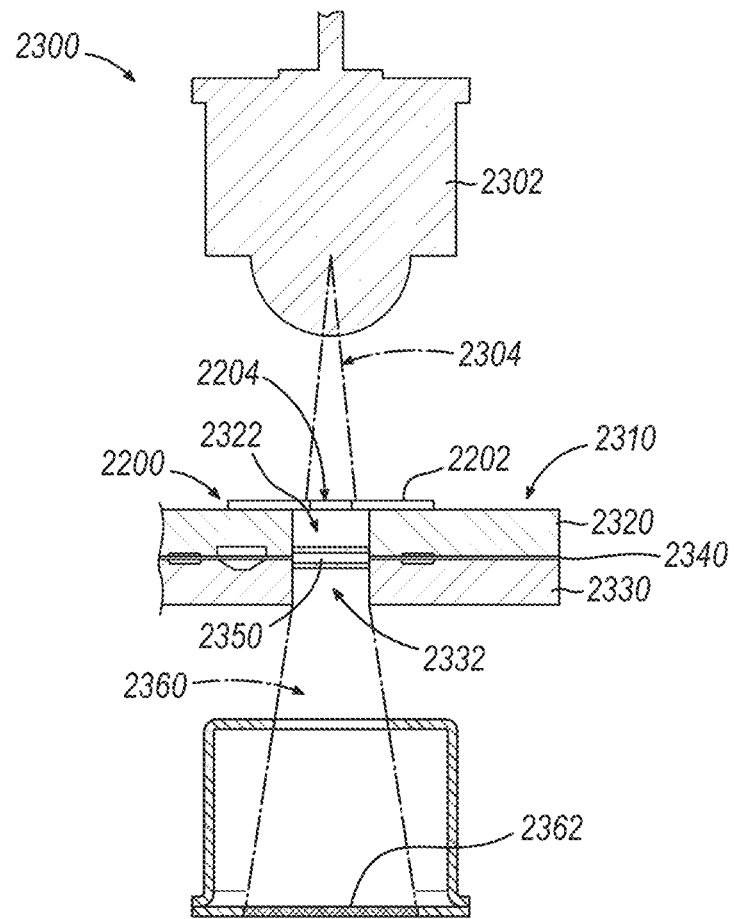
FIG. 21 depicts a cross-sectional side schematic view of an arrangement including a cartridge with the backscatter shield of FIG. 20 during a UV measurement process.

FIGS. 20-21 show one example of a way in which UV light blocking material may be used to suppress scattered light and thereby improve the dynamic range of a UV detector. In particular, FIGS. 20-21 show a UV blocking member 2200 that includes a disc-shaped body 2202 with a central opening 2204 formed therethrough. Body 2202 comprises a material that is configured to prevent transmission of UV light through body 2202, through central opening 2204 permits transmission of UV light through central opening 2204.

FIG. 21 shows an arrangement 2300 where UV blocking member 2200 is applied to a cartridge 2310. Cartridge 2310 may be configured and operable like any other cartridge described herein. Cartridge 2310 of this example includes an upper plate 2320, a lower plate 2330, and an elastic layer 2340 interposed between plates 2320, 2330. A recess 2322 formed in upper plate 2320 provides a first UV measurement region; while a recess 2332 formed in lower plate 2330 provides a second UV measurement region underneath recess 2322. A UV measurement chamber 2350 is interposed between recesses 2322, 2332; and is configured and operable like other UV measurement chambers described herein.

UV blocking member 2200 is positioned atop upper plate 2320, directly over recess 2322. In some versions, UV blocking member 2200 is adhered to the upper surface of upper plate 2320. Alternatively, UV blocking member 2200 may be secured relative to upper plate 2320 in any other suitable fashion. As shown in FIG. 21, the diameter of opening 2204 is smaller than the diameter of recess 2322. Opening 2204 allows UV light 2304 from a UV light source 2302 to enter recess 2322 through UV blocking member 2200, such that the UV light 2304 may irradiate a sample in UV measurement chamber 2350. To the extent that the sample in UV measurement chamber 2350 provides backscattering of the UV light 2304, body 2202 will substantially restrict such backscattering. The UV light 2360 exiting UV measurement chamber 2350 through recess 2332 will reach UV detector 2362, which will generate a signal indicating the concentration of the sample in UV measurement chamber 2350 as described herein.

Figure 22:
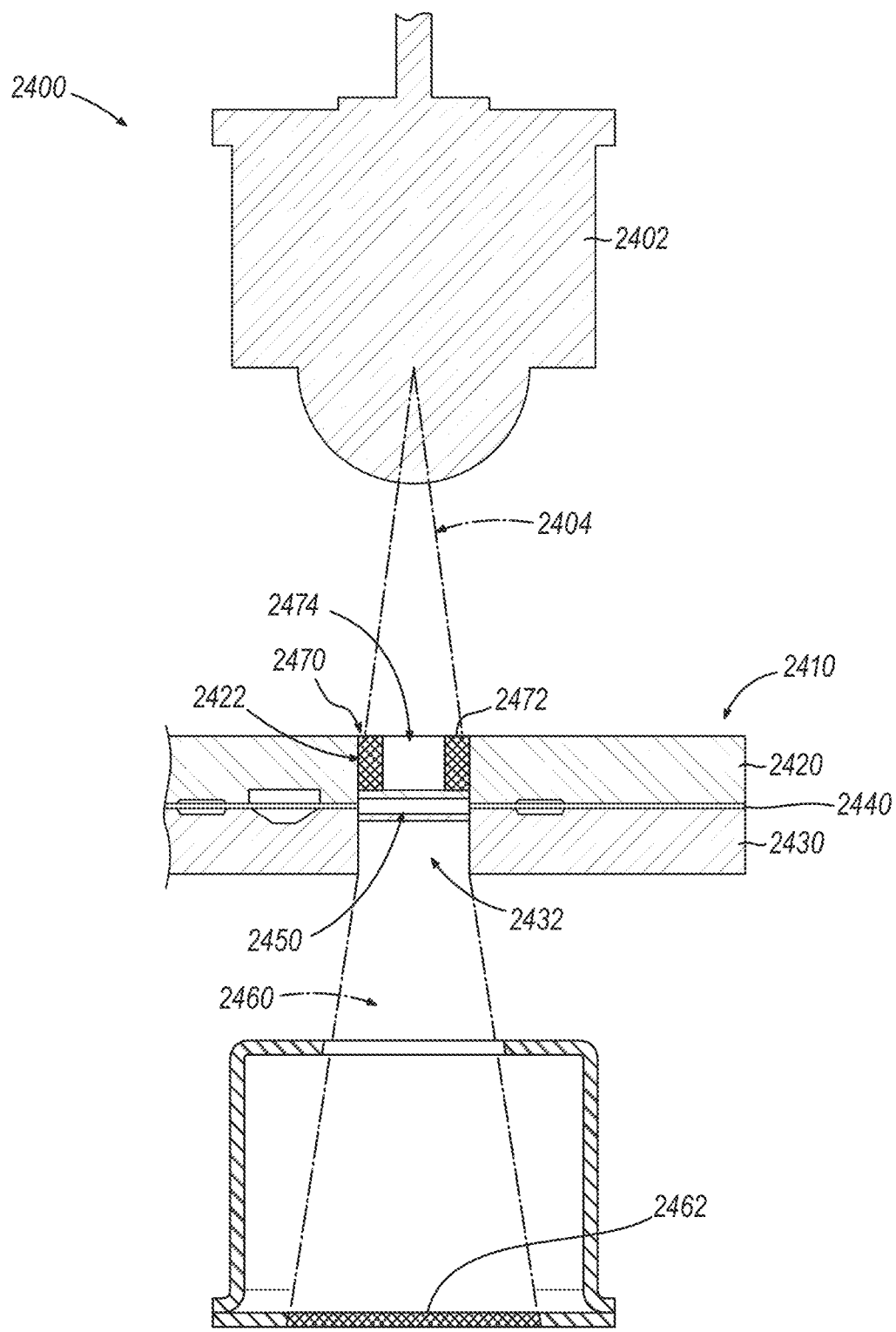
FIG. 22 depicts a cross-sectional side schematic view of an arrangement including a cartridge with another example of a backscatter shield during a UV measurement process.

FIG. 22 depicts another example of an arrangement 2400 that may be used to mitigate backscattering of UV light from a UV measurement chamber. Like arrangement 2300 described above, arrangement 2400 of this example includes a UV light source 2402, a cartridge 2410, and a UV detector 2462. Like cartridge 2310 described above (and like other cartridges described herein), cartridge 2410 of this example includes an upper plate 2420, a lower plate 2430, and an elastic layer 2440 interposed between plates 2420, 2430. A recess 2422 formed in upper plate 2420 provides a first UV measurement region; while a recess 2432 formed in lower plate 2430 provides a second UV measurement region underneath recess 2422. A UV measurement chamber 2450 is interposed between recesses 2422, 2432; and is configured and operable like other UV measurement chambers described herein.

Like arrangement 2300, arrangement 2400 of the present example also includes a UV blocking member 2470; but UV blocking member 2470 of this example is configured differently from UV blocking member 2200. In particular, UV blocking member 2470 of this example comprises a cylindraceous body 2472 that defines a central passageway 2472 therethrough. Body 2472 comprises a material that is configured to prevent transmission of UV light through body 2472, through central passageway 2472 permits transmission of UV light through central passageway 2472.

Body 2472 is dimensioned to fit within recess 2422, such that the outer sidewall of body 2472 contacts the inner sidewall of recess 2422. In some versions, body 2472 is secured within recess 2422 through a friction fit, using an adhesive, or using any other suitable techniques. In the present example, the inner sidewall of central passageway 2472 is configured to provide an inner diameter that is substantially constant along the height of body 2472. In some other versions, central passageway 2472 is tapered. For instance, some variations may provide an opening at the top of body 2472 that is smaller than the opening at the bottom of body 2472. Some other variations may provide an opening at the top of body 242 that is larger than the opening at the bottom of body 2472. Alternatively, central passageway 2472 may have any other suitable configuration.

As shown in FIG. 22, the diameter of central passageway 2472 is smaller than the diameter of recess 2422. It should be understood that the diameter of central passageway 2472 shown in FIG. 22 is just an example; and that the diameter of central passageway 2472 may be increased or decreased relative to what is shown in FIG. 22. In any case, central passageway 2472 allows UV light 2404 from a UV light source 2402 to enter recess 2422 through UV blocking member 2470, such that the UV light 2404 may irradiate a sample in UV measurement chamber 2450. To the extent that the sample in UV measurement chamber 2450 provides backscattering of the UV light 2404, body 2472 will substantially restrict such backscattering. The UV light 2460 exiting UV measurement chamber 2450 through recess 2432 will reach UV detector 2462, which will generate a signal indicating the concentration of the sample in UV measurement chamber 2450 as described herein.

While FIGS. 21 and 22 show UV blocking members 2200, 2470 being used in separate arrangements 2300, 2400, some other arrangements may include a combination of UV blocking members 2200, 2470. For instance, in a variation of arrangement 2400 shown in FIG. 22, UV blocking member 2200 may be positioned atop UV blocking member 2470. In some such arrangements, the diameter of opening 2204 is smaller than the diameter of central passageway 2472. In some such arrangements, UV blocking member 2200 substantially prevents backscattering that might otherwise occur through the upper opening of recess 2422; while UV blocking member 2470 prevents backscattering that might otherwise occur through the sidewall of recess 2422. As yet another example of a variation, the sidewall of recess 2422 may be laser-charred, coated with a UV blocking material, or otherwise treated to prevent transmission of UV light through the sidewall of recess 2422.

Figure 23:
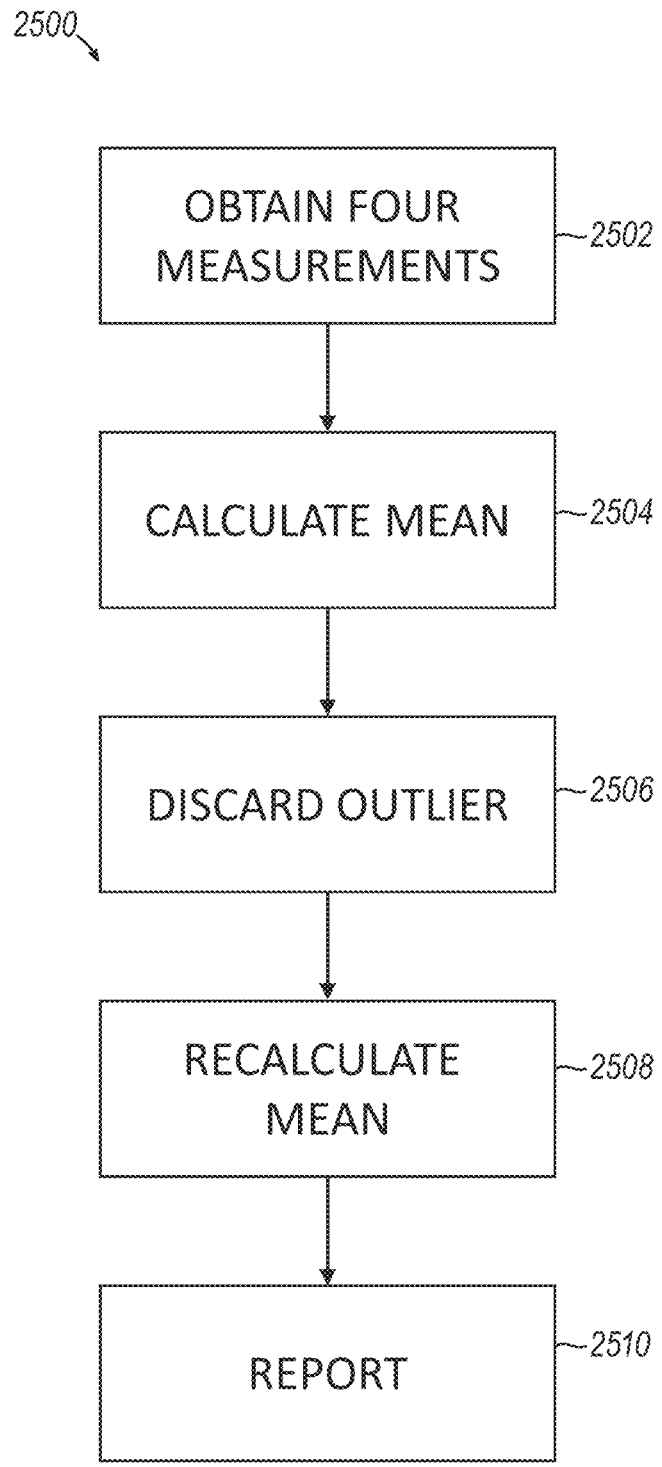
FIG. 23 depicts a flow chart illustrating an example of a method that may be used to account for bubbles in fluid in a UV measurement chamber.

In some instances, bubbles may reach a UV measurement chamber, and the presence of such bubbles in the UV measurement chamber may result in an underestimation of the concentration of a sample in the UV measurement chamber. It may therefore be desirable to provide a measurement algorithm that accounts for the possibility of inaccurate measurements that might be caused by the presence of bubbles in the UV measurement chamber. An example of such a process 2500 is shown in FIG. 23. This process 2500 may be used with any of the various cartridges described herein. Process 2500 may be executed by controller 221, processor 1401, and/or any other suitable hardware component(s). As shown in block 2502 of FIG. 23, process 2500 begins with four concentration measurements being taken based on readings from a UV detector (e.g., UV detector 103, 1415, 2362, 2462) as described herein. The mean of these four measurements is then calculated, as shown in block 2504. The four measurements are then compared to the calculated mean, with the outlier measurement being discarded, as shown in block 2506. In some versions, the outlier measurement is identified as the measurement whose value is furthest from the mean. In some other versions, the outlier is identified based on a T-test. As yet another variation, the measurement providing the lowest concentration value may be automatically identified as the outlier. In some such versions, the calculation of the mean (block 2504) may be omitted.

After the outlier measurement is discarded (block 2506), the mean of the remaining three measurements is then calculated, as shown in block 2508. This updated mean is then reported (e.g., as the measured concentration), as shown in block 2510. In some cases, the standard deviation is reported along with the mean. The updated mean (and perhaps the standard deviation) may be reported to an operator and/or to a control algorithm, which may automatically modify one or more subsequent operations based on the reported mean (and perhaps standard deviation). By way of further example only, the updated mean may be used for pooling as described herein.

In some instances, the calculation of the mean of the first four measurements as shown in block 2504, and the subsequent comparison of the first four measurements to that mean, may reveal that all four measurements were substantially close to the mean. In other words, the standard deviation from the first mean calculation may be substantially small (e.g., below a predetermined threshold). In some such scenarios, the process 2500 may stop and report the mean (similar to what is shown in block 2510 and described above) without discarding the outlier (block 2506) and recalculating the mean (block 2508). While four measurements are initially utilized in process 2500 of the present example, other versions may provide more or fewer than four measurements as an initial step. Similarly, while only one outlier is discarded in process 2500 of the present example, other versions may discard two or more outliers.

As an alternative to using the process 2500 shown in FIG. 23 and described above, a quad detector may be used to account for the presence of any bubbles in the sample. For instance, differences in voltages across the axis of the quad may indicate an inhomogeneous sample. Such versions may warrant a calibration measurement after each cartridge is loaded, to account for optic variations among cartridges. Such calibrations may be automated.

As yet another example of an alternative to using the process 2500 shown in FIG. 23 and described above, an imaging detector may be used to account for the presence of any bubbles in the sample. For instance, image analysis and/or machine-learning techniques may be used to identify bubbles. In the event that bubbles are detected, a vacuum cap (e.g., like vacuum cap 1938 described above) may be used to automatically remove the bubbles in response to the optical detection of bubbles. Alternatively, any concentration measurements captured during the detection of bubbles may be ignored. Alternatively still, the optically captured bubble data may be utilized to apply a correction to a concentration measurement, to effectively cancel out the presence of the bubbles in the fluid.

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A cartridge device for processing a polynucleotide, the cartridge device comprising: a first layer having a first thickness; a second layer having a second thickness; an elastic material extending between the first layer and the second layer and separating the first layer from the second layer by a separation thickness; and an ultraviolet (UV) measurement region formed through the first and second layers, wherein a region of the first layer in the UV measurement region has a thickness that is equal or less than the first thickness, a region of the second layer the UV measurement region has a thickness that is equal or less than the second thickness, and wherein the elastic material is absent from between the region of the first layer in the UV measurement region and the region of the second layer the UV measurement region to form a UV measurement chamber having the separation thickness.

Example 2

The cartridge device of Example 1, wherein the first layer comprises a polymeric material.

Example 3

The cartridge device of Example 2, wherein the first layer comprises a cyclic olefin copolymer (COC) material.

Example 4

The cartridge device of any of Examples 1 through 3, wherein the first thickness is between 1 and 5 mm.

Example 5

The cartridge device of any of Examples 1 through 4, wherein the second layer comprises a polymeric material.

Example 6

The cartridge device of Example 5, wherein the second layer comprises a cyclic olefin copolymer (COC) material.

Example 7

The cartridge device of any of Examples 1 through 6, wherein the second thickness is between 1 and 5 mm.

Example 8

The cartridge device of any of Examples 1 through 7, wherein the separation thickness is between 1 mm and 0.1 mm.

Example 9

The cartridge device of any of Examples 1 through 8, further comprising a fluid channels in second layer in fluid communication with the UV measurement chamber.

Example 10

The cartridge device of any of Examples 1 through 9, further comprising a plurality of pneumatic valves arranged to control flow into and out of the UV measurement chamber, wherein the plurality of pneumatic valves are each formed by a pneumatic chamber in the first layer and a fluid chamber in the second layer, wherein a portion of the elastic material separates the pneumatic chamber from the fluid chamber, further wherein the pneumatic chamber is in fluid communication with a pneumatic channel in the first layer configured to communicate with a pressure port on the an outer region of the cartridge device to actuate the pneumatic valve, and wherein the fluid chamber is in fluid communication with the UV measurement chamber through a fluid channel in the second layer when the pneumatic valve is open.

Example 11

The cartridge device of any of Examples 1 through 10, further comprising an in vitro transcription (IVT) chamber formed at least partially within the second layer and in fluid communication with the UV measurement chamber.

Example 12

The cartridge device of any of Examples 1 through 11, further comprising one or more vacuum ports on an outer region of the cartridge device configured to couple to a source of negative pressure to draw fluid into the UV measurement chamber.

Example 13

The cartridge device of any of Examples 1 through 12, further comprising a first inlet channel within the second layer that is in fluid communication with a first chamber configured to hold a polynucleotide sample fluid, and a second inlet channel within the second layer that is in fluid communication with a second chamber configured to hold a blank sample fluid.

Example 14

The cartridge device of any of Examples 1 through 13, further comprising one or more dilution mixing chambers in fluid communication with UV measurement chamber configured to dilute a fluid sample.

Example 15

The cartridge device of any of Examples 1 through 14, wherein a diameter of the UV measurement chamber is greater than a diameter of the region of the first layer in the UV measurement region to limit bubbles in a central region of the UV measurement chamber.

Example 16

A cartridge device for processing a polynucleotide, the cartridge device comprising: a first layer comprising a polymeric material having a first thickness; a second layer comprising a polymeric material having a second thickness; an elastic material extending between the first layer and the second layer; an ultraviolet (UV) measurement region formed through the first and second layers, wherein a region of the first layer in the UV measurement region has a thickness that is less than or equal to the first thickness, a region of the second layer the UV measurement region has a thickness that is less than or equal to the second thickness, and wherein the elastic material is removed from between the region of the first layer in the UV measurement region and the region of the second layer the UV measurement region to form a UV measurement chamber; and an in vitro transcription (IVT) chamber formed at least partially within the second layer and in fluid communication with the UV measurement chamber.

Example 17

A method for manufacturing a polynucleotide using a microfluidic driver apparatus operating on a cartridge, the method comprising: forming, in a cartridge, a therapeutic polynucleotide; and determining, by the microfluidic driver apparatus, a concentration of the therapeutic polynucleotide by: driving a first blank solution into an ultraviolet (UV) measurement chamber of the cartridge and taking a first absorption measurement through the cartridge, driving a sample solution of the therapeutic polynucleotide into the UV measurement chamber of the cartridge and taking a second absorption measurement through the cartridge, and estimating a concentration of the therapeutic polynucleotide from the first and second absorption measurements.

Example 18

The method of Example 17, further comprising adjusting, in a processor of the microfluidic driver apparatus, the operation of the microfluidic driver apparatus based on the estimated concentration of the therapeutic polynucleotide.

Example 19

The method of any of Examples 17 through 18, further comprising comparing, by a processor of the microfluidic driver apparatus, the estimated concentration of the therapeutic polynucleotide to a concentration range, and based on this comparison, directing the therapeutic polynucleotide for one of: pooling with one or more additional batches of therapeutic polynucleotide formed in the cartridge, waste, or further analysis.

Example 20

The method of any of Examples 17 through 19, further comprising diluting, under control of a processor of the microfluidic driver apparatus, the therapeutic polynucleotide to a standard concentration for output.

Example 21

The method of any of Examples 17 through 20, further comprising automatically adjusting one or more parameters of the formation of the therapeutic polynucleotide by the microfluidic driver apparatus based on the estimated concentration of the therapeutic polynucleotide.

Example 22

The method of Example 21, wherein the one or more parameters comprises one or more of: temperature, reagent volume, reagent concentration, time, and mixing.

Example 23

The method of any of Examples 17 through 22, wherein determining the concentration of the therapeutic polynucleotide further comprises performing serial dilutions within one or more chambers of the cartridge under control of the microfluidic driver apparatus and repeating the steps of driving the sample solution of the therapeutic polynucleotide for each of one or more dilutions formed by the serial dilutions to generate a dilution curve.

Example 24

The method of Example 23, wherein estimating the concentration of the therapeutic polynucleotide comprises estimating the concentration of the therapeutic polynucleotide from the dilution curve.

Example 25

The method of any of Examples 17 through 24, wherein estimating the concentration of the therapeutic polynucleotide further comprises changing one or more of a sensitivity of a UV detector and an intensity of a UV emitter of the microfluidic driver apparatus in response to the second absorption measurement through the cartridge.

Example 26

The method of any of Examples 17 through 25, further comprising pretreating the UV measurement chamber with UV light prior to taking the first absorption measurement through the cartridge.

Example 27

The method of any of Examples 17 through 26, wherein forming the therapeutic polynucleotide comprises performing an in vitro transcription (IVT) reaction to form the therapeutic polynucleotide.

Example 28

The method of Example 27, further comprising generating, in the cartridge, a template for the IVT reaction.

Example 29

The method of any of Examples 17 through 28, wherein the therapeutic polynucleotide comprises a therapeutic mRNA.

Example 30

The method of Example 29, further comprising encapsulating the therapeutic mRNA with a delivery vehicle.

Example 31

The method of any of Examples 17 through 30, wherein the microfluidic driver apparatus oversees the steps of driving the first blank solution and driving the sample solution by pneumatically deflecting one or more regions of a membrane of the cartridge to open and/or close valves of the cartridge.

Example 32

The method of Example 31, wherein the microfluidic driver apparatus pneumatically deflects one or more regions of the membrane of the cartridge to drive the first blank solution and/or the sample solution into the UV measurement chamber.

Example 33

A method for manufacturing a polynucleotide using a microfluidic driver apparatus operating on a cartridge, the method comprising: forming, in a cartridge, a therapeutic polynucleotide, wherein the therapeutic polynucleotide comprises a therapeutic mRNA; determining, by the microfluidic driver apparatus, a concentration of the therapeutic mRNA by: driving a first blank solution into an ultraviolet (UV) measurement chamber of the cartridge and taking a first absorption measurement through the cartridge, driving a sample solution of the therapeutic polynucleotide into the UV measurement chamber of the cartridge and taking a second absorption measurement through the cartridge, driving a second blank solution into the UV measurement chamber of the cartridge and taking a third absorption measurement through the cartridge, and estimating a concentration of the therapeutic polynucleotide from the first, second and third absorption measurements; and adjusting, in a processor of the microfluidic driver apparatus, the operation of the microfluidic driver apparatus based on the estimated concentration of the therapeutic polynucleotide.

Example 34

A system for making and/or processing a polynucleotide, the system comprising: a cartridge mount; a plurality of pressure lines; a plurality of fluidic lines, each coupled with or configured to couple with a fluid source, wherein each fluidic line and at least a subset of the pressure lines are configured to be secured to inlet or outlet ports on a cartridge held in the cartridge mount; an ultraviolet (UV) light source; a UV light detector; and a controller configured to control application of pressure through the pressure lines to drive fluid through the cartridge, wherein the controller is further configured to direct the formation of a therapeutic polynucleotide in the cartridge, and to estimate a concentration of the therapeutic polynucleotide by driving a first blank solution through a UV measurement chamber of the cartridge and taking a first absorption measurement using the UV light source and UV light receiver, driving a sample solution including the therapeutic polynucleotide through the UV measurement chamber of the cartridge and taking a second absorption measurement using the UV light source and UV light receiver, further wherein the controller is configured to estimate the concertation of the therapeutic polynucleotide from the first and second absorption measurement.

Example 35

The system of Example 34, wherein the controller is further configured to modify operation of the system based on the estimated concentration of the therapeutic polynucleotide.

Example 36

The system of any of Examples 34 through 35, wherein the controller is further configured to compare the estimated concentration of the therapeutic polynucleotide to a concentration range and, based on this comparison, to direct the therapeutic polynucleotide for one of: pooling with one or more additional batches of therapeutic polynucleotide formed in the cartridge, waste, or further analysis.

Example 37

The system of any of Examples 34 through 36, wherein the controller is further configured to dilute the therapeutic polynucleotide to a standard concentration for output.

Example 38

The system of any of Examples 34 through 37, wherein the controller is further configured to automatically adjust one or more parameters of the formation of the therapeutic polynucleotide based on the estimated concentration of the therapeutic polynucleotide.

Example 39

The system of Example 38, wherein the one or more parameters comprises one or more of: temperature, reagent volume, reagent concentration, time, and mixing.

Example 40

The system of any of Examples 34 through 39, wherein the controller is further configured to perform serial dilutions within one or more chambers of the cartridge and repeat the steps of driving the sample solution of the therapeutic polynucleotide for each of one or more dilutions of the sample solution of the therapeutic polynucleotide formed by the serial dilutions to generate a dilution curve.

Example 41

The system of Example 40, wherein the controller is further configured to estimate the concentration of the therapeutic polynucleotide from the dilution curve.

Example 42

The system of any of Examples 34 through 41, wherein the controller is further configured to change one or more of a sensitivity of the UV detector and an intensity of the UV light source in response to the second absorption measurement through the cartridge.

Example 43

The system of any of Examples 34 through 42, wherein the controller is further configured to pretreat the UV measurement chamber with UV light prior to taking the first absorption measurement through the cartridge.

Example 44

The system of any of Examples 34 through 43, wherein the controller is further configured to form the therapeutic polynucleotide comprises performing an in vitro transcription (IVT) reaction to form the therapeutic polynucleotide.

Example 45

The system of Example 44, wherein the controller is further configured to generate, in the cartridge, a template for the IVT reaction.

Example 46

The system of any of Examples 34 through 45, wherein the therapeutic polynucleotide comprises a therapeutic mRNA.

Example 47

The system of Example 46, wherein the controller is further configured to encapsulate the therapeutic mRNA with a delivery vehicle.

Example 48

The system of any of Examples 34 through 47, wherein the controller is further configured to pneumatically deflecting one or more regions of a membrane of the cartridge to open and/or close valves of the cartridge when driving the first blank solution, driving the second blank solution and driving the sample solution.

Example 49

The system of Example 48, wherein the controller is further configured to pneumatically deflect one or more regions of the membrane of the cartridge to drive the first blank solution, the second blank solution and/or the sample solution into the UV measurement chamber.

Example 50

A system for making and/or processing a polynucleotide, the system comprising: a cartridge; and a microfluidic driver apparatus comprising: a cartridge mount; a plurality of pressure lines; a plurality of fluidic lines, each coupled with or configured to couple with a fluid source, wherein each fluidic line and at least a subset of the pressure lines are configured to be secured to inlet or outlet ports on a cartridge held in the cartridge mount; an ultraviolet (UV) light source; a UV light detector; and a controller configured to control application of pressure through the pressure lines to drive fluid through the cartridge, wherein the controller is further configured to direct the formation of a therapeutic polynucleotide, further wherein the controller is configured to estimate a concentration of the therapeutic polynucleotide by driving a first blank solution through a UV measurement chamber of the cartridge and taking a first absorption measurement using the UV light source and UV light receiver, driving a sample solution including the therapeutic polynucleotide through the UV measurement chamber of the cartridge and taking a second absorption measurement using the UV light source and UV light receiver, and driving a second blank solution though the UV measurement chamber of the cartridge and taking a third absorption measurement using the UV light source and UV light receiver; modifying operation of the microfluidic driver apparatus based on the concertation of the therapeutic polynucleotide determined from the first, second and third absorption measurement.

Example 51

A method for manufacturing a polynucleotide using a microfluidic driver apparatus operating on a cartridge, the method comprising: forming, in a cartridge, a therapeutic polynucleotide; and determining, by the microfluidic driver apparatus, a concentration of the therapeutic polynucleotide by: driving a first blank solution into a concentration measurement chamber of the cartridge and taking a first measurement through the cartridge, driving a sample solution of the therapeutic polynucleotide into the concentration measurement chamber of the cartridge and taking a second measurement through the cartridge, and estimating a concentration of the therapeutic polynucleotide from the first and second measurements; and comparing, by a processor of the microfluidic driver apparatus, the estimated concentration of the therapeutic polynucleotide to a concentration range, and based on this comparison, directing the therapeutic polynucleotide for one of: pooling with one or more additional batches of therapeutic polynucleotide formed in the cartridge, waste, or further analysis.

Example 52

The method of Example 51, the concentration measurement chamber comprising an ultraviolet (UV) measurement chamber, the first measurement comprising a first absorption measurement, the second measurement comprising a second absorption measurement.

Example 53

The method of Example 52, wherein estimating the concentration of the therapeutic polynucleotide further comprises changing one or more of a sensitivity of a UV detector and an intensity of a UV emitter of the microfluidic driver apparatus in response to the second absorption measurement through the cartridge.

Example 54

The method of any of Examples 52 through 53, further comprising pretreating the UV measurement chamber with UV light prior to taking the first absorption measurement through the cartridge.

Example 55

The method of any of Examples 51 through 54, further comprising adjusting, in a processor of the microfluidic driver apparatus, the operation of the microfluidic driver apparatus based on the estimated concentration of the therapeutic polynucleotide.

Example 56

The method of any of Examples 51 through 55, further comprising diluting, under control of a processor of the microfluidic driver apparatus, the therapeutic polynucleotide to a standard concentration for output.

Example 57

The method of any of Examples 51 through 55, further comprising automatically adjusting one or more parameters of the formation of the therapeutic polynucleotide by the microfluidic driver apparatus based on the estimated concentration of the therapeutic polynucleotide.

Example 58

The method of Example 57, wherein the one or more parameters comprises one or more of: temperature, reagent volume, reagent concentration, time, and mixing.

Example 59

The method of any of Examples 51 through 58, wherein determining the concentration of the therapeutic polynucleotide further comprises performing serial dilutions within one or more chambers of the cartridge under control of the microfluidic driver apparatus and repeating the steps of driving the sample solution of the therapeutic polynucleotide for each of one or more dilutions formed by the serial dilutions to generate a dilution curve.

Example 60

The method of Example 59, wherein estimating the concentration of the therapeutic polynucleotide comprises estimating the concentration of the therapeutic polynucleotide from the dilution curve.

Example 61

The method of any of Examples 51 through 60, wherein forming the therapeutic polynucleotide comprises performing an in vitro transcription (IVT) reaction to form the therapeutic polynucleotide.

Example 62

The method of Example 61, further comprising generating, in the cartridge, a template for the IVT reaction.

Example 63

The method of any of Examples 51 through 62, wherein the therapeutic polynucleotide comprises a therapeutic mRNA.

Example 64

The method of Example 63, further comprising encapsulating the therapeutic mRNA with a delivery vehicle.

Example 65

The method of any of Examples 51 through 64, wherein the microfluidic driver apparatus oversees the steps of driving the first blank solution and driving the sample solution by pneumatically deflecting one or more regions of a membrane of the cartridge to open and/or close valves of the cartridge.

Example 66

The method of Example 65, wherein the microfluidic driver apparatus pneumatically deflects one or more regions of the membrane of the cartridge to drive the first blank solution and/or the sample solution into the measurement chamber.

Example 67

A system for making and/or processing a polynucleotide, the system comprising: a cartridge mount; a plurality of pressure lines; a plurality of fluidic lines, each coupled with or configured to couple with a fluid source, wherein each fluidic line and at least a subset of the pressure lines are configured to be secured to inlet or outlet ports on a cartridge held in the cartridge mount; and a controller configured to control application of pressure through the pressure lines to drive fluid through the cartridge, wherein the controller is further configured to direct the formation of a therapeutic polynucleotide in the cartridge, and to estimate a concentration of the therapeutic polynucleotide by driving a first blank solution through a measurement chamber of the cartridge and taking a first measurement of the first blank sample in the measurement chamber, driving a sample solution including the therapeutic polynucleotide through the measurement chamber of the cartridge and taking a second measurement of the sample solution in the measurement chamber, further wherein the controller is configured to estimate the concertation of the therapeutic polynucleotide from the first and second measurement.]

Example 68

The system of Example 67, further comprising: an ultraviolet (UV) light source; and a UV light detector; wherein the controller is configured to take the first measurement in the form of a first absorption measurement using the UV light source and the UV light receiver; wherein the controller is configured to take the second measurement in the form of a second absorption measurement using the UV light source and the UV light receiver; wherein the controller is configured to estimate the concertation of the therapeutic polynucleotide from the first and second absorption measurement.

Example 69

The system of Example 68, wherein the controller is further configured to change one or more of a sensitivity of the UV detector and an intensity of the UV light source in response to the second absorption measurement through the cartridge.

Example 70

The system of any of Examples 68 through 69, wherein the controller is further configured to pretreat the UV measurement chamber with UV light prior to taking the first absorption measurement through the cartridge.

Example 71

The system of any of Examples 67 through 70, wherein the controller is further configured to modify operation of the system based on the estimated concentration of the therapeutic polynucleotide.

Example 72

The system of any of Examples 67 through 71, wherein the controller is further configured to dilute the therapeutic polynucleotide to a standard concentration for output.

Example 73

The system of any of Examples 67 through 73, wherein the controller is further configured to automatically adjust one or more parameters of the formation of the therapeutic polynucleotide based on the estimated concentration of the therapeutic polynucleotide.

Example 74

The system of Example 73, wherein the one or more parameters comprises one or more of: temperature, reagent volume, reagent concentration, time, and mixing.

Example 75

The system of any of Examples 67 through 74, wherein the controller is further configured to perform serial dilutions within one or more chambers of the cartridge and repeat the steps of driving the sample solution of the therapeutic polynucleotide for each of one or more dilutions of the sample solution of the therapeutic polynucleotide formed by the serial dilutions to generate a dilution curve.

Example 76

The system of Example 75, wherein the controller is further configured to estimate the concentration of the therapeutic polynucleotide from the dilution curve.

Example 78

The system of any of Examples 67 through 76, wherein the controller is further configured to form the therapeutic polynucleotide comprises performing an in vitro transcription (IVT) reaction to form the therapeutic polynucleotide.

Example 79

The system of Example 78, wherein the controller is further configured to generate, in the cartridge, a template for the IVT reaction.

Example 80

The system of any of Examples 67 through 79, wherein the therapeutic polynucleotide comprises a therapeutic mRNA.

Example 81

The system of Example 80, wherein the controller is further configured to encapsulate the therapeutic mRNA with a delivery vehicle.

Example 82

The system of any of Examples 67 through 81, wherein the controller is further configured to pneumatically deflecting one or more regions of a membrane of the cartridge to open and/or close valves of the cartridge when driving the first blank solution, driving the second blank solution and driving the sample solution.

Example 83

The system of Example 82, wherein the controller is further configured to pneumatically deflect one or more regions of the membrane of the cartridge to drive the first blank solution, the second blank solution and/or the sample solution into the measurement chamber.

Example 84

A method comprising: emitting ultraviolet (UV) light through a UV measurement chamber of a cartridge, the UV measurement chamber being configured to receive fluid; receiving the UV light at a UV light detector, the received UV light having passed through the UV measurement chamber of the cartridge; measuring a maximum voltage of the UV light detector; measuring a standard deviation of a signal from UV the light detector; determining an upper limit of quantitation (LoQ) based on the measured maximum voltage and based on the measured standard deviation; determining a lower LoQ based on the measured maximum voltage and based on the measured standard deviation; determining whether the upper LoQ and the lower LoQ are acceptable; and either: allowing the cartridge to be used to generate a therapeutic polynucleotide if the upper LoQ and the lower LoQ are acceptable, or providing an alert if one or both of the upper LoQ or the lower LoQ is not acceptable.

Example 85

The method of Example 84, further comprising forming or processing a therapeutic polynucleotide on the cartridge.

Example 86

A cartridge device for processing a polynucleotide, the cartridge device comprising: a first layer, the first layer defining a first recess providing a first ultraviolet (UV) measurement region; a second layer, the second layer defining a second recess providing a second UV measurement region; an elastic material extending between the first layer and the second layer and separating the first layer from the second layer; a UV measurement chamber formed between the first and second UV measurement regions, the UV measurement chamber being configured to receive fluid, the first layer and the second layer being configured to allow UV light to pass through the UV measurement chamber; and a UV blocking feature positioned on or in the first layer, the UV blocking feature being configured to restrict backscattering of UV light through or from the first layer.

Example 87

The cartridge device of Example 86, the elastic material being absent along the UV measurement chamber.

Example 88

The cartridge device of any of Examples 86 through 87, the first recess having a first diameter, the UV blocking feature having an opening with a diameter that is smaller than the first diameter of the first recess.

Example 89

The cartridge device of any of Examples 86 through 88, the UV blocking feature having a body positioned on an upper surface of the first layer, the first recess being formed through the upper surface of the first layer.

Example 90

The cartridge device of Example 89, the body having a disc shape.

Example 91

The cartridge device of any of Examples 86 through 90, the UV blocking feature having a cylindraceous body positioned in the first recess.

Example 92

The cartridge device of any of Examples 86 through 91, the UV blocking feature being configured to block transmission of UV light through a sidewall of the first recess.

Example 93

A method comprising: emitting ultraviolet (UV) light through a UV measurement chamber of a cartridge, the UV measurement chamber containing fluid; receiving the UV light at a UV light detector, the received UV light having passed through the UV measurement chamber of the cartridge; obtaining a first plurality of concentration measurements, each concentration measurement of the first plurality of concentration measurements indicating a respective concentration of fluid in the UV measurement chamber; calculating a mean of the first plurality of concentration measurements; comparing each concentration measurement of the first plurality of concentration measurements to the mean of the first plurality of concentration measurements; identifying an outlier from among the first plurality of concentration measurements relative to the mean of the first plurality of concentration measurements; establishing a second plurality of concentration measurements, the second plurality of concentration measurements comprising the first plurality of concentration measurements with the identified outlier removed; calculating a mean of the second plurality of concentration measurements; and reporting the mean of the second plurality of concentration measurements.

Example 94

The method of Example 93, the first plurality of concentration measurements comprising four concentration measurements.

Example 95

The method of any of Examples 93 through 94, the second plurality of concentration measurements comprising three concentration measurements.

Example 96

The method of any of Examples 93 through 95, the identified outlier providing a concentration measurement substantially deviating from the mean of the first plurality of measurements due to a presence of bubbles in the fluid in the UV measurement chamber.

Example 97

The method of Example 96, further comprising executing a bubble removal algorithm in response to the identified outlier deviating from the mean of the first plurality of measurements by a predetermined degree.

It should be appreciated that all combinations of the foregoing concepts and additional concepts discussed in greater detail below (provided such concepts are not mutually inconsistent) are contemplated as being part of the inventive subject matter disclosed herein and may be used to achieve the benefits described herein.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like. For example, any of the methods described herein may be performed, at least in part, by an apparatus including one or more processors having a memory storing a non-transitory computer-readable storage medium storing a set of instructions for the processes(s) of the method.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally, or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

In general, any of the apparatuses and methods described herein should be understood to be inclusive, but all or a sub-set of the components and/or steps may alternatively be exclusive and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for making and/or processing a polynucleotide, the system comprising:
   a cartridge mount;
   a plurality of pressure lines;
   a plurality of fluidic lines, each coupled with or configured to couple with a fluid source, wherein each fluidic line and at least a subset of the pressure lines are configured to be secured to inlet or outlet ports on a cartridge held in the cartridge mount;
   an ultraviolet (UV) light source;
   a UV light detector; and
   a controller configured to control application of pressure through the pressure lines to drive fluid through the cartridge, wherein the controller is further configured to direct the formation of a therapeutic polynucleotide in the cartridge, and to estimate a concentration of the therapeutic polynucleotide by driving a first blank solution through a UV measurement chamber of the cartridge and taking a first absorption measurement using the UV light source and UV light receiver, driving a sample solution including the therapeutic polynucleotide through the UV measurement chamber of the cartridge and taking a second absorption measurement using the UV light source and UV light receiver, further wherein the controller is configured to estimate the concentration of the therapeutic polynucleotide from the first and second absorption measurements.

2. The system of claim 1, wherein the controller is further configured to modify operation of the system based on the estimated concentration of the therapeutic polynucleotide.

3. The system of any of claim 1, wherein the controller is further configured to compare the estimated concentration of the therapeutic polynucleotide to a concentration range and, based on this comparison, to direct the therapeutic polynucleotide for one of: pooling with one or more additional batches of therapeutic polynucleotide formed in the cartridge, waste, or further analysis.

4. A system for making and/or processing a polynucleotide, the system comprising:
a cartridge; and
a microfluidic driver apparatus comprising:
a cartridge mount;
a plurality of pressure lines;
a plurality of fluidic lines, each coupled with or configured to couple with a fluid source, wherein each fluidic line and at least a subset of the pressure lines are configured to be secured to inlet or outlet ports on a cartridge held in the cartridge mount;
an ultraviolet (UV) light source;
a UV light detector; and
a controller configured to control application of pressure through the pressure lines to drive fluid through the cartridge, wherein the controller is further configured to direct the formation of a therapeutic polynucleotide, further wherein the controller is configured to estimate a concentration of the therapeutic polynucleotide by driving a first blank solution through a UV measurement chamber of the cartridge and taking a first absorption measurement using the UV light source and UV light receiver, driving a sample solution including the therapeutic polynucleotide through the UV measurement chamber of the cartridge and taking a second absorption measurement using the UV light source and UV light receiver, and driving a second blank solution though the UV measurement chamber of the cartridge and taking a third absorption measurement using the UV light source and UV light receiver; modifying operation of the microfluidic driver apparatus based on the concentration of the therapeutic polynucleotide determined from the first, second and third absorption measurements.

5. A system for making and/or processing a polynucleotide, the system comprising:
a cartridge mount;
a plurality of pressure lines;
a plurality of fluidic lines, each coupled with or configured to couple with a fluid source, wherein each fluidic line and at least a subset of the pressure lines are configured to be secured to inlet or outlet ports on a cartridge held in the cartridge mount; and
a controller configured to control application of pressure through the pressure lines to drive fluid through the cartridge, wherein the controller is further configured to direct the formation of a therapeutic polynucleotide in the cartridge, and to estimate a concentration of the therapeutic polynucleotide by driving a first blank solution through a measurement chamber of the cartridge and taking a first measurement of the first blank sample in the measurement chamber, driving a sample solution including the therapeutic polynucleotide through the measurement chamber of the cartridge and taking a second measurement of the sample solution in the measurement chamber, further wherein the controller is configured to estimate the concentration of the therapeutic polynucleotide from the first and second measurements.

6. The system of claim 5, further comprising:
an ultraviolet (UV) light source; and
a UV light detector;
wherein the controller is configured to take the first measurement in the form of a first absorption measurement using the UV light source and the UV light receiver;
wherein the controller is configured to take the second measurement in the form of a second absorption measurement using the UV light source and the UV light receiver;
wherein the controller is configured to estimate the concertation of the therapeutic polynucleotide from the first and second absorption measurement.

7. The system of claim 6, wherein the controller is further configured to change one or more of a sensitivity of the UV detector and an intensity of the UV light source in response to the second absorption measurement through the cartridge.

8. The system of any of claim 6, wherein the controller is further configured to pretreat the UV measurement chamber with UV light prior to taking the first absorption measurement through the cartridge.

* * * * *